(12) United States Patent
Tai et al.

(10) Patent No.: US 10,978,081 B2
(45) Date of Patent: Apr. 13, 2021

(54) AUDIO WATERMARK ENCODING/DECODING

(71) Applicant: Amazon Technologies, Inc., Seattle, WA (US)

(72) Inventors: Yuan-Yen Tai, Melrose, MA (US); Mohamed Mansour, Cupertino, CA (US); Parind Shah, Chelmsford, MA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/141,578

(22) Filed: Sep. 25, 2018

(65) Prior Publication Data
US 2020/0098380 A1 Mar. 26, 2020

(51) Int. Cl.
*G10L 19/018* (2013.01)
*G10L 19/16* (2013.01)
(Continued)

(52) U.S. Cl.
CPC ............ *G10L 19/018* (2013.01); *G10L 13/08* (2013.01); *G10L 15/05* (2013.01); *G10L 15/22* (2013.01);
(Continued)

(58) Field of Classification Search
CPC ..... G10L 19/018; G10L 19/167; G10L 13/08; G10L 15/05; G10L 15/22; G10L 2015/223
See application file for complete search history.

(56) References Cited

U.S. PATENT DOCUMENTS

| | | | | |
|---|---|---|---|---|
| 4,403,331 A | * | 9/1983 | Halpern | H04L 27/3411 370/208 |
| 10,276,175 B1 | * | 4/2019 | Garcia | G10L 19/018 |

(Continued)

FOREIGN PATENT DOCUMENTS

EP 1542227 A1 6/2005

OTHER PUBLICATIONS

Tai et al., "Audio Watermarking Over the Air with Modulated Self-Correlation," Amazon, Inc., USA.
(Continued)

*Primary Examiner* — Walter F Briney, III
(74) *Attorney, Agent, or Firm* — Pierce Atwood LLP

(57) ABSTRACT

A system may embed audio watermarks in audio data using a sign sequence. The system may detect audio watermarks in audio data despite the effects of reverberation. For example, the system may embed multiple repetitions of an audio watermark before generating output audio using loudspeaker(s). To detect the audio watermark in audio data generated by a microphone, the system may perform a self-correlation that indicates where the audio watermark is repeated. In some examples, the system may encode the audio watermark using multiple repetitions of a multi-segment Eigenvector. Additionally or alternatively, the system may encode the audio watermark using a binary sequence of positive and negative values, which may be used as a shared key for encoding/decoding the audio watermark. The audio watermark can be embedded in output audio data to enable wakeword suppression (e.g., avoid cross-talk between devices) and/or local signal transmission between devices in proximity to each other.

21 Claims, 34 Drawing Sheets

(51) Int. Cl.
    *G10L 13/08*     (2013.01)
    *G10L 15/22*     (2006.01)
    *G10L 15/05*     (2013.01)

(52) U.S. Cl.
    CPC ...... *G10L 19/167* (2013.01); *G10L 2015/223* (2013.01)

(56) References Cited

U.S. PATENT DOCUMENTS

2014/0108020 A1*   4/2014   Sharma ................ G10L 19/018
                                                                    704/500
2017/0242651 A1*   8/2017   Lang ................... H04R 29/007

OTHER PUBLICATIONS

Swanson et al., "Audo Watermarking and Data Embedding-Current State of the Art, Challenges and Future Directions," Multimedi and Security Workshop at ACM Multimedia, Citeseer, vol. 41, 1998.

Cesar et al., "Leveraging User Impact: an Architecture for Secondary Screens Usage in Interactive Television," Multimedia Systems, vol. 15, No. 3, pp. 127-142, 2009.

Mansour et al., "Time-Scale Invariant Audio Data Embedding," EURASIP Journal on Applied Signal Processing, vol. 2003, pp. 993-1000, 2003.

Wang et al., "A Novel Synchronization Invariant Audio Watermarking Scheme Based on dwt and dct," IEEE Transactons on Signal Processing, vol. 54, No. 12, pp. 4853-4840, 2006.

Xiang et al., "Patchwork-Based Audio Watermarking Method Robust to De-Synchronization Attacks," IEEE/ACM Transactions on Audio, Speech, and Language Processing, vol. 22, No. 9, pp. 1413-1423, 2014.

Nadeau et al., "An Audio Watermark Designed for Efficient and Robust Resynchronization After Analog Playback," IEEE Transactions on Information Forensics and Security, vol. 12, No. 6, pp. 1393-1405, 2017.

Del Galdo et al., "Audio Watermarking for Acoustic Propagation in Reverberant Environments," Acoustics, Speech and Signal Processing (ICASSP), 2001 IEEE International Conference on. IEEE, pp. 2364-2367, 2011.

Zhang et al., "An Audio Digital Watermarking Algorithm Transmitted via Air Channel in Double dct Domain," Multimedia Technology (ICMT), International Conference on. IEEE, pp. 2926-2930, 2011.

Cox et al., "Secure Spread Spectrum Watermarking for Images, Audio and Video," Image Processing, 1996, Proceedings International Conference on. IEEE, vol. 3, pp. 243-246, 1996.

Kirovski et al., "Spread-Spectrum Watermarking of Audio Signals," IEEE Transactions on Signal Processing, vol. 51, No. 4, pp. 1020-1033, 2003.

Stephen A. Martucci, "Symmetric Convolution and the Discrete Sine and Cosine Transforms," IEEE Transactions on Signal Processing, vol. 42, No. 5, pp. 1038-1051, 1994.

Horn et al., Matrix Analysis, Cambridge University Press, 1990.

Steven M. Kay, "Fundamentals of Statistical Signal Processing, vol. ii: Detection Theory," Signal Processing, Upper Saddle River, NJ: Prentice Hall, 1998.

The Examiner's attention is hereby drawn to the specification and file history of co-pending U.S. Appl. No. 16/141,489, entitled "Audio Watermark Encoding/Decoding", filed Sep. 25, 2018, which may contain information relevant to the present application.

International Search Report and Written Opinion dated Oct. 24, 2019 in International Application No. PCT/US2019/050161.

\* cited by examiner

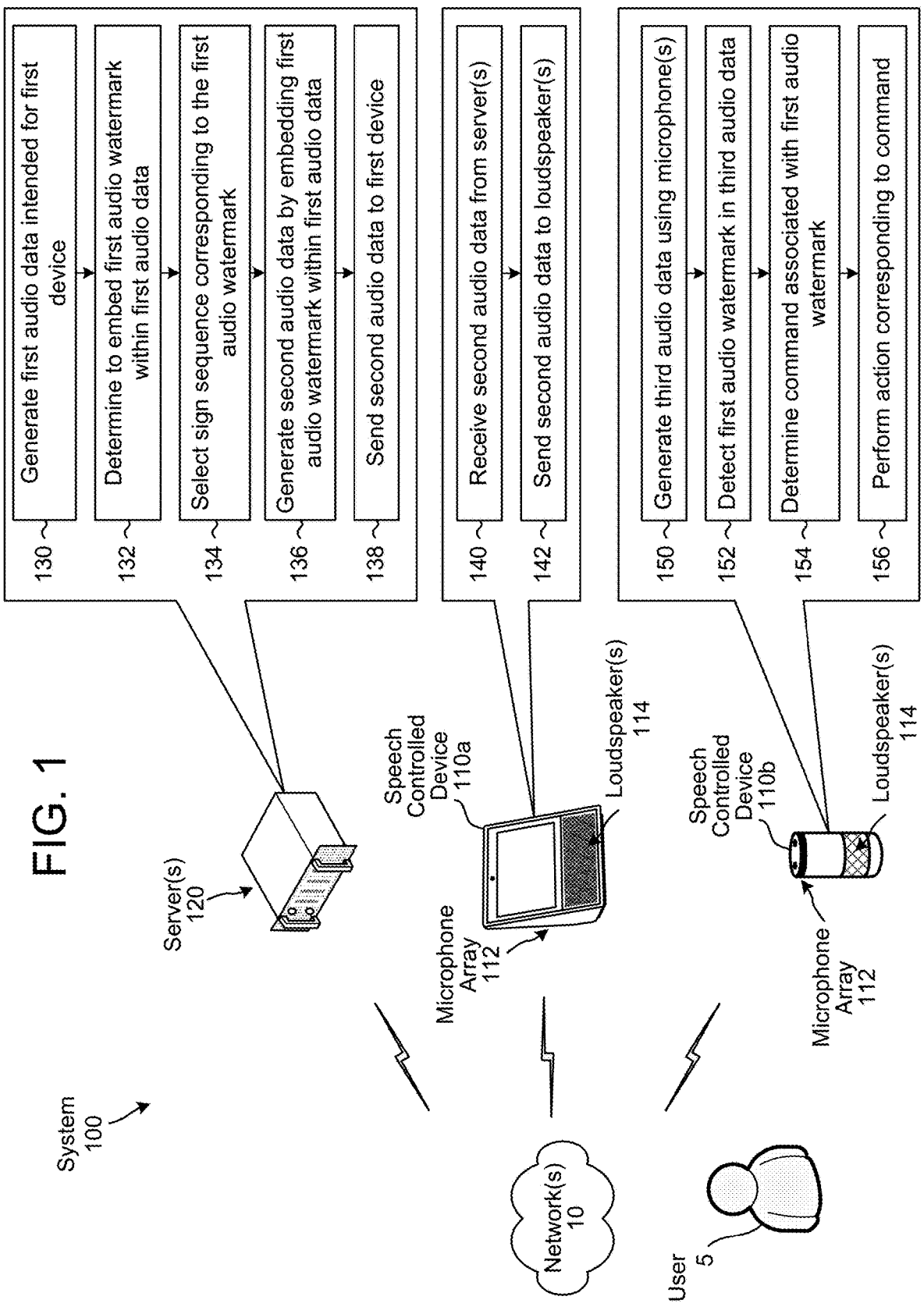

FIG. 2A
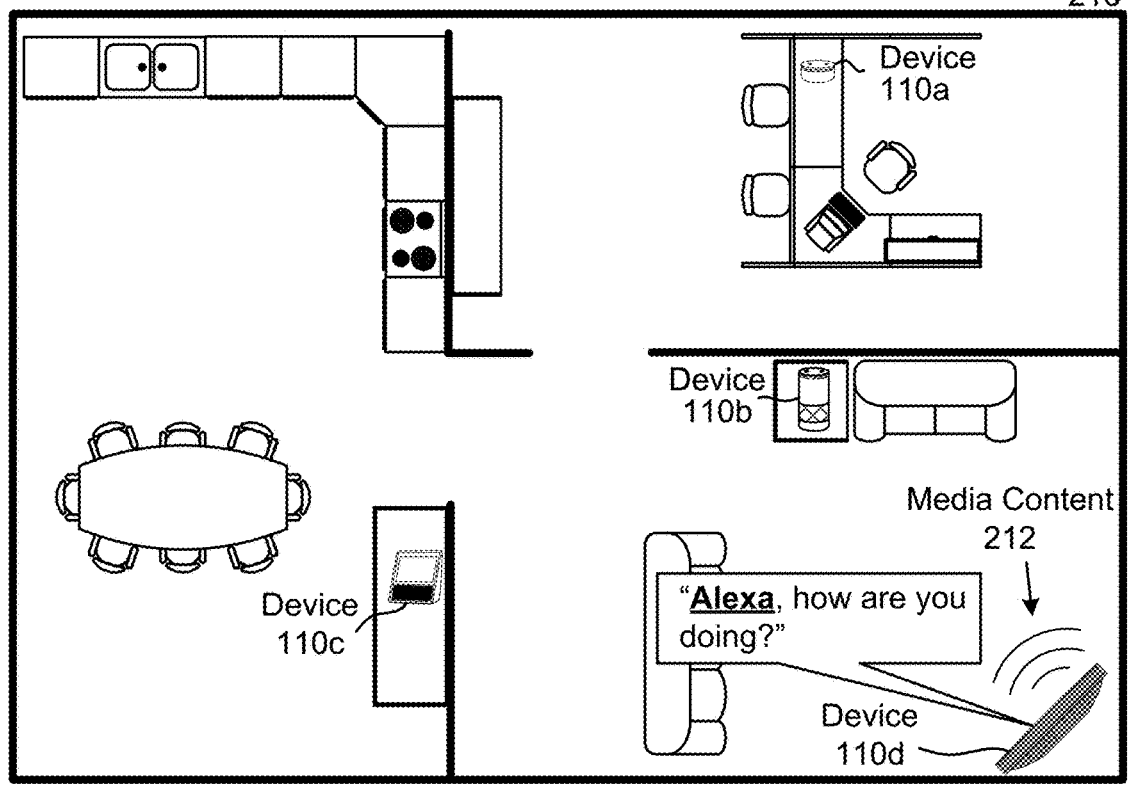
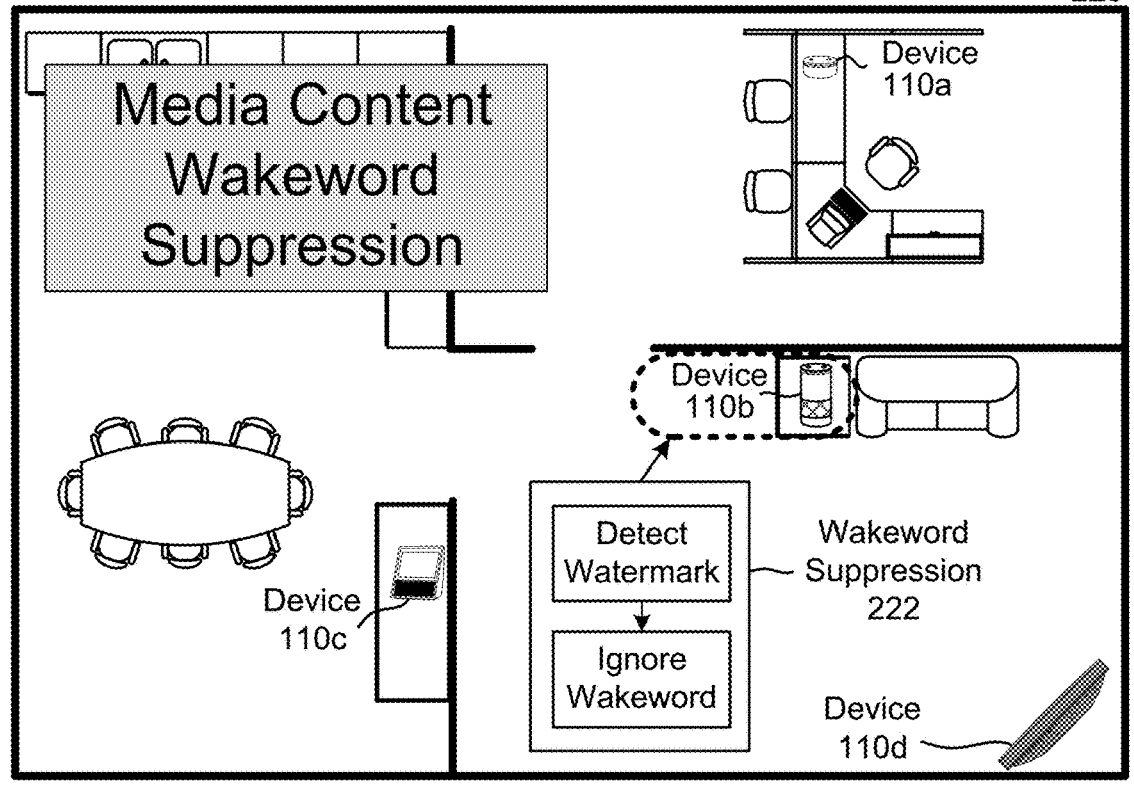

FIG. 2B
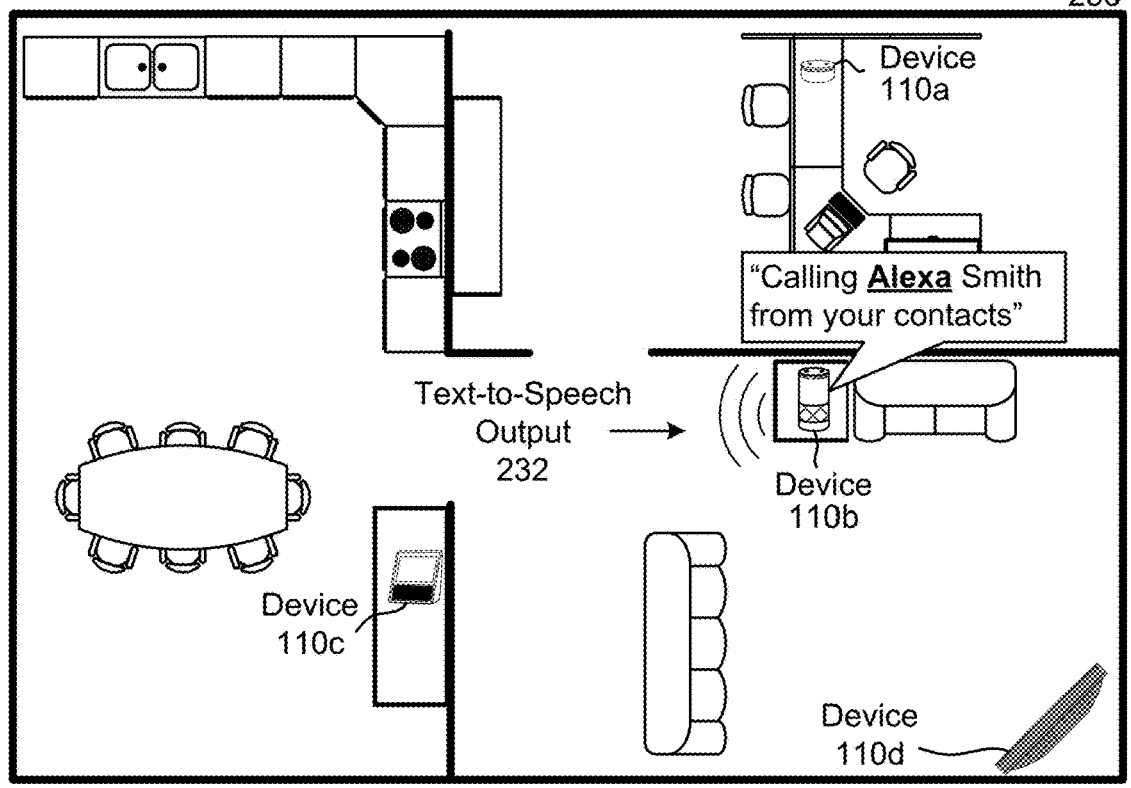
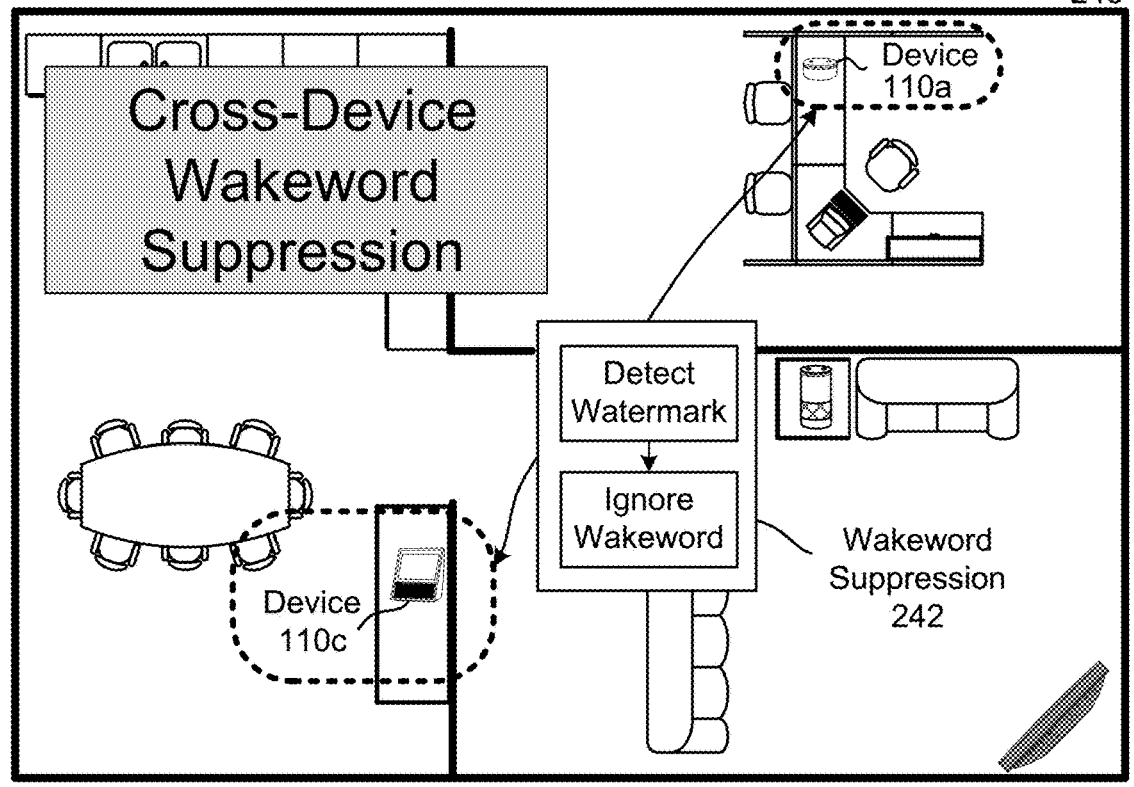

FIG. 2C
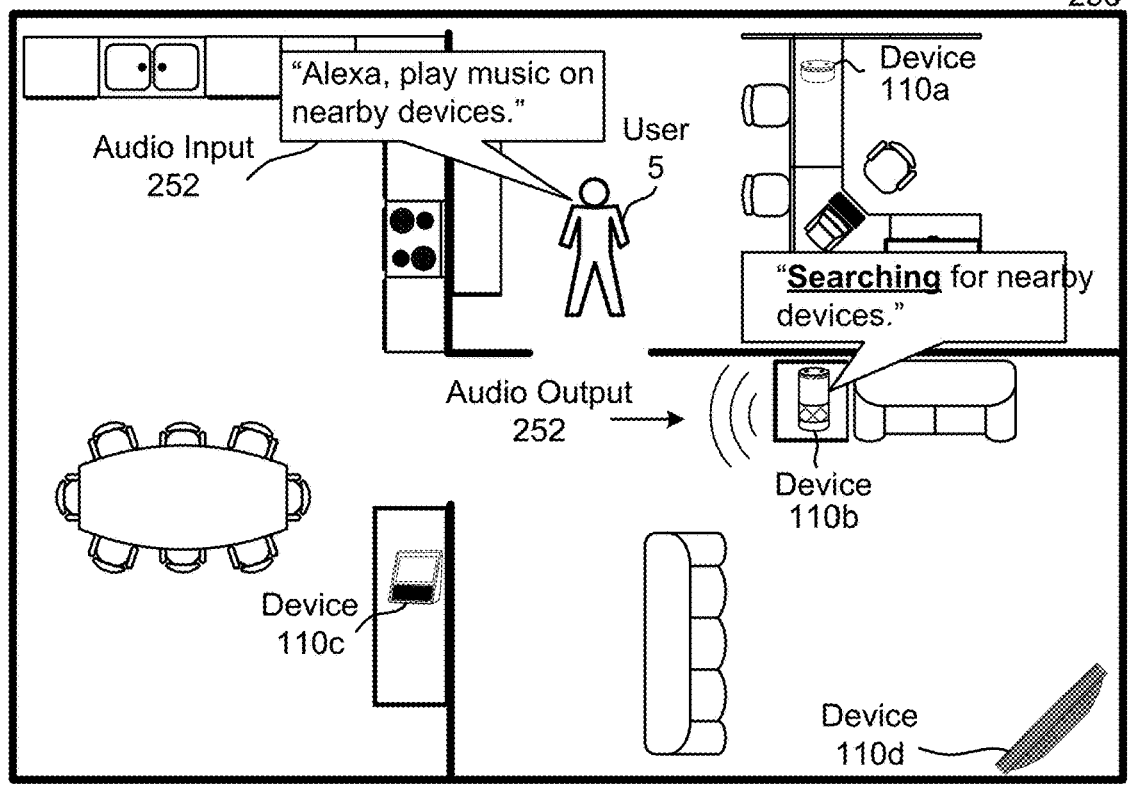
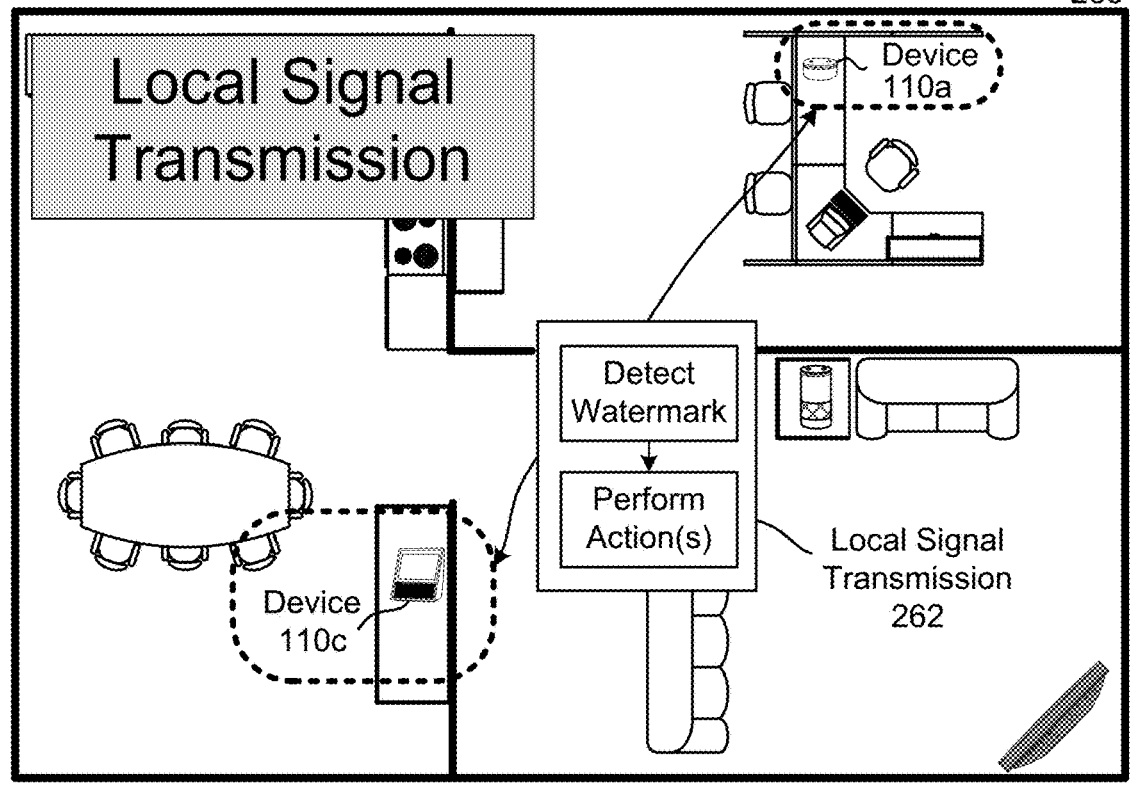

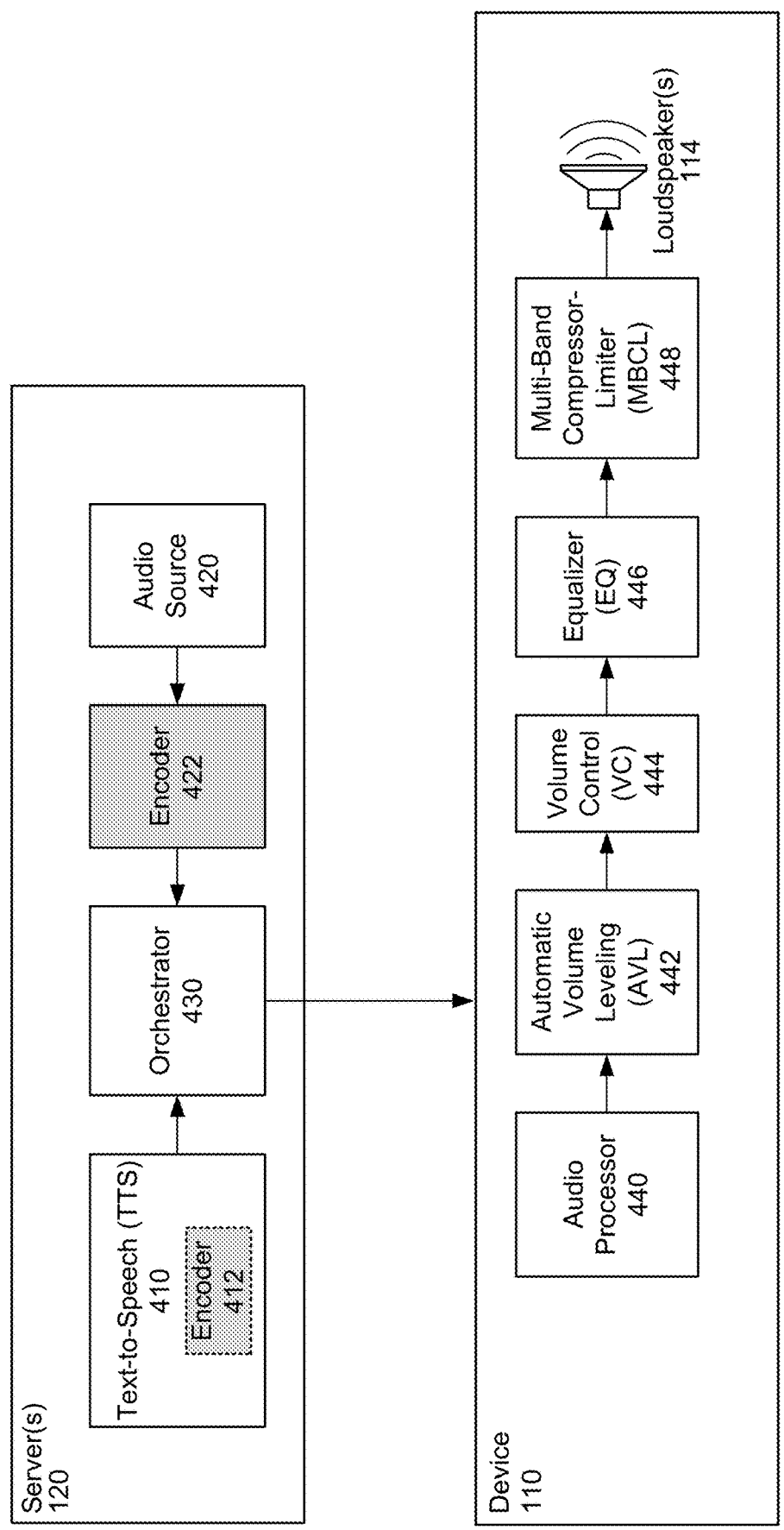

FIG. 6
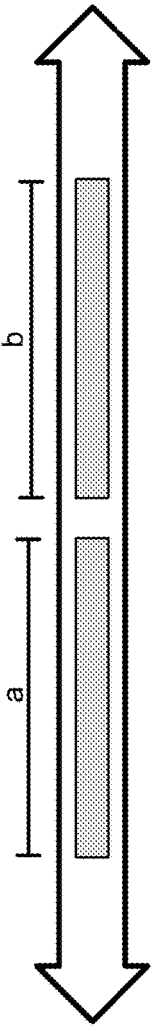
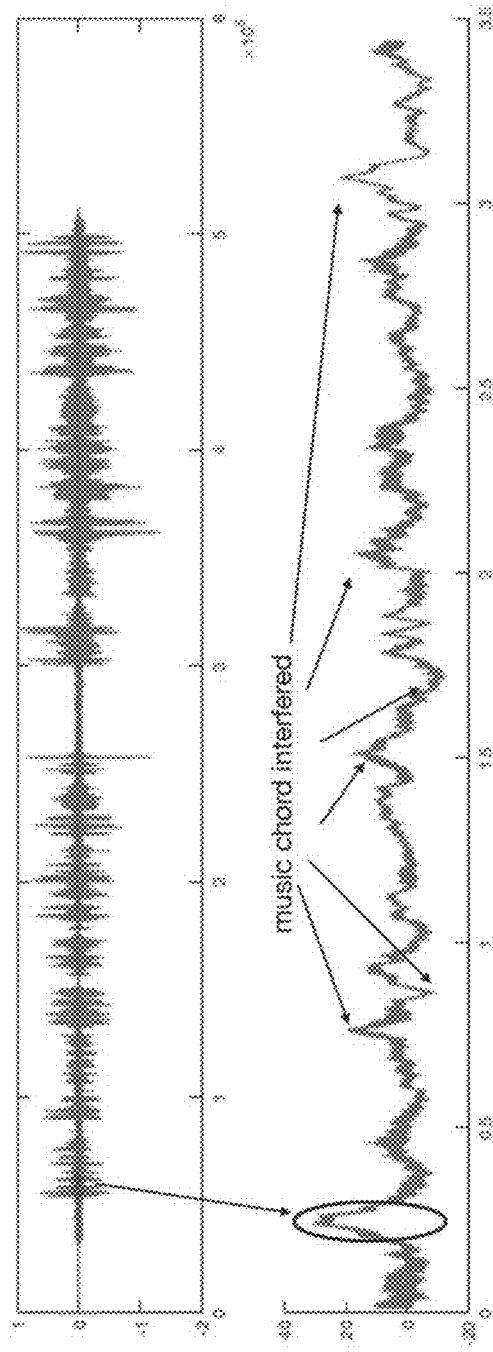

Watermark Encoding Structure 810

Encoding Algorithm 820

$$|y\rangle^t = \bigoplus_{n=1}^{N_{rep}} \bigoplus_{i=1}^{N_{seg}} \left( |x_{n,i}\rangle^t + \beta\, s_{n,i}\, g_{n,i}\, |w_i\rangle^t \right)$$

Decoding Algorithm 830

$$\Gamma(t=t') \equiv \sum_{i=1}^{N_{seg}} \sum_{n=1}^{N_{rep}-1} \sum_{m=n+1}^{N_{rep}} \frac{s_{m,i}\, s_{n,i}\, \langle y_{m,i}|y_{n,i}\rangle_{lo \to hi}^q}{g_{m,i}^{lo \to hi}\, g_{n,i}^{lo \to hi}}$$

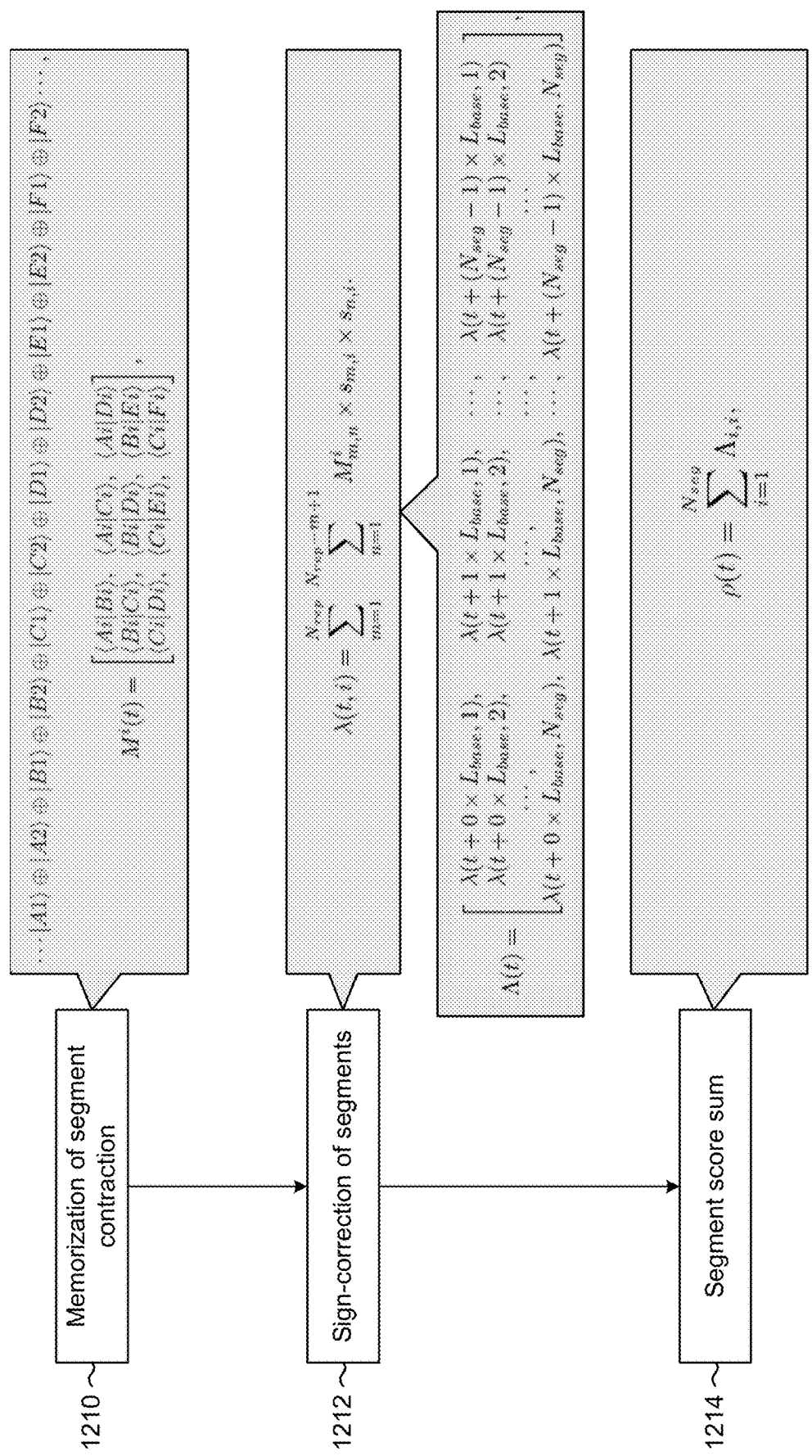

FIG. 13

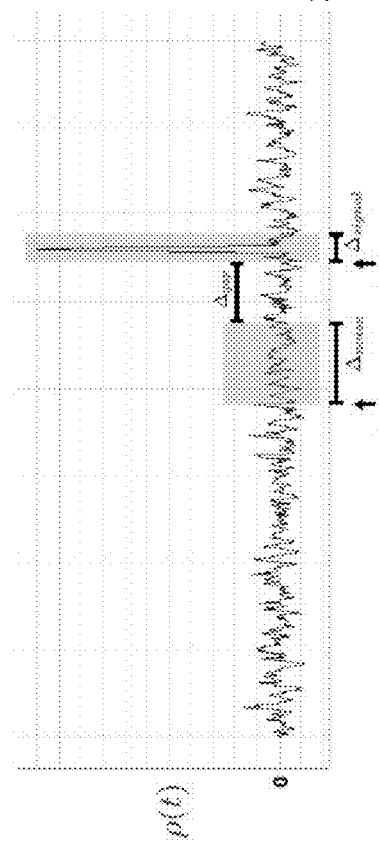

Watermark Chart 1310

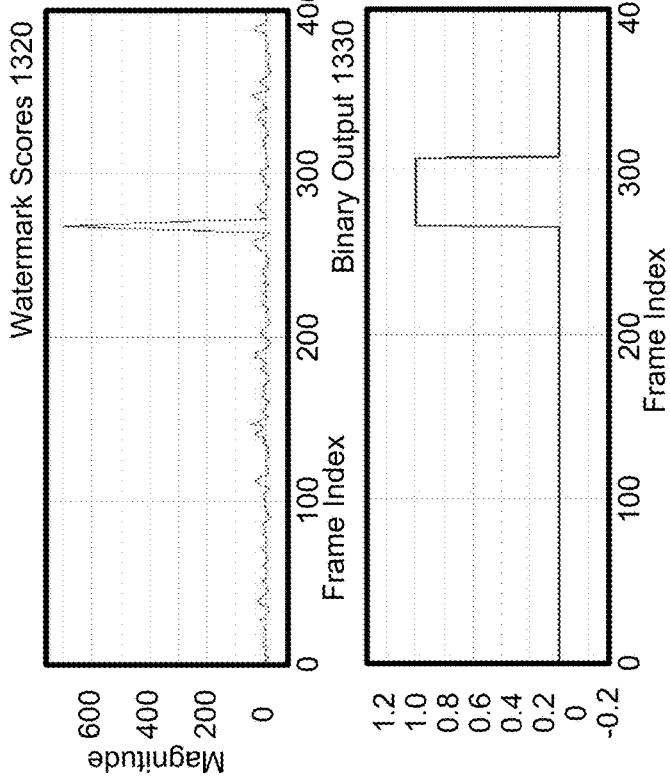

1. Calculate the noise-mean throughout the noise region,
$$\mu_n = \frac{1}{\Delta_n} \sum_{t=t_0}^{t_0+\Delta_n} \rho(t)$$

2. Calculate the noise-deviations from the noise-mean,
$$\sigma_n = \frac{1}{\Delta_n} \sum_{t=t_0}^{t_0+\Delta_n} |\rho(t) - \mu_n|$$

3. Calculate the noise-mean corrected signal-mean throughout the signal region,
$$\mu_s = \frac{1}{\Delta_s} \sum_{t=t_0}^{t_0+\Delta_s} (\rho(t) - \mu_n)$$

4. Calculate the signal-noise-ratio (SNR) and generate a binary score
$$\text{The time-series binary score} = \varepsilon(t) = \begin{cases} 0, & \text{for } \mu_s/\sigma_n < R_0 \\ 1, & \text{for } \mu_s/\sigma_n \geq R_0 \end{cases}$$

Where ε is the binary score for the watermark detection and the value of R (always > 0) is the signal-noise-ratio.

Watermark Scores 1320

Binary Output 1330

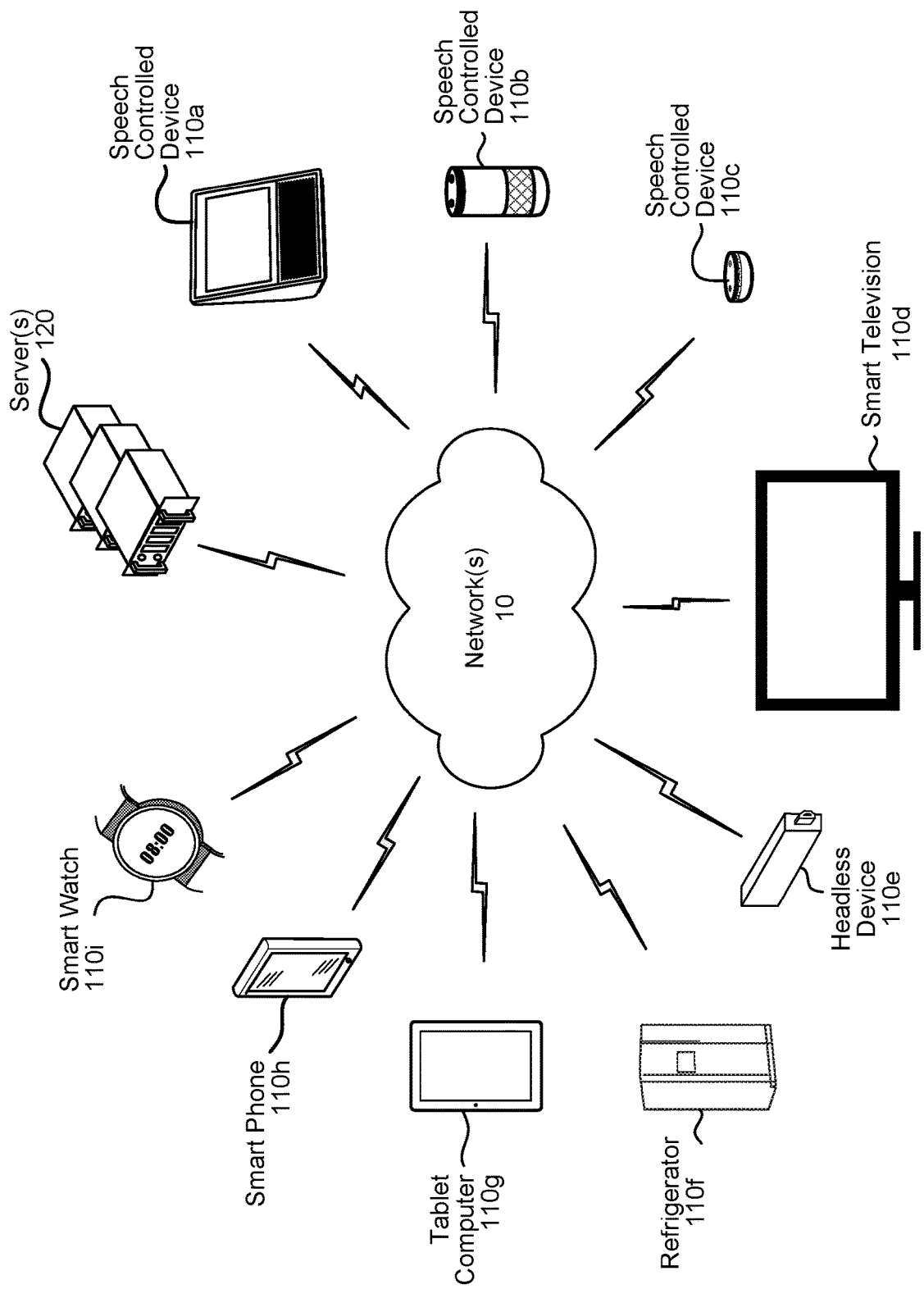

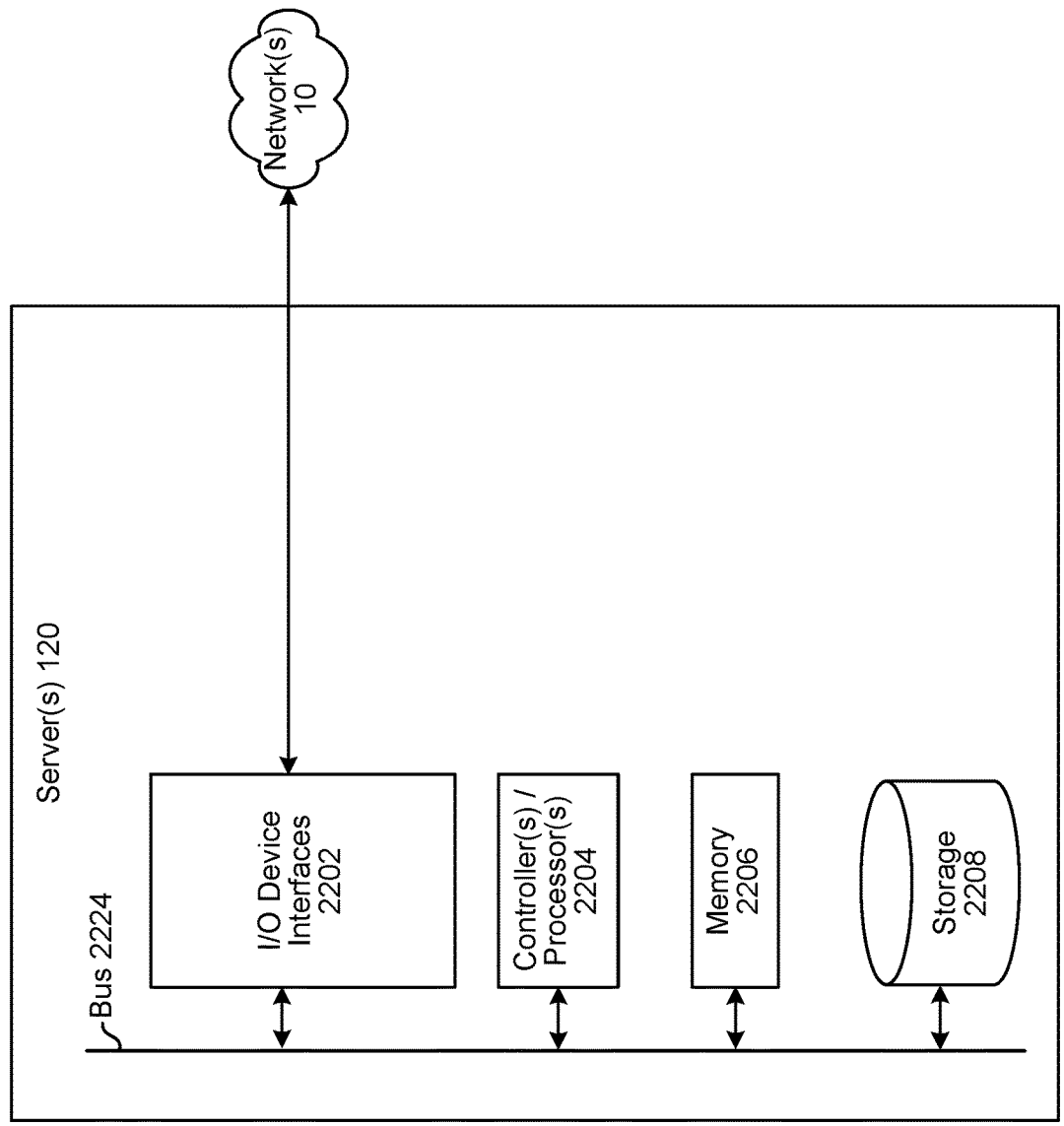

1

AUDIO WATERMARK ENCODING/DECODING

BACKGROUND

With the advancement of technology, the use and popularity of electronic devices has increased considerably. Electronic devices are commonly used to capture and process audio data. Described herein are technological improvements to such systems, among other things.

BRIEF DESCRIPTION OF DRAWINGS

For a more complete understanding of the present disclosure, reference is now made to the following description taken in conjunction with the accompanying drawings.

FIG. 1 illustrates a system for encoding and decoding audio watermarks according to embodiments of the present disclosure.

FIGS. 2A-2D illustrate examples of unique functionality enabled by encoding and decoding audio watermarks according to embodiments of the present disclosure.

FIGS. 4A-4C illustrate examples of component diagrams for encoding audio watermarks according to embodiments of the present disclosure.

FIG. 6 illustrates an example of a self-correlation algorithm according to embodiments of the present disclosure.

FIG. 12 illustrates an example of algorithms used to decode an audio watermark according to embodiments of the present disclosure.

FIG. 13 illustrates an example of generating a signal-noise-ratio (SNR) and a binary score according to embodiments of the present disclosure.

FIG. 21 illustrates an example of a computer network for use with the system.

FIG. 22A-22B are block diagrams conceptually illustrating example components of a system according to embodiments of the present disclosure.

DETAILED DESCRIPTION

Figure 2D:
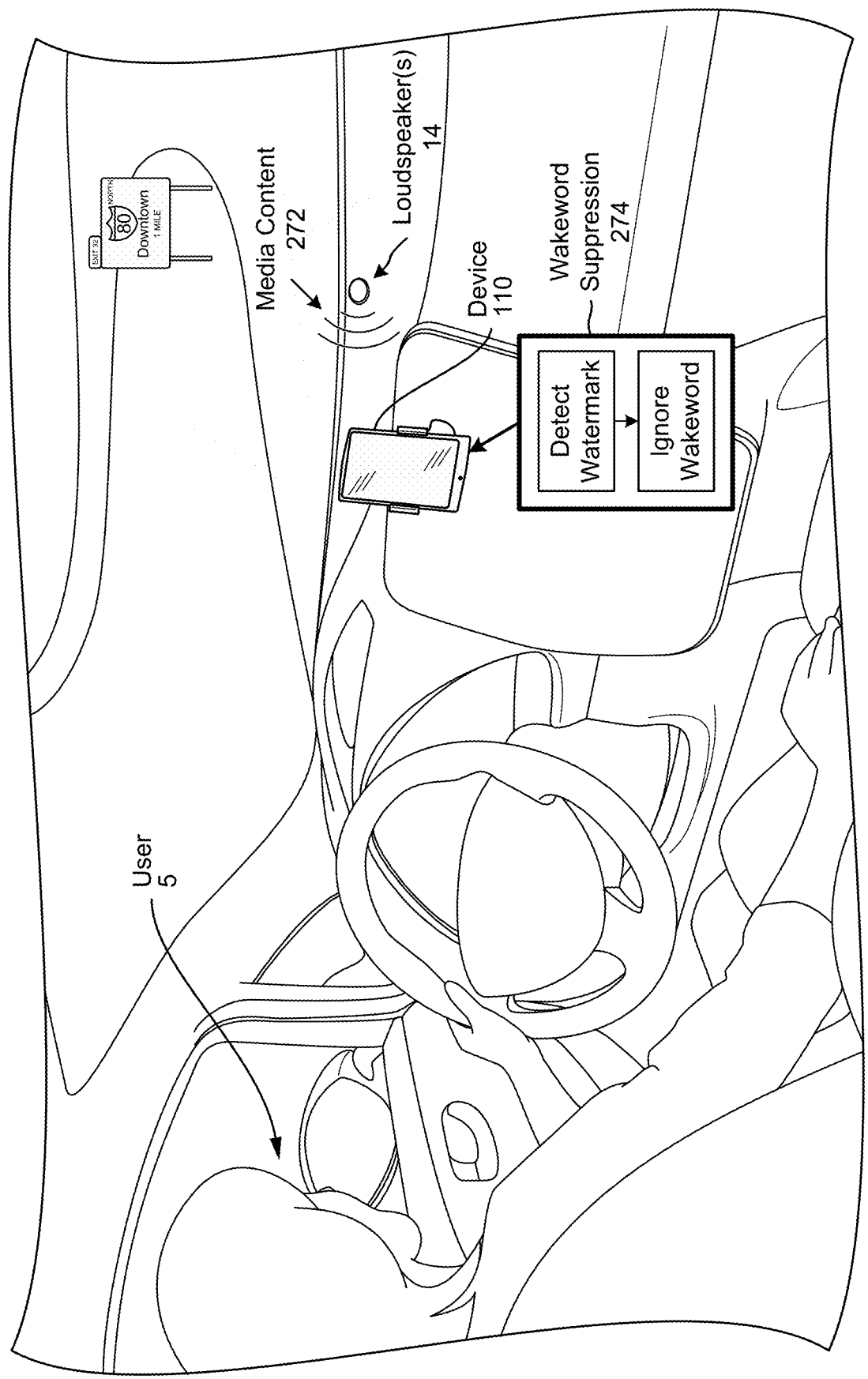

Electronic devices may be used to capture audio data and generate audio. For example, an electronic device may generate audio using loudspeakers and may capture audio data using one or more microphones. If multiple electronic devices are located in proximity to each other (e.g., capable of capturing the same audio), the electronic devices may capture audio generated by a neighboring device.

To enable unique functionality between nearby devices, devices, systems and methods are disclosed that embed audio watermark(s) in output audio data and detect a presence of audio watermark(s) in input audio data. While an encoding algorithm and a decoding algorithm may be used to embed audio watermarks within any content, they enable the audio watermark(s) to be detected despite the presence of reverberation caused by sound wave transmission (e.g., when watermarked audio data is output by a loudspeaker and recaptured by a microphone). Thus, neighboring devices may embed audio watermarks to instruct other devices to perform an action, enabling local signal transmission and/or wakeword suppression (e.g., avoid cross-talk between devices). For example, the system may embed multiple repetitions of an audio watermark before generating output audio using loudspeaker(s). To detect the audio watermark in audio data generated by a microphone, the system may perform a self-correlation that indicates where the audio watermark is repeated. In some examples, the system may encode the audio watermark using multiple repetitions of a multi-segment Eigenvector. Additionally or alternatively, the system may encode the audio watermark using a binary sequence of positive and negative values, which may be used as a shared key for encoding/decoding of the audio watermark. As the encoding/decoding algorithms are efficient, the system may embed multiple audio watermarks in audio data and may decode multiple audio watermarks in parallel.

FIG. 1 illustrates a system for encoding and decoding audio watermarks according to embodiments of the present disclosure. As illustrated in FIG. 1, a system 100 may include one or more devices 110, such as a first speech controlled device 110a and a second speech controlled device 110b (e.g., voice-enabled devices 110). While FIG. 1 illustrates each of the devices 110 being a speech controlled device, the disclosure is not limited thereto and the system 100 may include any smart device capable of connecting to a wireless network. As illustrated in FIG. 1, the first speech controlled device 110a (hereinafter "first device 110a") and/or the second speech controlled device 110b (hereinafter "second device 110b") may include a microphone array 112 and/or one or more loudspeaker(s) 114. While FIG. 1 illustrates the first device 110a including a display and the second device 110*b* not including a display, the disclosure is not limited thereto and a display may be included or not included in individual devices 110 without departing from the disclosure.

To detect user speech or other audio, each device 110 may use one or more microphones in the microphone array 112 to generate microphone audio data that captures audio in a room (e.g., an environment) in which the device 110 is located. For example, if the devices 110 are located within earshot of a user 5, the devices 110 may capture audio data representing speech generated by the user 5. As is known and as used herein, "capturing" an audio signal includes a microphone transducing audio waves (e.g., sound waves) of captured sound to an electrical signal and a codec digitizing the signal to generate the microphone audio data.

The device 110 may process voice commands received from the user 5, enabling the user 5 to control the devices 110 and/or other devices associated with a user profile corresponding to the user 5. For example, the device 110 may include a wakeword engine that processing the microphone audio data to detect a representation of a wakeword. When a wakeword is detected in the microphone audio data, the device 110 may generate audio data corresponding to the wakeword and send the audio data to the server(s) 120 for speech processing. The server(s) 120 may process the audio data, determine the voice command, and perform one or more actions based on the voice command. For example, the server(s) 120 may generate a command instructing the device 110 (or any other device) to perform an action, may generate output audio data corresponding to the action, may send the output audio data to the device 110, and/or may send the command to the device 110.

In some examples, the device 110 may generate microphone audio data that captures a wakeword that does not correspond to speech from the user 5. For example, the first device 110*a* may generate output audio including a representation of the wakeword and the second device 110*b* may capture the output audio and detect the representation of the wakeword. Upon detecting the representation of the wakeword, the second device 110*b* may generate audio data and send the audio data to the server(s) 120 for speech processing. However, the audio data does not correspond to speech from the user 5 and therefore does not correspond to a voice command.

To prevent nearby devices from sending audio data to the server(s) 120, in some examples the system 100 may embed output audio data with an audio watermark to perform wakeword suppression. For example, if a representation of the wakeword is included in output audio data being sent to the first device 110*a*, the system 100 may embed the audio watermark in the output audio data. Thus, the second device 110*b* may detect the representation of the wakeword but may also detect the audio watermark instructing the second device 110*b* to ignore the wakeword. Additionally or alternatively, the system 100 may embed audio watermark(s) in output audio data to perform unique functionality, such as local signal transmission, as will be described in greater detail below.

As illustrated in FIG. 1, the server(s) 120 may generate (130) first audio data intended for the first device 110*a*. For example, the user 5 may generate speech corresponding to a voice command, the first device 110*a* may generate audio data including a representation of the speech and may send the audio data to the server(s) 120 for speech processing. In response to receiving the voice command, the server(s) 120 may generate the first audio data indicating to the user 5 one or more actions that are being performed and/or will be performed (e.g., by the server(s) 120, the first device 110*a*, the second device 110*b*, and/or other devices not illustrated in FIG. 1). During normal speech processing, the server(s) 120 would send the first audio data directly to the first device 110*a* and the first device 110*a* would use the first audio data to generate output audio via the loudspeaker(s) 114.

As illustrated in FIG. 1, the server(s) 120 may determine (132) to embed a first audio watermark within the first audio data, may select (134) a sign sequence corresponding to the first audio watermark, may generate (136) second audio data by embedding the first audio watermark within the first audio data, and may send (138) the second audio data to the first device 110*a*. In the example illustrated in FIG. 1, the server(s) 120 may determine to embed the first audio watermark in order to enable unique functionality. Thus, the first audio watermark may correspond to a command instructing one or more devices 110 to perform an action. For example, the server(s) 120 may generate the second audio data with the first audio watermark embedded in order to send the command from the first device 110*a* to neighboring device(s) 110 (e.g., one or more devices 110 in proximity to the first device 110*a*, such as the second device 110*b*). While the first audio watermark includes other components, the sign sequence is important as it may be used as a shared key to enable encoding and/or decoding of the first audio watermark. Using the sign sequence to detect the first audio watermark may enable unique functionality, as described in greater detail below with regard to FIGS. 2A-2D, such as performing wakeword suppression, local signal transmission, and/or the like.

In some examples, the server(s) 120 may determine to embed the first audio watermark in order to perform wakeword suppression. For example, the server(s) 120 may detect a representation of a wakeword during a first time window within the first audio data and may generate the second audio data by embedding the first audio watermark within the first time window. In this example, the first audio watermark may correspond to a command to perform wakeword suppression (e.g., ignore the representation of the wakeword in the first audio data). Thus, when neighboring device(s) 110 detect the representation of the wakeword, they may also detect the first audio watermark and may ignore the representation of the wakeword instead of sending audio data to the server(s) 120.

Additionally or alternatively, the server(s) 120 may generate the first audio data and embed the first audio watermark within the first audio data in order to perform local signal transmission between the first device 110*a* and any neighboring device(s) 110 (e.g., the second device 110*b*). To illustrate an example of performing local signal transmission, the voice command may correspond to a request that music be played by the first device 110*a* and any nearby devices 110. In response, the server(s) 120 may generate the first audio data as a notification that an action is being performed and generate the second audio data by embedding the first audio watermark within the first audio data. For example, the first audio data may correspond to a sentence (e.g., "Searching for nearby devices") and the first audio watermark may be embedded within the sentence and/or specific words of the sentence (e.g., "Searching"). In this example, the first audio watermark may correspond to a command instructing nearby devices to synchronize in order to play music. Thus, any device 110 that detects the first audio watermark may send a message to the first device 110*a* and/or the server(s) 120 in order to synchronize playback of streaming music.

After the server(s) 120 sends the second audio data to the first device 110a in step 138, the first device 110a may receive (140) the second audio data from the server(s) 120 and may send (142) the second audio data to the loudspeaker(s) 114 to generate output audio. To illustrate a first example corresponding to wakeword suppression, the first device 110a may generate output audio corresponding to a sentence that includes a representation of the wakeword (e.g., "Calling Alexa Smith from your contacts"), with the first audio watermark embedded in the wakeword (e.g., "Alexa"). To illustrate a second example corresponding to local signal transmission, the first device 110a may generate output audio corresponding to a sentence indicating an action being performed (e.g., "Searching for nearby devices"), with the first audio watermark embedded in one or more words in the sentence (e.g., "searching").

The second device 110b may generate (150) third audio data corresponding to the output audio using one or more microphone(s) of the microphone array 112. The second device 110b may detect (152) the first audio watermark within the third audio data, may determine (154) the command associated with the first audio watermark, and may perform (156) an action corresponding to the command. To continue the first example, the second device 110b may detect the representation of the wakeword (e.g., "Alexa") within the third audio data, may detect the first audio watermark within the third audio data, may determine that the first audio watermark corresponds to a command to ignore the representation of the wakeword, and may perform a corresponding action (e.g., ignore the representation of the wakeword instead of sending the third audio data to the server(s) 120). To continue the second example, the second device 110b may detect the first audio watermark within the third audio data, may determine that the first audio watermark corresponds to a command to synchronize playback of music with the first device 110a, and may perform a corresponding action (e.g., send a message to the first device 110a and/or the server(s) 120 in order to synchronize playback of the music).

While FIG. 1 illustrates an example in which the audio watermark is detected despite the presence of reverberation caused by sound wave transmission (e.g., the watermarked audio data is output by the loudspeaker(s) 114 of the first device 110a and recaptured by the microphone array 112 of the second device 110b), the disclosure is not limited thereto. Instead, as discussed in greater detail below with regard to at least FIG. 3B, the system 100 may detect the audio watermark without outputting the watermarked audio data via the loudspeaker(s) 114 without departing from the disclosure. For example, the system 100 may embed audio watermark(s) within any content to generate watermarked audio data and may detect the audio watermark(s) in a digital copy of the watermarked audio data prior to outputting the watermarked audio data via the loudspeaker(s) 114.

FIGS. 2A-2D illustrate examples of unique functionality enabled by encoding and decoding audio watermarks according to embodiments of the present disclosure. As illustrated in FIG. 2A, a first media content example 210 corresponds to embedding an audio watermark in media content 212 to perform wakeword suppression during playback of the media content 212. For example, the media content 212 may correspond to audio, video, and/or other media content that includes a sentence (e.g., "Alexa, how are you doing") that includes a representation of a wakeword.

During normal playback of the media content 212 (e.g., without the audio watermark embedded), a fourth device 110d (e.g., television) may generate output audio corresponding to the media content 212 and neighboring device(s) 110 (e.g., first device 110a, second device 110b, third device 110c, and/or the like) may detect a representation of the wakeword. In response to detecting the representation of the wakeword, the neighboring device(s) 110 may generate audio data and send the audio data to the server(s) 120. In this example, the wakeword was not generated by the user 5 and therefore does not correspond to a voice command. Thus, sending the audio data to the server(s) 120 is unnecessary and results in unnecessary processing by the server(s) 120.

When the media content 212 is embedded with the audio watermark, however, the neighboring device(s) 110 may detect the audio watermark and ignore the representation of the wakeword. As illustrated in FIGS. 2A-2C, an embedded audio watermark is indicated by bolded and underlined text. Thus, the first media content example 210 indicates that the audio watermark is embedded within a first word (e.g., "Alexa") of the media content 212. The disclosure is not limited thereto, however, and the audio watermark may be embedded within a different word and/or two or more words of the media content 212 without departing from the disclosure.

In the example illustrated in FIG. 2A, the only device 110 close enough to the fourth device 110d to detect the representation of the wakeword is the second device 110b. However, as a result of the audio watermark being embedded in the media content 212, FIG. 2A illustrates a second media content example 220 showing that the second device 110b may perform wakeword suppression 222 by detecting the audio watermark and ignoring the wakeword. Thus, despite detecting the representation of the wakeword, the neighboring device(s) 110 (e.g., first device 110a, second device 110b, third device 110c, and/or the like) may not generate audio data and/or send the audio data to the server(s) 120.

As illustrated in FIG. 2B, a first cross-talk example 230 corresponds to embedding an audio watermark in text-to-speech (TTS) output 232 to perform wakeword suppression during playback of the TTS output 232. For example, the TTS output 232 may correspond to audio that includes synthesized speech corresponding to a sentence (e.g., "Calling Alexa Smith from your contacts") that includes a representation of a wakeword.

During normal playback of the TTS output 232 (e.g., without the audio watermark embedded), the second device 110b may generate output audio corresponding to the TTS output 232 and neighboring device(s) 110 (e.g., first device 110a, third device 110c, and/or the like) may detect a representation of the wakeword. In response to detecting the representation of the wakeword, the neighboring device(s) 110 may generate audio data and send the audio data to the server(s) 120. In this example, the wakeword was not generated by the user 5 and therefore does not correspond to a voice command. Thus, sending the audio data to the server(s) 120 is unnecessary and results in unnecessary processing by the server(s) 120.

When the TTS output 232 is embedded with the audio watermark, however, the neighboring device(s) 110 may detect the audio watermark and ignore the representation of the wakeword. As mentioned above, an embedded audio watermark is indicated by bolded and underlined text. Thus, the first cross-talk example 230 indicates that the audio watermark is embedded within a first word (e.g., "Alexa") of the TTS output 232. The disclosure is not limited thereto, however, and the audio watermark may be embedded within a different word and/or two or more words of the TTS output 232 without departing from the disclosure. As a result of the audio watermark being embedded in the TTS output 232, FIG. 2B illustrates a second cross-talk example 240 showing that the first device 110a and the third device 110c may perform wakeword suppression 242 by detecting the audio watermark and ignoring the wakeword. Thus, despite detecting the representation of the wakeword, the neighboring device(s) 110 (e.g., first device 110a, third device 110c, and/or the like) may not generate audio data and/or send the audio data to the server(s) 120.

While FIGS. 2A-2B illustrate examples of performing wakeword suppression, the disclosure is not limited thereto. Instead, the server(s) 120 may embed audio watermarks in order to implement other unique functionality that is not limited to performing wakeword suppression. FIG. 2C illustrates an example of performing local signal transmission in order to send commands to neighboring device(s) 110 by generating audio. For example, the second device 110b may generate output audio that includes an embedded audio watermark. While the audio watermark corresponds to a command, it may be embedded within the output audio such that it is undetectable by the user 5. Thus, neighboring device(s) 110 may capture the output audio using the microphone array 112, detect the audio watermark embedded in the output audio, determine the command associated with the audio watermark, and perform one or more action(s) corresponding to the command.

As illustrated in FIG. 2C, a first transmission example 250 corresponds to embedding an audio watermark in audio output 252 to perform local signal transmission and send a command to one or more neighboring device(s) 110. For example, the audio output 252 may correspond to audio that includes synthesized speech representing a sentence (e.g., "Searching for nearby devices"). In contrast to the examples illustrated in FIGS. 2A-2B, the audio output 252 does not include a representation of the wakeword. While the audio output 252 is described as corresponding to synthesized speech (e.g., generated using text-to-speech processing), the disclosure is not limited thereto and the audio output 252 may correspond to any other audio data without departing from the disclosure.

During normal playback of the audio output 252 (e.g., without the audio watermark embedded), the second device 110b may generate the audio output 252 using the loudspeaker(s) 114. As a representation of the wakeword is not included in the audio output 252, the neighboring device(s) 110 (e.g., first device 110a, third device 110c, and/or the like) will not detect a representation of the wakeword and therefore may ignore the audio output 252 and not capture audio data or perform any action(s).

When the audio output 252 is embedded with the audio watermark, however, the neighboring device(s) 110 may detect the audio watermark and perform one or more actions associated with the audio watermark. As mentioned above, an embedded audio watermark is indicated by bolded and underlined text. Thus, the first transmission example 250 indicates that the audio watermark is embedded within a first word (e.g., "Searching") of the audio output 252. The disclosure is not limited thereto, however, and the audio watermark may be embedded within a different word and/or two or more words of the audio output 252 without departing from the disclosure. As a result of the audio watermark being embedded in the audio output 252, FIG. 2C illustrates a second transmission example 260 showing that the first device 110a and the third device 110c may perform local signal transmission 262 by detecting the audio watermark and performing action(s). Thus, despite not detecting the representation of the wakeword, the neighboring device(s) 110 (e.g., first device 110a, third device 110c, and/or the like) may perform one or more action(s) associated with the audio watermark embedded within the audio output 252.

As discussed above, the one or more action(s) may correspond to sending a message to the second device 110b and/or the server(s) 120, although the disclosure is not limited thereto. Instead, the one or more action(s) may correspond to any command known to one of skill in the art. As will be discussed in greater detail below, the devices 110 and/or the server(s) 120 may use a watermark database to detect one of a plurality of audio watermarks. For example, each audio watermark included in the watermark database may correspond to a specific command and/or group of commands.

Additionally or alternatively, an audio watermark may correspond to a specific device, a group of devices, and/or be generic to all devices. For example, the second device 110b may embed a first audio watermark to send a first command to the first device 110a at a first time, may embed a second audio watermark to send a second command to the third device 110c at a second time, and/or may embed a third audio watermark to send a third command to both the first device 110a and the third device 110c at a third time.

As illustrated in FIG. 2D, a media content example 270 corresponds to embedding an audio watermark in media content 272 to perform wakeword suppression during playback of the media content 272 in a vehicle. For example, the media content 272 may correspond to audio, video, and/or other media content that includes a sentence including a representation of a wakeword.

During normal playback of the media content 272 (e.g., without the audio watermark embedded), loudspeaker(s) 14 included in the vehicle may generate output audio corresponding to the media content 272 and a device 110 (e.g., smart phone) may detect a representation of the wakeword. In response to detecting the representation of the wakeword, the device 110 may generate audio data and send the audio data to the server(s) 120. In this example, the wakeword was not generated by the user 5 and therefore does not correspond to a voice command. Thus, sending the audio data to the server(s) 120 is unnecessary and results in unnecessary processing by the server(s) 120.

When the media content 272 is embedded with the audio watermark, however, the device 110 may detect the audio watermark and ignore the representation of the wakeword. In the example illustrated in FIG. 2D, the device 110 detects the representation of the wakeword and performs wakeword suppression 274 by detecting the audio watermark and ignoring the wakeword. Thus, despite detecting the representation of the wakeword, the device 110 may not generate audio data and/or send the audio data to the server(s) 120.

While FIGS. 2A-2D illustrate audio data only being embedded with a single audio watermark, the disclosure is not limited thereto and audio data may be embedded with multiple audio watermarks without departing from the disclosure. For example, the audio output 252 may embed multiple audio watermarks within the sentence and/or within a single word of the sentence without departing from the disclosure.

Figure 3A:
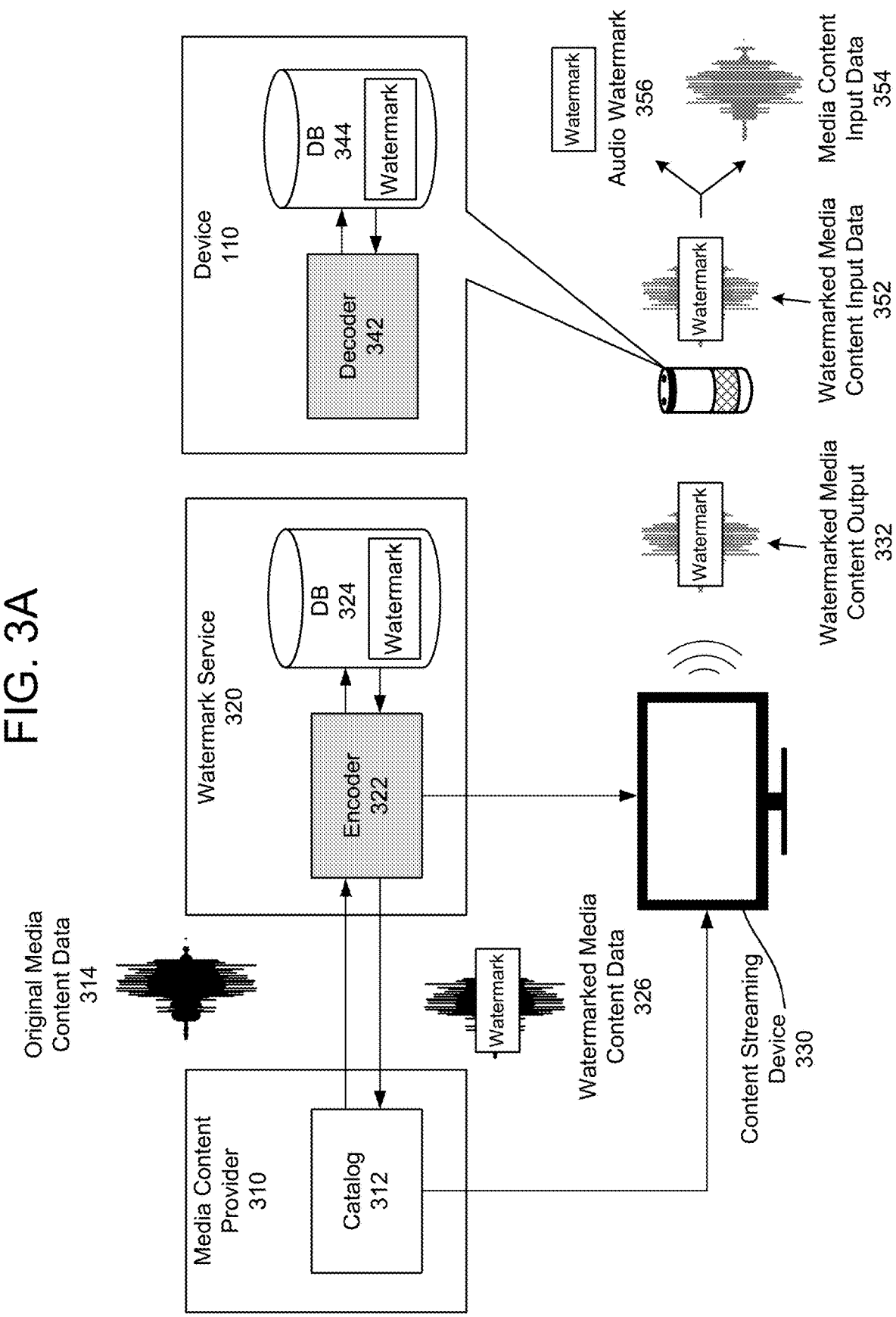
FIGS. 3A-3B illustrate examples of a component diagram for encoding media content according to embodiments of the present disclosure.
Figure 3B:
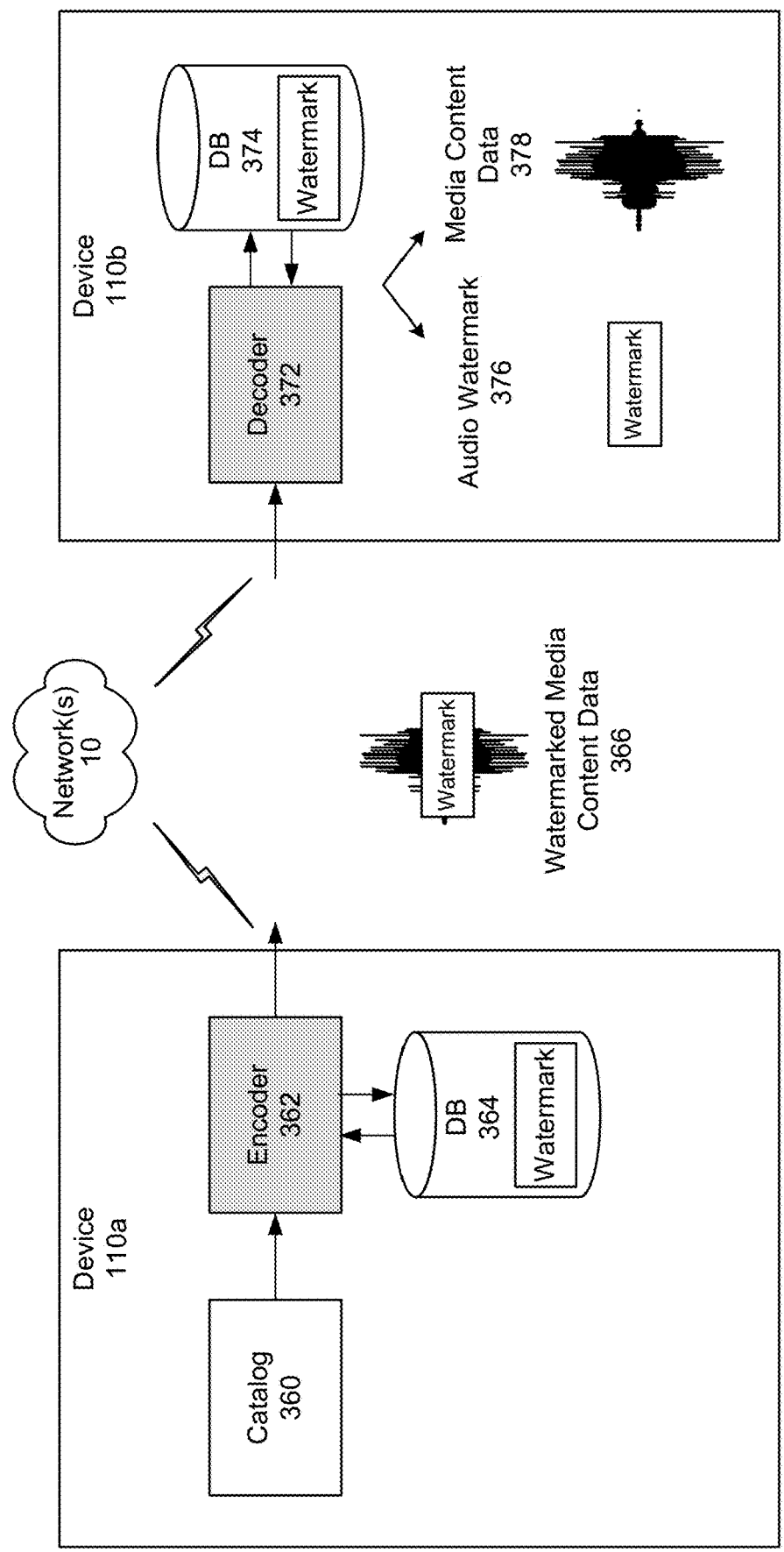

FIGS. 3A-3B illustrate examples of a component diagram for encoding media content according to embodiments of the present disclosure. Referring back to FIG. 2A, embedding an audio watermark in media content may enable wakeword suppression during playback of the media content. As an example of media content, FIG. 3A illustrates a media content provider 310 including a catalog 312 of media content, such as original media content data 314. For example, the media content provider 310 may be a streaming service that streams the original media content data 314 to the device(s) 110 (e.g., a subscription streaming service). However, the disclosure is not limited thereto and the media content provider 310 may correspond to any source of media content, including network storage or other local devices that are accessible only to the user 5. In addition, the media content may correspond to any media content known to one of skill in the art, including audio data (e.g., music, radio stations, etc.), video data (e.g., television shows, movies, home videos, etc.), and/or the like.

In some examples, the system 100 may monitor the original media content data 314 while streaming the original media content data 314 to a content streaming device 330 in order to detect representation(s) of a wakeword and embed an audio watermark within each representation of the wakeword. For example, the media content provider 310 may send the original media content data 314 to the content streaming device 330 via a watermark service 320. The watermark service 320 may include an encoder 322 and a watermark database 324 and the watermark service 320 may embed audio watermarks in the original media content data 314 to generate watermarked media content data 326. In this implementation, the watermark service 320 may store the watermarked media content data 326 and/or may directly stream the watermarked media content data 326 to the content streaming device 330. However, this implementation may consume a lot of resources and is inefficient as the system 100 must generate the watermarked media content data 326 each time the original media content data 314 is viewed by the user 5.

To improve efficiency, the media content provider 310 may instead send the original media content data 314 to the watermark service 320 a single time and may receive the watermarked media content data 326 from the watermark service 320. For example, media content provider 310 may send the original media content data 314 from the catalog 312 to the watermark service 320, the watermark service 320 may generate watermarked media content data 326 corresponding to the original media content data 314, and may send the watermarked media content data 326 back to the media content provider 310. Thus, the media content provider 310 may update the catalog 312 with the watermarked media content data 326 and may stream the watermarked media content data 326 directly to the content streaming device 330 in the future. Thus, this implementation embeds the audio watermarks a single time and reuses the watermarked media content data 326.

As illustrated in FIG. 3A, the content streaming device 330 may use the watermarked media content data 326 to generate watermarked media content output 332 via one or more loudspeaker(s). However, due to a distance between the one or more loudspeaker(s) of the content streaming device 330 and the device 110, the watermarked media content output 332 received by the device 110 includes distortion caused by reverberations (e.g., reflection/refraction of a sound wave inside a building structure). Thus, the watermarked media content output 332 captured by the device 110 is not identical to the watermarked media content 326, which is illustrated in FIG. 3A as the waveform changing shape and color (e.g., from black to gray). While there are multiple conventional techniques for detecting audio watermarks within digital audio data, the distortion caused by reverberation results in many of these techniques being unable to accurately detect the audio watermark after watermarked audio data is output by loudspeaker(s) and recaptured by microphone(s).

In contrast, the system 100 is configured to detect the audio watermark despite the effects of reverberation. For example, the device 110 may include a decoder 342 and a watermark database 344. The device 110 may capture the watermarked media content output 332 using the microphone array 112 and generate watermarked media content input data 352. Using the decoder 342 and/or the watermark database 344, the device 110 may detect an audio watermark 356 embedded within the watermarked media content input data 352 and the device 110 may generate media content input data 354 and the audio watermark 356.

As will be discussed in greater detail below with regard to at least FIGS. 6 and 8, the decoding algorithm used by the system 100 is able to detect the audio watermark 356 despite the effects of reverberation by performing a self-correlation. For example, while a cross-correlation between an ideal representation of the audio watermark 356 (e.g., without distortion) and the watermarked media content input data 352 may be unable to accurately detect the audio watermark 356, the system 100 may perform a cross-correlation between a first portion of the watermarked media content input data 352 and a second portion of the watermarked media content input data 352. As the encoder 322 repeats the audio watermark 356 across two or more portions of the watermarked media content data 326, the effects of reverberation are applied equally to both a first representation of the audio watermark 356 included in the first portion and a second representation of the audio watermark 356 included in the second portion.

While FIG. 3A illustrates an example of generating output audio using loudspeaker(s) and detecting the audio watermark 356 despite the effects of reverberation, the disclosure is not limited thereto. Instead, the audio watermark may be embedded in audio data for copyright protection, without regard to whether the watermarked audio data will be output by loudspeaker(s). For example, the audio watermark may be embedded in media content data and transmitted digitally to a remote device, and the remote device may detect the audio watermark prior to generating any output audio. An example implementation is illustrated in FIG. 3B.

As illustrated in FIG. 3B, a first device 110a may include a catalog 360 of media content data, an encoder 362, and a watermark database 364. The first device 110a may use the encoder 362 to embed an audio watermark in media content data to generate watermarked media content data 366 and may send the watermarked media content data 366 to a second device 110b via network(s) 10 (e.g., using wired network(s), wireless network(s), and/or a combination thereof).

The second device 110b may receive the watermarked media content data 366 as a digital copy. The watermarked media content data 366 may have been subjected to multiple transmission channels, including encoding/decoding and/or compression, but the watermarked media content data 366 received by the second device 110b is substantially similar to when it was originally transmitted by the first device 110a. The second device 110b may include a decoder 372 and a watermark database 374 and may separate the audio watermark 376 from the media content data 378. As a result of detecting the audio watermark 376, the second device 110b may perform an action corresponding to the audio watermark 376. For example, the second device 110b may apply copyright protection, preventing output of the media content data 378, copying of the media content data 378, and/or the like, although the disclosure is not limited thereto.

Figure 4B:
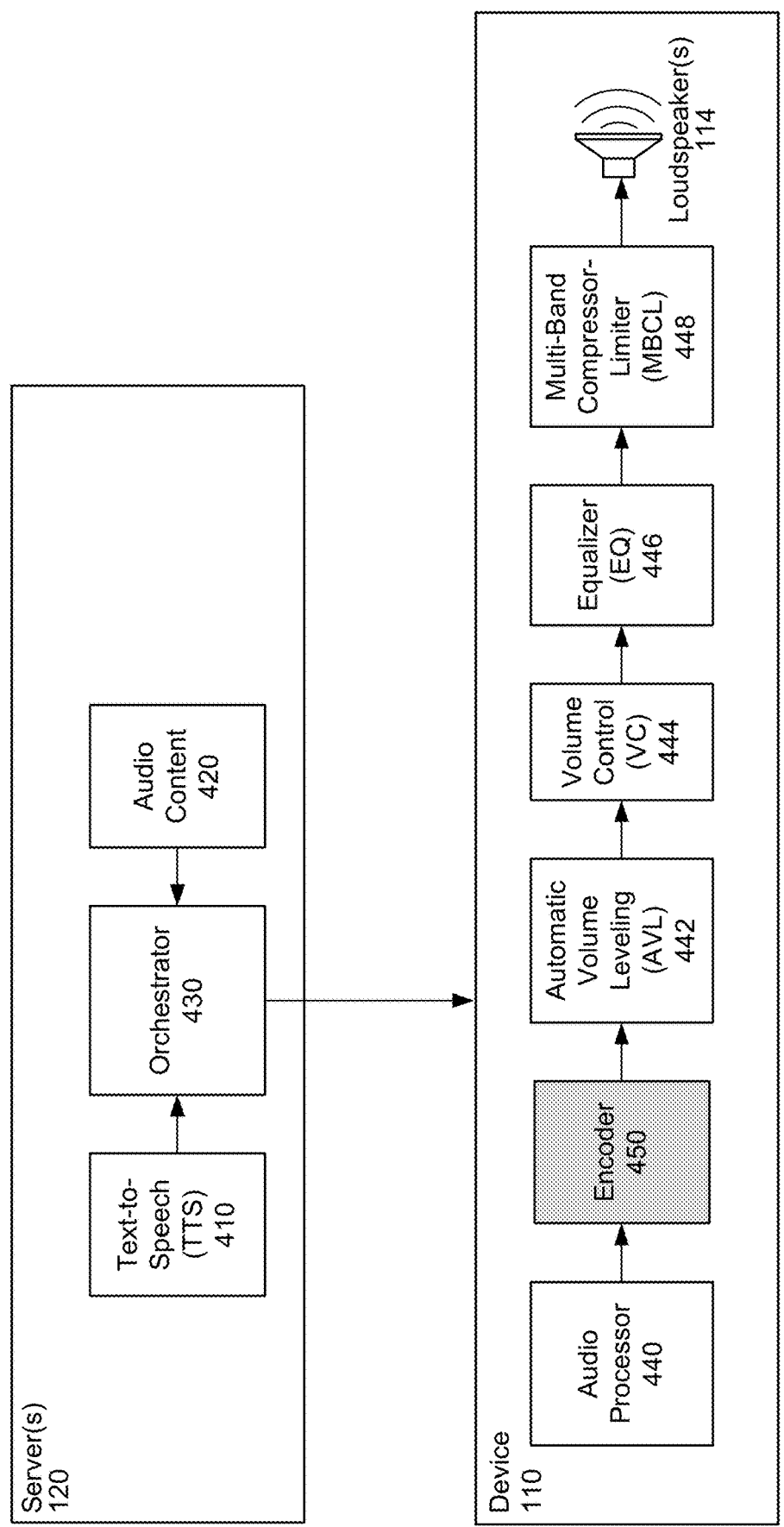
Figure 4C:
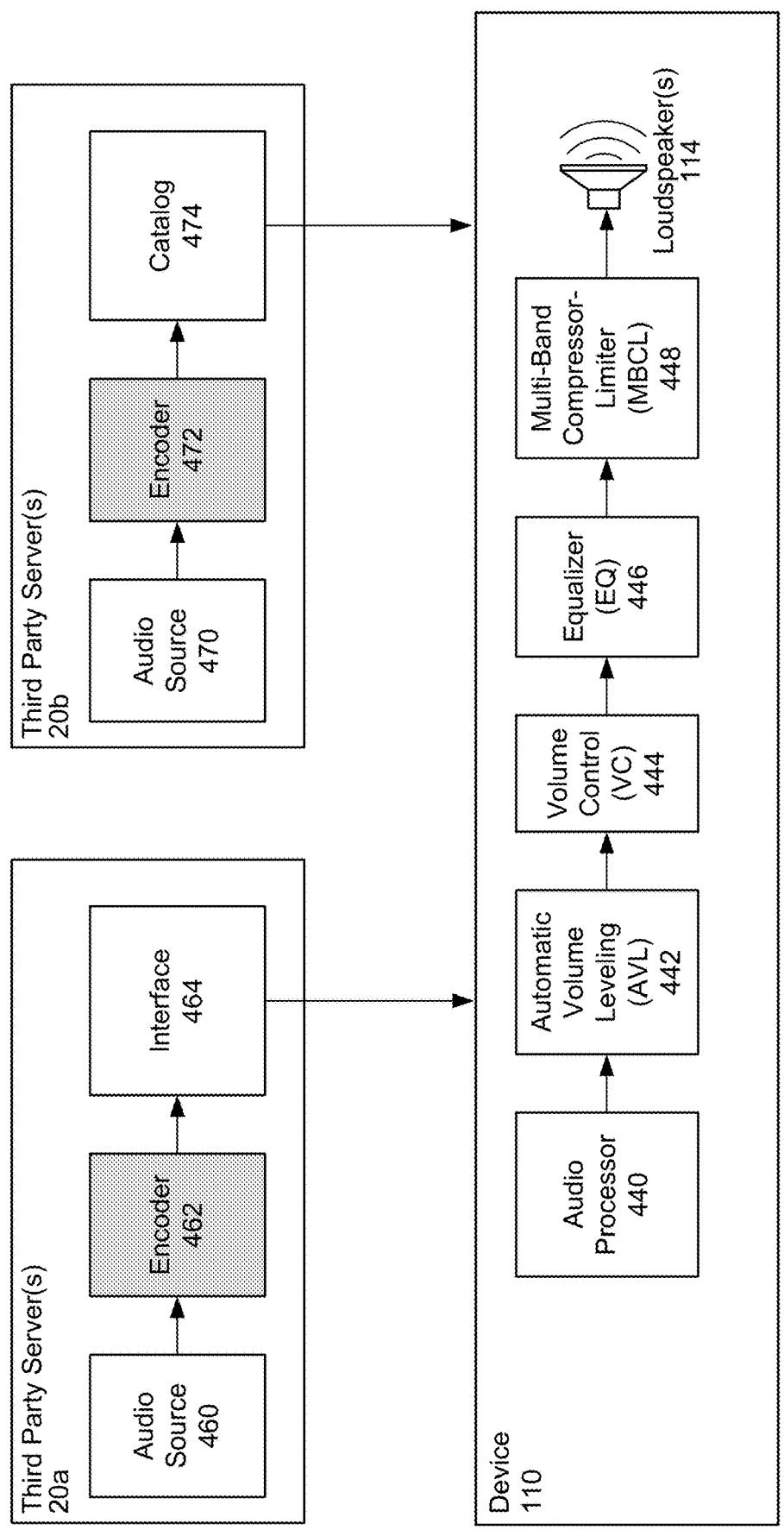

FIGS. 4A-4C illustrate examples of component diagrams for encoding audio watermarks according to embodiments of the present disclosure. As illustrated in FIG. 4A, the server(s) 120 may encode audio watermarks using one or more encoders located along one or more audio paths.

As a first example, FIG. 4A illustrates a first encoder (e.g., encoder 412) along a first audio path (e.g., text-to-speech audio path). For example, the encoder 412 may be included as part of a text-to-speech (TTS) 410 component operating on the server(s) 120. Thus, the TTS 410 component may generate first audio data corresponding to synthesized speech and the encoder 412 may generate second audio data by embedding the audio watermarks. Therefore, TTS output data generated by the TTS 410 component may include one or more embedded audio watermarks. While FIG. 4A illustrates the encoder 412 as part of the TTS 410 component, the disclosure is not limited thereto and the encoder 412 may be separate from the TTS 410 component without departing from the disclosure.

As a second example, FIG. 4A illustrates a second encoder (e.g., encoder 422) along a second audio path (e.g., audio content path). For example, the encoder 422 may be an independent component that receives first audio data from an audio source 420 and may generate second audio data by embedding the audio watermark(s) in the first audio data. In contrast to the TTS audio path, which generates synthesized speech, the audio content path corresponds to non-TTS audio data, such as audio data corresponding to speech (e.g., pre-recorded first speech stored in a database, second speech generated by a remote user during a conversation, etc.), media content (e.g., pre-recorded audio sounds, pre-generated audio clips or audio recordings, audio associated with a video, etc.), and/or the like. Therefore, audio content data originating from the audio source 420, which can be a remote device, remote storage, a database of audio data, and/or the like, may be modified by embedding audio watermarks.

While FIG. 4A illustrates the server(s) 120 including the first encoder 412 and the second encoder 422, the disclosure is not limited thereto. Instead, the server(s) 120 may include the first encoder 412, the second encoder 422, and/or both the first encoder 412 and the second encoder 422 without departing from the disclosure.

Whether generated by the TTS 410 component or originating from the audio source 420, the first watermarked output audio data is sent to the orchestrator 430 of the server(s) 120 and the orchestrator 430 sends the first watermarked output audio data to the device 110 to be output via the loudspeaker(s). To illustrate an example audio path associated with outputting the first watermarked output audio data, the device 110 may modify the first watermarked output audio data using an audio processor 440, an automatic volume leveling (AVL) 442 component (which may correspond to an automatic volume leveling and control (AVCL) component), a volume control (VC) 444 component, an equalizer (EQ) 446 component, and/or a multi-band compressor-limiter (MBCL) 448 component to generate the second watermarked output audio data to be sent to the loudspeaker(s) 114.

Instead of or in addition to encoding the audio watermark on the server(s) 120, in some examples the device 110 may include an encoder 450 and may encode the audio watermark(s) directly. As illustrated in FIG. 4B, the server(s) 120 may not include an encoder and may send first audio data without audio watermarks to the device 110. The device 110 may process the first audio data and generate watermarked second audio data using the encoder 450. While FIG. 4B illustrates the encoder 450 in a specific location along the audio pipeline, the disclosure is not limited thereto and a location of the encoder 450 may vary without departing from the disclosure.

FIG. 4A only illustrates the server(s) 120 being configured to perform watermark encoding, whereas FIG. 4B only illustrates the device 110 being configured to perform watermark encoding. However, the disclosure is not limited thereto, and in some examples both the server(s) 120 and the device 110 may be configured to perform watermark encoding. For example, while the server(s) 120 may perform a majority of the audio watermark encoding, the device 110 may be configured to embed audio watermarks in certain situations.

While FIGS. 4A-4B illustrate the server(s) 120 and/or the device 110 performing watermark encoding, the disclosure is not limited thereto. As illustrated in FIG. 3A, a separate device (e.g., watermark service 320) may perform the watermark encoding without departing from the disclosure. However, while FIG. 3A illustrated the watermarked media content being output via loudspeaker(s) prior to being decoded, the disclosure is not limited thereto. Instead, FIG. 4C illustrates examples of a third party device or third party server(s) performing watermark encoding to generated watermarked audio data and the watermarked audio data being decoded prior to being output via loudspeaker(s). For example, the watermarked audio data may be generated and transmitted digitally to the device 110, and the device 110 may detect the audio watermark prior to generating any output audio via the loudspeaker(s) 114.

As a first example, FIG. 4C illustrates a first encoder (e.g., encoder 462) included within third party server(s) 20a along a first audio path. As illustrated in FIG. 4C, the first encoder 462 may perform watermark encoding during transmission of first audio data. For example, the first audio data may originate at an audio source 460 and may be sent to encoder 462, which generates second audio data by embedding an audio watermark within the first audio data. The second audio data is then sent to interface 464, which sends the second audio data to the device 110.

As a second example, FIG. 4C illustrates a second encoder (e.g., encoder 472) included within third party server(s) 20b along a second audio path, similar to the example illustrated in FIG. 3A. As illustrated in FIG. 4C, the second encoder 472 may perform watermark encoding prior to transmission. For example, third audio data may originate at an audio source 470 and may be sent to encoder 472, which generates fourth audio data by embedding an audio watermark within the third audio data. The fourth audio data is then sent to catalog 474, which stores the fourth audio data. At a later point in time, the device 110 may send a request to the third party server(s) 20b to receive the fourth audio data, and the catalog 474 may send the fourth audio data (e.g., watermarked audio data) to the device 110.

While FIGS. 4A-4C illustrate the device 110, the server(s) 120, and/or the third party server(s) 20 including a number of components, this is intended as an illustrative example and the disclosure is not limited thereto. Instead, the device 110, the server(s) 120, and/or the third party server(s) 20 may include additional components not illustrated in FIGS. 4A-4C and/or may omit components illustrated in FIGS. 4A-4C.

Figure 5A:
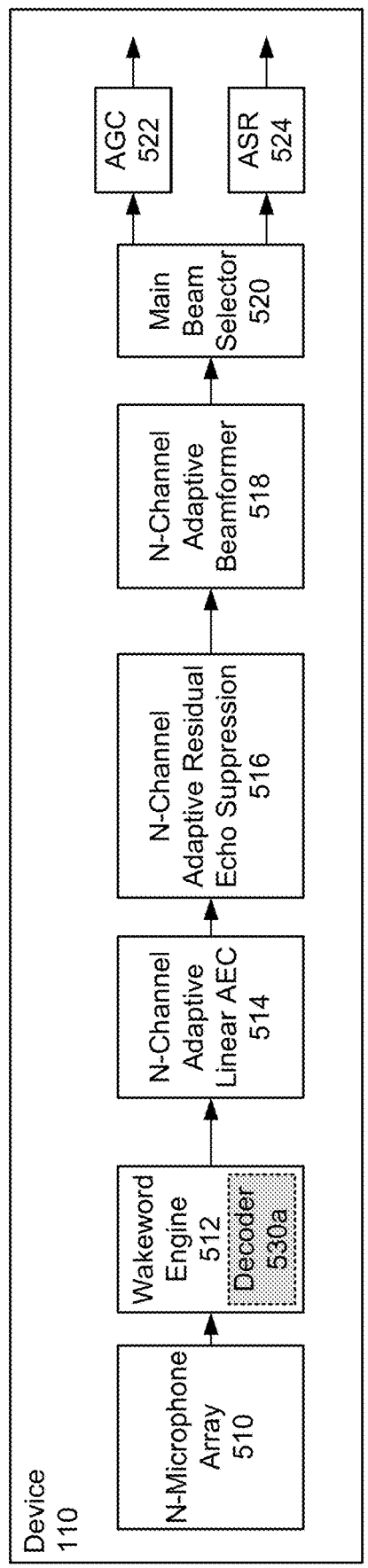
FIGS. 5A-5D illustrate examples of component diagrams for decoding audio watermarks according to embodiments of the present disclosure.
Figure 5B:
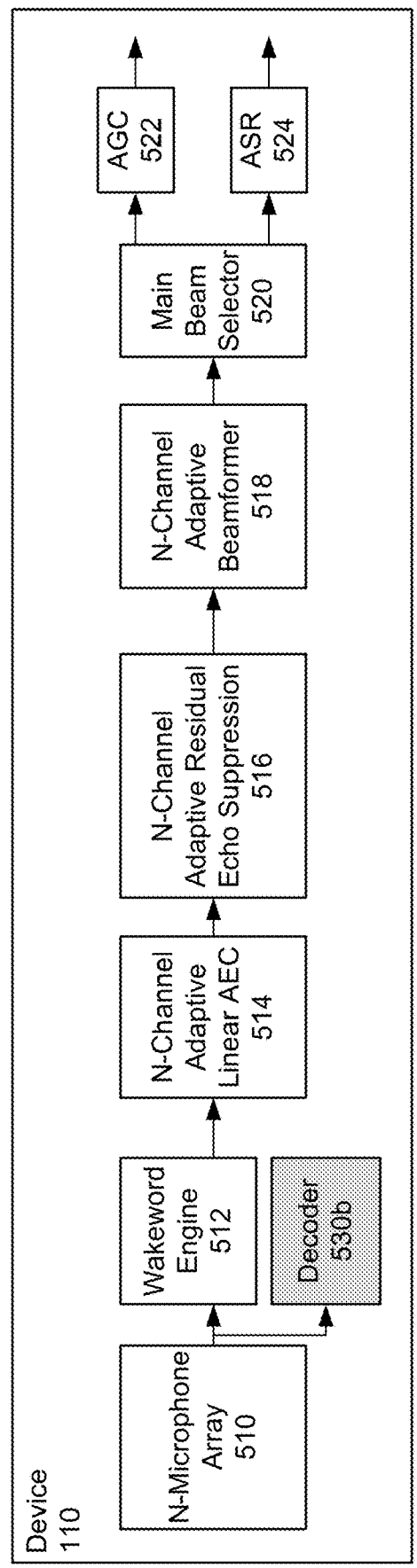

FIGS. 5A-5D illustrate examples of component diagrams for decoding audio watermarks according to embodiments of the present disclosure. As illustrated in FIGS. 5A-5B, the device 110 may include a decoder 430 configured to detect audio watermarks and the decoder 430 may be located along an input audio path. For example, the device 110 may include a number of components along the input audio path, such as an N-microphone array 510, a wakeword engine 512, an N-channel adaptive linear acoustic echo canceler (AEC) 514, an N-channel adaptive residual echo suppression 516, an N-channel adaptive beamformer 518, a main beam selector 520, adaptive gain control 522, and/or automatic speech recognition 524.

FIG. 5A illustrates a first example in which the decoder 530a is included in the wakeword engine 512. For example, as the wakeword engine 512 may process all inbound audio data generated by the microphone array 112, the device 110 may include the decoder 530a as part of the wakeword engine 512 and may use the decoder 530a to process all inbound audio data. However, the disclosure is not limited thereto. Instead, FIG. 5B illustrates a second example in which the decoder 530b is an independent device (e.g., separate from the wakeword engine 512) that receives duplicate copies of the audio data.

Figure 5C:
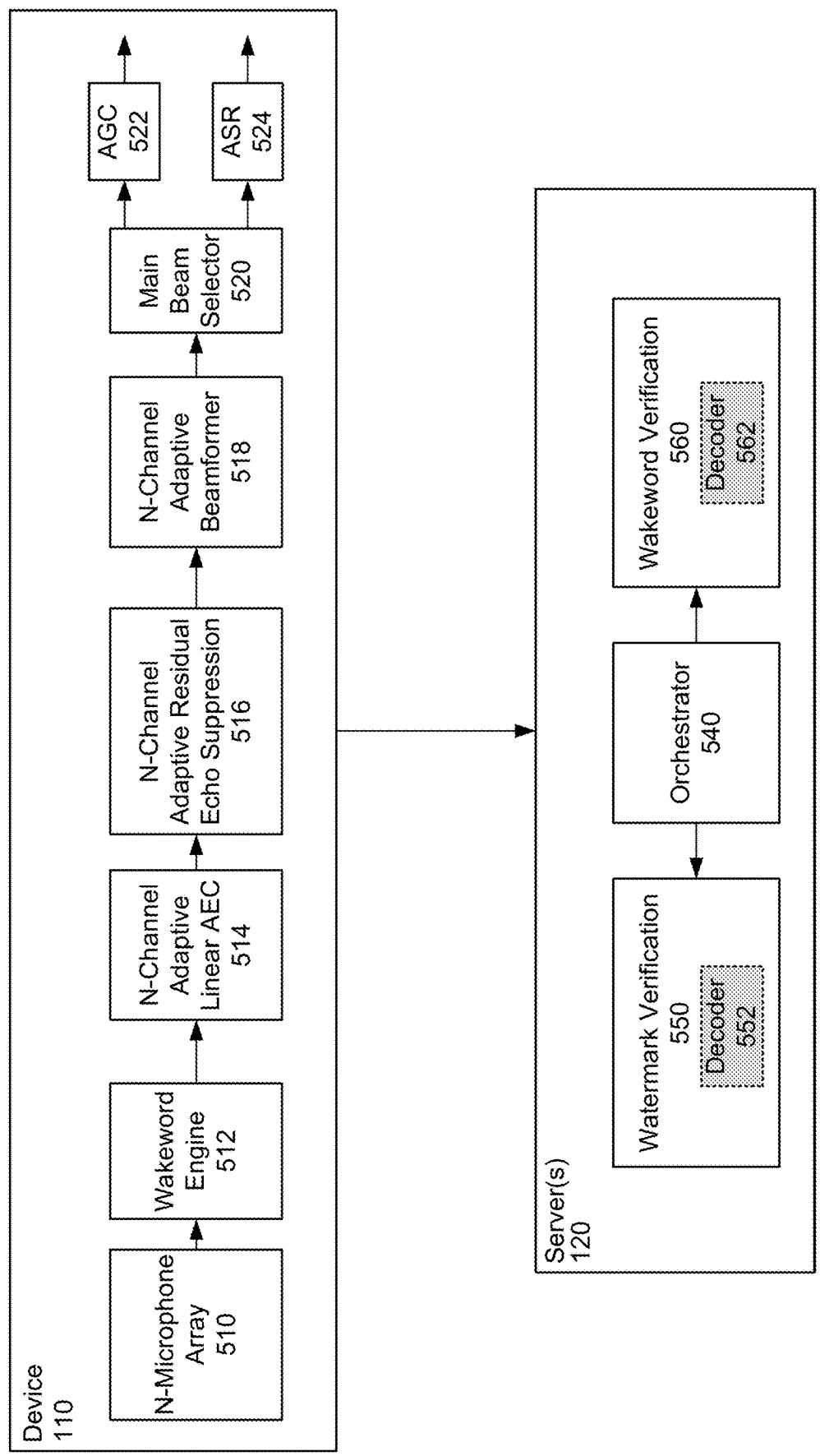

While FIGS. 5A-5B illustrate the device 110 including the decoder 530, the disclosure is not limited thereto. In addition to and/or instead of the device 110 including the decoder 530, the system 100 may detect audio watermark(s) using decoder(s) located in the server(s) 120. For example, FIG. 5C illustrates the server(s) 120 including a first decoder 552 that is incorporated into a watermark verification 550 component. In this example, the device 110 may perform real-time audio watermark detection using a local decoder 530 and the server(s) 120 may verify whether the audio watermarks were accurately detected. For example, the device 110 may send the audio data to the orchestrator 540 and the orchestrator 540 may send the audio data to the watermark verification 550 for decoding.

In some examples, however, instead of including an independent watermark verification 550 component, the server(s) 120 may modify an existing wakeword verification 560 component to include a decoder 562. For example, the server(s) 120 may already include the wakeword verification 560 component in order to verify whether wakewords are properly detected in the audio data or not. Thus, the orchestrator 540 receives the audio data from the device 110 and automatically sends the audio data to the wakeword verification 560 component. If the wakeword verification 560 component includes the decoder 562, the wakeword verification X560 component may use the decoder 562 to detect the audio watermark in the audio data along with verifying whether the wakeword is accurately detected.

As discussed above, in some examples the device 110 may include the decoder 530 and detect the audio watermark locally. Therefore, the server(s) 120 may include the first decoder 552 and/or the second decoder 562 in order to perform oversight by verifying an accuracy of the audio watermark detection. However, the disclosure is not limited thereto and in other examples, the device 110 may not include the decoder 530 and the server(s) 120 may include the first decoder 552 and/or the second decoder 562 and may detect all audio watermarks included in the audio data received from the device 110.

If the server(s) 120 include the decoder 552 and/or the decoder 562, the server(s) 120 may detect an audio watermark in the audio data as discussed above. Additionally or alternatively, the server(s) 120 may determine from which device the audio data originated. In some examples, the server(s) 120 may store an indication that the audio watermark was detected in the audio data, including an indication from which particular device the watermarked audio data originated and an indication of which particular device(s) detected the watermarked audio data. Thus, the server(s) 120 may store additional information associated with the generation and transmission of the audio watermark and/or the watermarked audio data. This information may be stored in a user profile, which the server(s) 120 and/or other systems or services can access to provide functionality to the user 5.

Figure 5D:
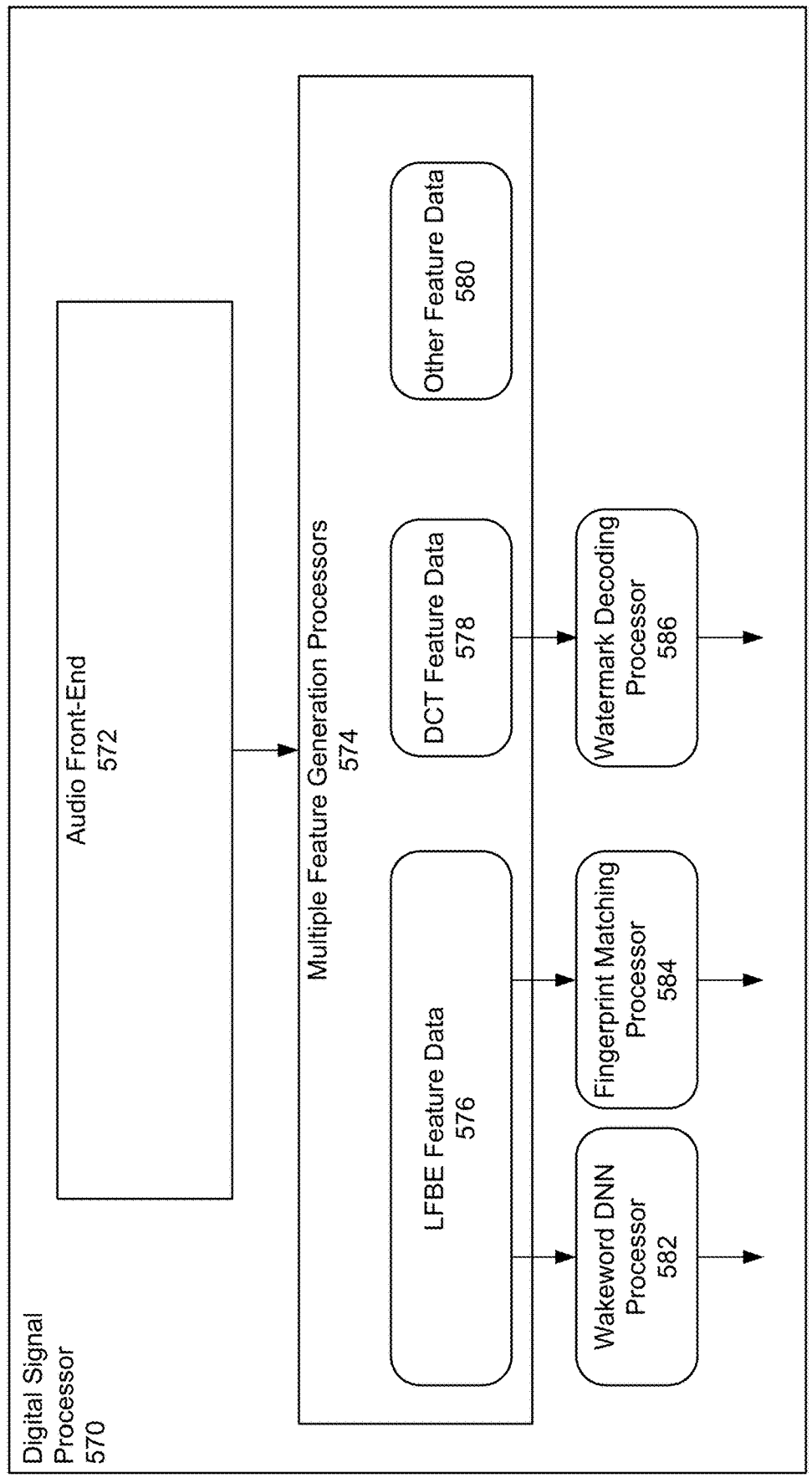

As illustrated in FIG. 5D, the device 110 may include a digital signal processor 570 that includes an audio front-end 572 and multiple feature generation processors 574. For example, the multiple feature generation processors 574 may generate Log-Filter Bank Energies (LFBE) feature data 576 (e.g., log-mel filter bank energy feature data), Discrete cosine transform (DCT) feature data 578, and/or other feature data 580.

The feature data may be input to different processors. For example, the LFBE feature data 576 may be input to a wakeword deep neural network (DNN) processor 582, a fingerprint matching processor 584, and/or the like. In contrast, the DCT feature data 578 may be input to a watermark decoding processor 586 to perform watermark decoding.

As mentioned above with regard to FIG. 3A, when an audio watermark is transmitted as a sound wave through the air, reverberations caused by reflection/refraction of the sound wave results in distortion. This distortion may impact an accuracy associated with detecting audio watermarks using conventional techniques. To illustrate an example, a spread spectrum based watermark algorithm may use the following equation to embed an audio watermark:

$$|y\rangle = |x\rangle + |w\rangle \quad [1]$$

where $|y\rangle$ is the watermark embedded audio sequence, $|x\rangle$ is the original audio signal segment and $|w\rangle$ is the audio watermark. For ease of illustration, the disclosure will use Dirac notation (e.g., Bra-ket notation), with bra-A $\langle A|$ denoting a row vector $\langle A| \doteq (A^*_1 \ A^*_2 \ \ldots \ A^*_N)$, ket-B $|B\rangle$ denoting a column vector $$|B\rangle \doteq \begin{pmatrix} B_1 \\ B_2 \\ \vdots \\ B_N \end{pmatrix},$$

and an inner product of two vectors (e.g., the bra-A and the ket-B) expressed as $\langle A|B\rangle$. The inner product can also be written as a matrix multiplication of a row vector with a column vector, such as:

$$\langle A|B\rangle \doteq A^*_1 B_1 + A^*_2 B_2 + \ldots + A^*_N B_N = (A^*_1 \ A^*_2 \ \ldots \ A^*_N)\begin{pmatrix} B_1 \\ B_2 \\ \vdots \\ B_N \end{pmatrix} \quad [2]$$

As illustrated in Equation [2], the inner product corresponds to a sum of products between element i of the bra-A and element i of the ket-B.

The effect of reverberation α can be shown in the time domain:

$$y(t) = \int dt' y(t') \alpha(t-t') \quad [3]$$

and in the frequency domain:

$$\tilde{y}(q) = y(q)\alpha(q) \quad [4]$$

where t indicates time and q indicates frequency. Therefore, if α(q) corresponds to a fast oscillation function, the spread-spectrum based audio watermark detection score will be destroyed based on the following:

$$\langle w | \tilde{y} \rangle^q = \langle w | (x+w) \times \alpha \rangle^q \quad [5]$$
$$= \langle w | x\alpha \rangle^q + \langle w | w\alpha \rangle^q$$

where w is the audio watermark, $\tilde{y}(q)$ is the received embedded audio sequence in the frequency domain, $\langle w|\tilde{y}\rangle^q$ is the inner product of the audio watermark w and the received embedded audio sequence $\tilde{y}(q)$, x is the original audio segment, α is the reverberation function, and the value of $\langle w|w\alpha\rangle^q$ is close to the noise level. To phrase this differently, the original audio watermark |w⟩ used to encode the audio watermark does not accurately detect the received audio watermark |wα⟩ distorted due to the reverberation α.

To illustrate an example, conventional techniques may generate the watermark embedded audio sequence |y⟩ using the original audio watermark |w⟩. When the watermark embedded audio sequence |y⟩ is not distorted by the reverberation α, such as when detecting an audio watermark within digital audio data that was never converted to sound waves and/or when the sound waves traveled a very short distance (e.g., distance between the loudspeaker(s) and the microphone(s) is relatively small), conventional techniques may detect that the audio watermark is present using the original audio watermark |w⟩. However, when the watermark embedded audio sequence |y⟩ is used to generate output audio via loudspeaker(s) and corresponding sound waves travel a longer distance (e.g., distance between the loudspeaker(s) and the microphone(s) is relatively large) before being captured by the microphone array as input audio data, the original audio watermark |w⟩ does not correspond to the received audio watermark |wα⟩ distorted due to the reverberation α and therefore the conventional techniques may be unable to detect the audio watermark in the input audio data.

FIG. 6 illustrates an example of a self-correlation algorithm according to embodiments of the present disclosure. As the reverberation function α does not change drastically between time segments, the system 100 may use a self-correlation algorithm to minimize the oscillations and decode the audio watermark. As illustrated in FIG. 6, the self-correlation algorithm consists of two portions, with the audio watermark |w⟩ being repeated in a first portion a and a second portion b. As the audio watermark |w⟩ is repeated, a first received audio watermark |$w_a\alpha$⟩ represented within the first portion a corresponds to a second received audio watermark |$w_b\alpha$⟩ represented within the second portion b. Thus, the system 100 may perform self-correlation by determining a cross-correlation between the first portion a and the second portion b and may detect the audio watermark. As illustrated in FIG. 6:

Encoder: [5]

$$|y\rangle = |y_a\rangle^t \oplus |y_b\rangle^t$$
$$= |x_a + w\rangle^t \oplus |x_b + w\rangle^t$$

Decoder:

$$\langle \tilde{y}_a | \tilde{y}_b \rangle^q = \langle (x_a + w_a) \times \alpha | (x_b + w_b) \times \alpha \rangle^q$$
$$= \langle x_a \alpha | x_b \alpha \rangle^q + \langle w_a \alpha | w_b \alpha \rangle^q + \langle w_a \alpha | x_b \alpha \rangle^q +$$
$$\langle x_a \alpha | w_b \alpha \rangle^q$$
$$\simeq \langle x_a | x_b \alpha^2 \rangle^q + \langle w_a | w_b \alpha^2 \rangle^q$$

where |y⟩ is the transmitted watermark embedded audio sequence, $|y_a\rangle^t$ is a first portion of the transmitted watermark embedded audio sequence associated with the first portion a, $|y_b\rangle^t$ is a second portion of the transmitted watermark embedded audio sequence associated with the second portion b, ⊕ denotes a direct sum, $x_a$ is a first portion of the original audio signal segment associated with the first portion a, $x_b$ is a second portion of the original audio signal segment associated with the second portion b, w is the transmitted audio watermark, $\tilde{y}_a$ is a first portion of a received watermark embedded audio sequence associated with the first portion a, $\tilde{y}_b$ is a second portion of the received watermark embedded audio sequence associated with the second portion b, $\langle \tilde{y}_a|\tilde{y}_b\rangle^q$ is the inner product of the first portion $\tilde{y}_a$ and the second portion $\tilde{y}_b$, $x_a$ is a first portion of the original audio segment associated with the first portion a, $x_b$ is a second portion of the original audio segment associated with the second portion b, $w_a$ is a first representation of the audio watermark associated with the first portion a, $w_b$ is a second representation of the audio watermark associated with the second portion b, α is the reverberation function, $\langle x_a|x_b\rangle$ is the inner product of the first portion $x_a$ and the second portion $x_b$, and $\langle w_a|w_b\rangle$ is the inner product of the first representation $w_a$ and the second representation $w_b$.

As illustrated in Equation [5], the value of cross-terms $\langle w_a\alpha|x_b\alpha\rangle^q$ and $\langle x_a\alpha|w_b\alpha\rangle^q$ will be close to noise level and can be ignored. Thus, the inner product $\langle \tilde{y}_a|\tilde{y}_b\rangle^q$ effectively corresponds to two elements: a first inner product $\langle x_a|x_b\rangle$ between the first portion a and the second portion b of the original audio segment, and a second inner product $\langle w_a|w_b\rangle$ between the first representation $w_a$ and the second representation $w_b$ of the audio watermark. When the original audio segment is not repetitive (e.g., $x_a \neq x_b$), the first inner product $\langle x_a|x_b\rangle$ may be effectively ignored and thus the inner product $\langle \tilde{y}_a|\tilde{y}_b\rangle^q$ corresponds to the audio watermark. As a result, the system 100 may detect a location of the audio watermark by determining the inner product $\langle \tilde{y}_a|\tilde{y}_b\rangle^q$.

However, when the original audio segment is repetitive (e.g., $x_a \sim x_b$), the first inner product $\langle x_a|x_b\rangle$ may result in interference that prevents the system 100 from accurately detecting the audio watermark. For example, FIG. 6 illustrates music chords interfering with the self-correlation algorithm, preventing the system 100 from detecting a clear peak associated with the audio watermark.

To improve detection of the audio watermark, the system 100 may modify the self-correlation algorithm to include additional elements. For example, the system 100 may use an eigenvector matrix as a building block for the audio watermark and may apply a sign sequence to the eigenvector matrix in order to cancel repetitive portions of the original audio segment. In addition, as will be discussed in greater detail below, the system 100 may generate an encoding algorithm that incorporates several discrete concepts, such as the eigenvector matrix, applying the sign sequence, applying neighborhood de-noise, performing segment normalization, and embedding the audio watermark using a guard band. As a result of these improvements, the system 100 may accurately detect the audio watermark using a decoding algorithm that performs the self-correlation discussed above using the eigenvector matrix, applies sign-correction using the sign sequence after canceling repetitive portions of the original audio segment, and performs memorization of segment contraction to reduce a number of computations and/or processing requirement associated with detecting the audio watermark.

Figure 7:
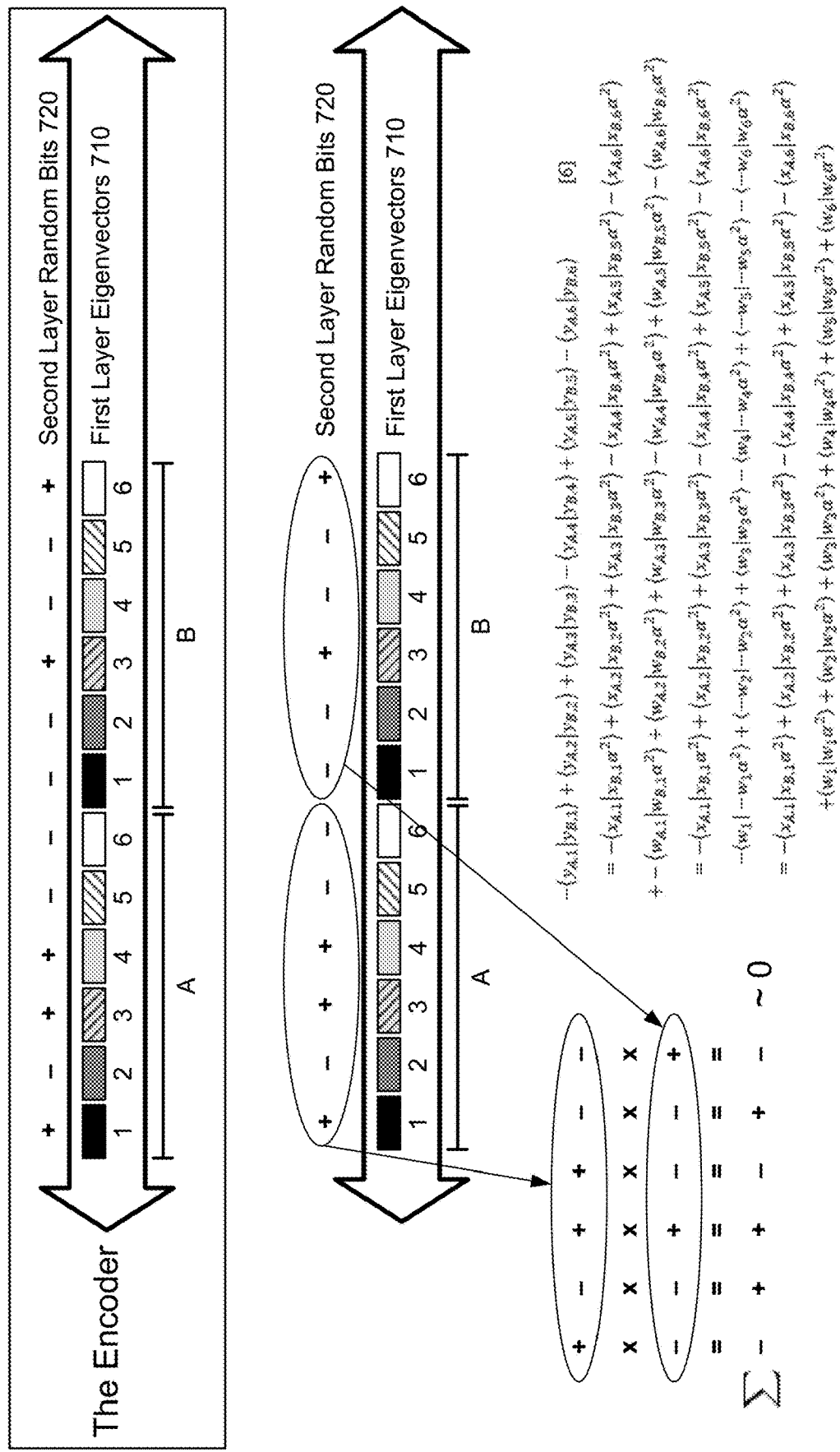
FIG. 7 illustrates an example of a bi-layer watermark encoding structure according to embodiments of the present disclosure.

FIG. 7 illustrates an example of a bi-layer watermark encoding structure according to embodiments of the present disclosure. The bi-layer watermark encoding structure illustrated in FIG. 7 corresponds to two layers, a first layer comprising an eigenvector matrix as a building block for the audio watermark, and a second layer that applies a sign sequence to the eigenvector matrix in order to cancel repetitive portions of the original audio segment.

As illustrated in FIG. 7, the first layer Eigenvectors 710 correspond to a series of segments, with the entire series repeating a certain number of times. For example, the first layer Eigenvectors 710 include six segments (e.g., segment 1-6) that repeats twice (e.g., portion A and portion B). Thus, the first portion corresponds a first series of segments A1-A6 and the second portion corresponds to a second series of segments B1-B6. However, the disclosure is not limited thereto and the number of segments and/or the number of repetitions may vary without departing from the disclosure.

In linear algebra, an Eigenvector or characteristic vector of a linear transformation is a non-zero vector that changes by only a scalar factor when that linear transformation is applied. For example, Eigenvectors may be a set of orthonormal vectors:

$$\langle m|n \rangle = \delta_{m,n} \qquad [5.1]$$

where an Eigenvector generating matrix can be defined:

$$\hat{H} = \begin{bmatrix} a_{11} & a_{12} & \cdots & a_{1n} \\ a_{21} & a_{22} & & a_{2n} \\ \vdots & & \ddots & \vdots \\ a_{n1} & a_{n2} & \cdots & a_{nn} \end{bmatrix} \qquad [5.2]$$

where $\hat{H}$ is designed to be symmetric or hermitian matrix:

$$a_{ij} = a_{ji}$$

$$a_{ij} = a^*_{ji} \qquad [5.3]$$

Accordingly, $a_{ij}$ are a set of random numbers. As the disclosure is directed to applying discrete cosine transform (DCT) based watermark encoding algorithms, the disclosure will only focus on real numbers of $a_{ij}$. Throughout the diagonalization of $\hat{H}$ we can get corresponding Eigenvalue and Eigenvectors:

$$\hat{H}|w_n\rangle = E_n|w_n\rangle \qquad [5.4]$$

The first layer Eigenvectors 710 make use of the same concept as the self-correlation algorithm. For example, a first segment of the first portion (A1) and a first segment of the second portion (B1) may use a first audio watermark value, a second segment of the first portion (A2) and a second segment of the second portion (B2) may use a second audio watermark value, and so on. Thus, the system 100 may detect the audio watermark by performing a cross-correlation between the first portion A and the second portion B, with a strong correlation existing between segments A1-B1, A2-B2, A3-B3, A4-B4, A5-B5, and A6-B6. While repetitive chords or other repetitions in the original audio segment may interfere with detecting each peak associated with the corresponding segments, the system 100 may detect the audio watermark and/or determine a beginning of the audio watermark using only the first layer Eigenvectors 710 without departing from the disclosure.

To improve the detection of the audio watermark, however, the system 100 may apply the sign sequence to the Eigenvector matrix to remove the interference caused by repetitions in the original audio segment. The sign sequence corresponds to a series of positive or negative values (e.g., +1 or −1) which is applied to the first layer Eigenvectors 710 to modify the binary phase of the first layer Eigenvectors 710. The sign sequence is illustrated in FIG. 7 as second layer random bits 720.

As illustrated in FIG. 7, a first portion of the second layer random bits 720 (e.g., first sign changes associated with portion A) is applied to the first repetition of the first layer Eigenvectors 710 (e.g., A1-A6) and a second portion of the second layer random bits 720 (e.g., second sign changes associated with portion B) is applied to the second repetition of the first layer Eigenvectors 710 (e.g., B1-B6). The second layer random bits 720 enables the system 100 to detect the audio watermark whether the original audio segment is repetitive (e.g., $x_a$ correlates to $x_b$) or not.

As discussed above and illustrated in Equation [5], the inner product $\langle \tilde{y}_a|\tilde{y}_b \rangle^q$ (e.g., cross-correlation between the first portion A and the second portion B) effectively corresponds to two elements: a first inner product $\langle x_a|x_b \rangle$ between the first portion $x_a$ and the second portion $x_b$ of the original audio segment, and a second inner product $\langle w_a|w_b \rangle$ between the first representation $w_a$ and the second representation $w_b$ of the audio watermark. When the original audio segment is not repetitive (e.g., $x_a \neq x_b$), the first inner product $\langle x_a|x_b \rangle$ may be effectively ignored and thus the inner product $\langle \tilde{y}_a|\tilde{y}_b \rangle^q$ corresponds to the audio watermark.

In contrast, when the original audio segment is repetitive (e.g., $x_a \sim x_b$), the first inner product $\langle x_a|x_b \rangle$ cannot be ignored. However, by applying the second layer random bits 720, the system 100 may cancel out the first inner product $\langle x_a|x_b \rangle$. For example, if an inner product for a first segment $\langle x_{a1}|x_{b1} \rangle$ has a different sign than an inner product for a second segment $\langle x_{a2}|x_{b2} \rangle$, the opposite signs cancel each other out. Thus, a sum of the first inner product $\langle x_a|x_b \rangle$ for each segment of the first layer Eigenvectors 710 may be equal to zero, enabling the system 100 to cancel the correlation associated with the original audio segment without cancelling the correlation associated with the audio watermark itself.

As illustrated on the bottom left in FIG. 7, the sign changes associated with the first portion A and the second portion B are multiplied for each segment. For example, an inner product of the first portion of the second layer random bits 720 and the second portion of the second layer random bits 720 results in a series of sign changes that correspond to the cross-correlation between the first portion A and the second portion B. This series of sign changes may apply separately to the first inner product $\langle x_a|x_b \rangle$ between the first portion $x_a$ and the second portion $x_b$ of the original audio segment and the second inner product $\langle w_a|w_b \rangle$ between the first representation $w_a$ and the second representation $w_b$ of the audio watermark, as shown in the equation illustrated on the bottom right of FIG. 7.

$$-\langle y_{A,1}|y_{B,1}\rangle + \langle y_{A,2}|y_{B,2}\rangle + \langle y_{A,3}|y_{B,3}\rangle - \qquad [6]$$

-continued $$\langle y_{A,4} | y_{B,4}\rangle + \langle y_{A,5} | y_{B,5}\rangle - \langle y_{A,6} | y_{B,6}\rangle =$$

$$-\langle x_{A,1} | x_{B,1}\alpha^2\rangle + \langle x_{A,2} | x_{B,2}\alpha^2\rangle + \langle x_{A,3} | x_{B,3}\alpha^2\rangle -$$

$$\langle x_{A,4} | x_{B,4}\alpha^2\rangle + \langle x_{A,5} | x_{B,5}\alpha^2\rangle - \langle x_{A,6} | x_{B,6}\alpha^2\rangle +$$

$$-\langle w_{A,1} | w_{B,1}\alpha^2\rangle + \langle w_{A,2} | w_{B,2}\alpha^2\rangle + \langle w_{A,3} | w_{B,3}\alpha^2\rangle -$$

$$\langle w_{A,4} | w_{B,4}\alpha^2\rangle + \langle w_{A,5} | w_{B,5}\alpha^2\rangle - \langle w_{A,6} | w_{B,6}\alpha^2\rangle =$$

$$-\langle x_{A,1} | x_{B,1}\alpha^2\rangle + \langle x_{A,2} | x_{B,2}\alpha^2\rangle + \langle x_{A,3} | x_{B,3}\alpha^2\rangle -$$

$$\langle x_{A,4} | x_{B,4}\alpha^2\rangle + \langle x_{A,5} | x_{B,5}\alpha^2\rangle - \langle x_{A,6} | x_{B,6}\alpha^2\rangle -$$

$$\langle w_1 | -w_1\alpha^2\rangle + \langle -w_2 | -w_2\alpha^2\rangle + \langle w_3 | w_3\alpha^2\rangle - \langle w_4 | -w_4\alpha^2\rangle +$$

$$\langle -w_5 | -w_5\alpha^2\rangle - \langle -w_6 | w_6\alpha^2\rangle = -\langle x_{A,1} | x_{B,1}\alpha^2\rangle +$$

$$\langle x_{A,2} | x_{B,2}\alpha^2\rangle + \langle x_{A,3} | x_{B,3}\alpha^2\rangle - \langle x_{A,4} | x_{B,4}\alpha^2\rangle +$$

$$\langle x_{A,5} | x_{B,5}\alpha^2\rangle - \langle x_{A,6} | x_{B,6}\alpha^2\rangle + \langle w_1 | w_1\alpha^2\rangle + \langle w_2 | w_2\alpha^2\rangle +$$

$$\langle w_3 | w_3\alpha^2\rangle + \langle w_4 | w_4\alpha^2\rangle + \langle w_5 | w_5\alpha^2\rangle + \langle w_6 | w_6\alpha^2\rangle$$

where $\langle y_{A,i}|y_{B,i}\rangle$ corresponds to an inner product of a first portion of the watermarked audio data and a second portion of the watermarked audio data, $\rangle x_{A,i}|x_{B,i}\rangle$ corresponds to an inner product of a first portion of the original audio data and a second portion of the original audio data, $\langle w_{A,i}|w_{B,i}\rangle$ corresponds to an inner product of a first representation of an audio watermark included in the first portion of the watermarked audio data and a second representation of the watermark included in the second portion of the watermarked audio data, and the first representation and the second representation correspond to an original watermark $w_i$, such that $\langle w_i|w_i\rangle$ corresponds to an inner product of the original watermark $w_i$ represented in the first portion of the watermarked audio data and original watermark $w_i$ represented in the second portion of the watermarked audio data.

As illustrated in Equation [6], the system 100 may perform sign correction such that each of the inner products associated with the audio watermark is positive. For example, the system 100 may include the sign indicated by the second layer random bits 720 in the encoding algorithm and may account for the second layer random bits 720 in the decoding algorithm, such that the second layer random bits 720 are squared and therefore positive. As a result, the inner products associated with the original audio data include positive and negative values, which may offset and/or reduce a contribution of the original audio data, while the inner products associated with the audio watermark include only positive values, increasing a contribution of the audio watermark.

Figure 8:
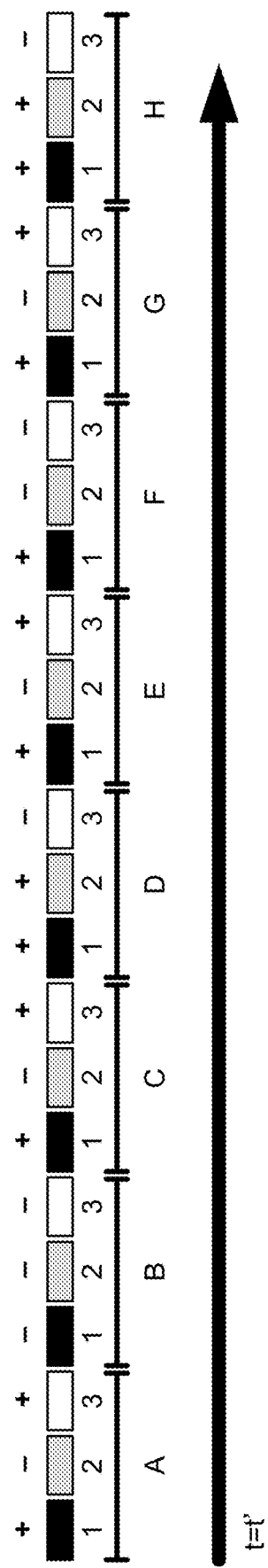
FIG. 8 illustrates an example of an encoding algorithm and a decoding algorithm according to embodiments of the present disclosure.

FIG. 8 illustrates an example of an encoding algorithm and a decoding algorithm according to embodiments of the present disclosure. Building upon the concepts illustrated in FIG. 7, the system 100 may encode the audio watermark using a number of different segments and/or a number of different repetitions. For example, FIG. 8 illustrates a watermark encoding structure 810 that comprises 3 segments of Eigenvectors (e.g., segments 1-3) and 8 repetitions (e.g., repetitions A-H).

FIG. 8 illustrates an encoding algorithm 820:

$$|y\rangle^t = \bigoplus_{n=1}^{N_{rep}} \bigoplus_{i=1}^{N_{seg}} (|x_{n,i}\rangle^t + \beta s_{n,i} g_{n,i} |w_i\rangle^t) \quad [7]$$

where $|y\rangle^t$ is the watermark embedded audio sequence, $N_{rep}$ is the number of repetitions of the Eigenvector, $N_{seg}$ is the number of segments included in each Eigenvector, $|x_{n,i}\rangle^t$ is the original audio sequence, $\beta$ is the encoding strength, $s_{n,i}$ is the sign sequence for a combination of the segments and repetitions, $g_{n,i}$ is the segment normalization factor, and $|w_i\rangle^t$ is the audio watermark.

Similarly, FIG. 8 illustrates a decoding algorithm 830:

$$\Gamma(t = t') \equiv \sum_{i=1}^{N_{seg}} \sum_{n=1}^{N_{rep}-1} \sum_{m=n+1}^{N_{rep}} \frac{s_{m,i} s_{n,i} \langle y_{m,i} | y_{n,i}\rangle_{lo\to hi}^q}{g_{m,i}^{lo\to hi} g_{n,i}^{lo\to hi}} \quad [8.1]$$

where $$g_{m,i}^{lo\to hi} \equiv \sqrt{\langle y_{m,i} | y_{m,i}\rangle_{lo\to hi}^q} \quad [8.2]$$

$$g_{n,i}^{lo\to hi} \equiv \sqrt{\langle y_{n,i} | y_{n,i}\rangle_{lo\to hi}^q} \quad [8.3]$$

where $\Gamma(t=t')$ is the decoding score, $N_{rep}$ is the number of repetitions of the Eigenvector, $N_{seg}$ is the number of segments included in each Eigenvector, $s_{m,i}$ is the sign sequence for a combination of the segments and repetitions for a first portion A, $s_{n,i}$ is the sign sequence for a combination of the segments and repetitions for a second portion B, $y_{m,i}$ is a first portion of a received watermark embedded audio sequence associated with the first portion A, $y_{n,i}$ is a second portion of the received watermark embedded audio sequence associated with the second portion B, $\langle y_{m,i}|y_{n,i}\rangle$ is the inner product of the first portion $y_{m,i}$ and the second portion $y_{n,i}$, $g_{m,i}$ is the segment normalization factor for the first portion A, $g_{n,i}$ is the segment normalization factor for the second portion B, and the notation lo→hi denotes that the frequency domain inner product only goes from $q_{lo}$ to $q_{hi}$.

Figure 9:
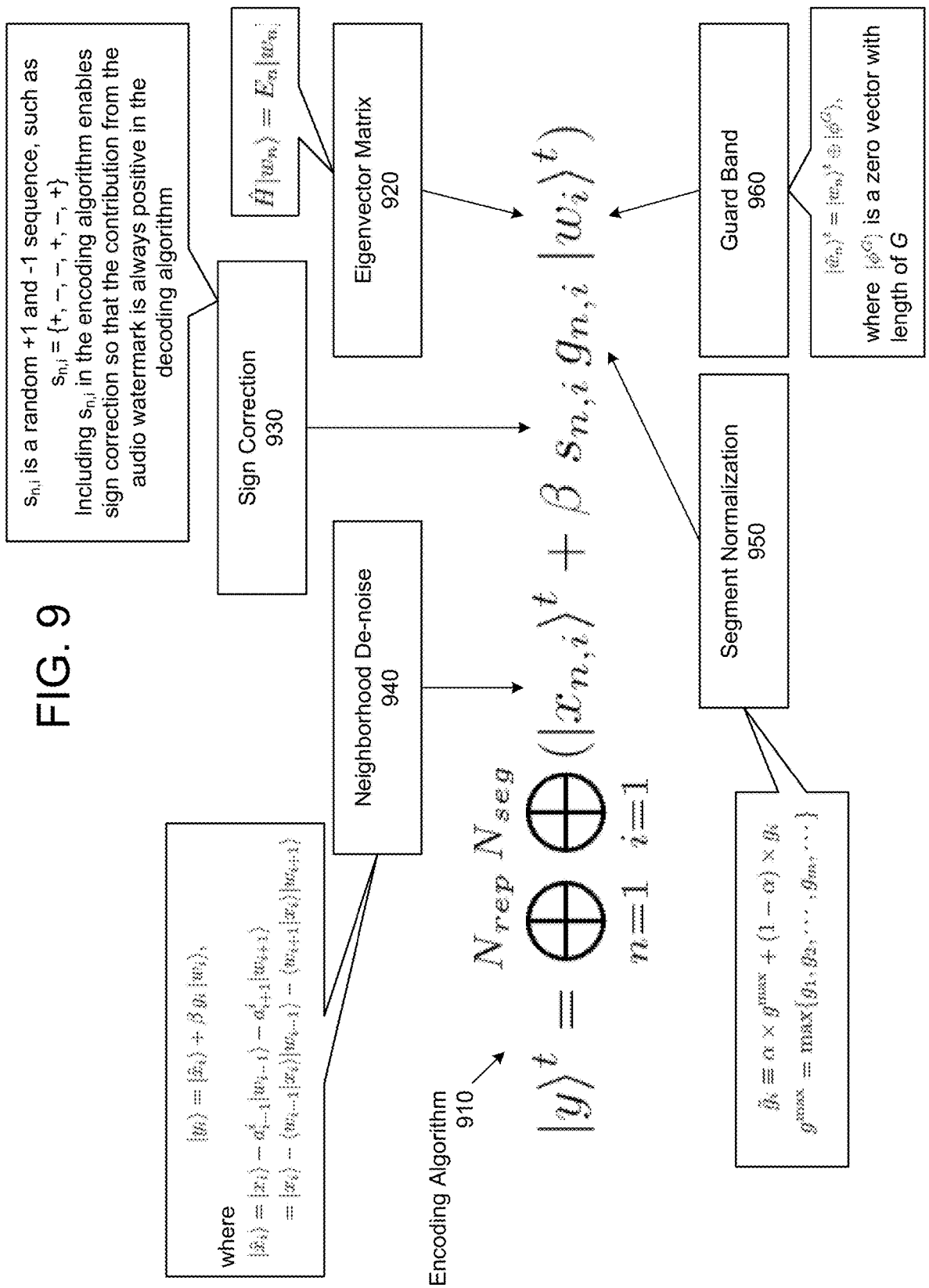
FIG. 9 illustrates an example of concepts associated with an encoding algorithm according to embodiments of the present disclosure.

FIG. 9 illustrates an example of concepts associated with an encoding algorithm according to embodiments of the present disclosure. As illustrated in FIG. 9, the encoding algorithm 910 corresponds to Equation [7] described above, which includes a number of concepts. For example, the encoding algorithm 910 is based on an Eigenvector matrix 920 (e.g., $\hat{H}|w_n\rangle = E_n|w_n\rangle$), performs sign correction 930, may optionally apply a neighborhood de-noise processing step, may include segment normalization 950, and may apply a guard band 960 between the segments of the Eigenvector matrix 920. To explain the sign correction 930 in more detail, a sign sequence $s_{n,i}$ is a random sequence of ±1, such as $s_{n,i}=\{+, -, -, +, -, +\}$, and including the sign sequence $s_{n,i}$ in the encoding algorithm enables the system 100 to decode the audio watermark such that a contribution of the audio watermark is always positive, as discussed above with regard to Equation [6].

To explain the neighborhood de-noise 940 in greater detail, the watermarked audio data may be generated based on:

$$|y_i\rangle = |\tilde{x}_i\rangle + \beta g_i |w_i\rangle, \quad [9.1]$$

$$|\tilde{x}_i\rangle = |x_i\rangle - a_{i-1}^i |w_{i-1}\rangle - a_{i+1}^i |w_{i+1}\rangle$$
$$= |x_i\rangle - \langle w_{i-1} | x_i\rangle |w_{i-1}\rangle - \langle w_{i+1} | x_i\rangle |w_{i+1}\rangle$$

In addition, the guard band 960 may correspond to adding a zero vector with a length of G to the Eigenvector matrix 920, using the following equation:

$$|\hat{w}_n\rangle^t = |w_n\rangle^t \oplus |\phi^a\rangle), \quad [9.2]$$

Figure 10:
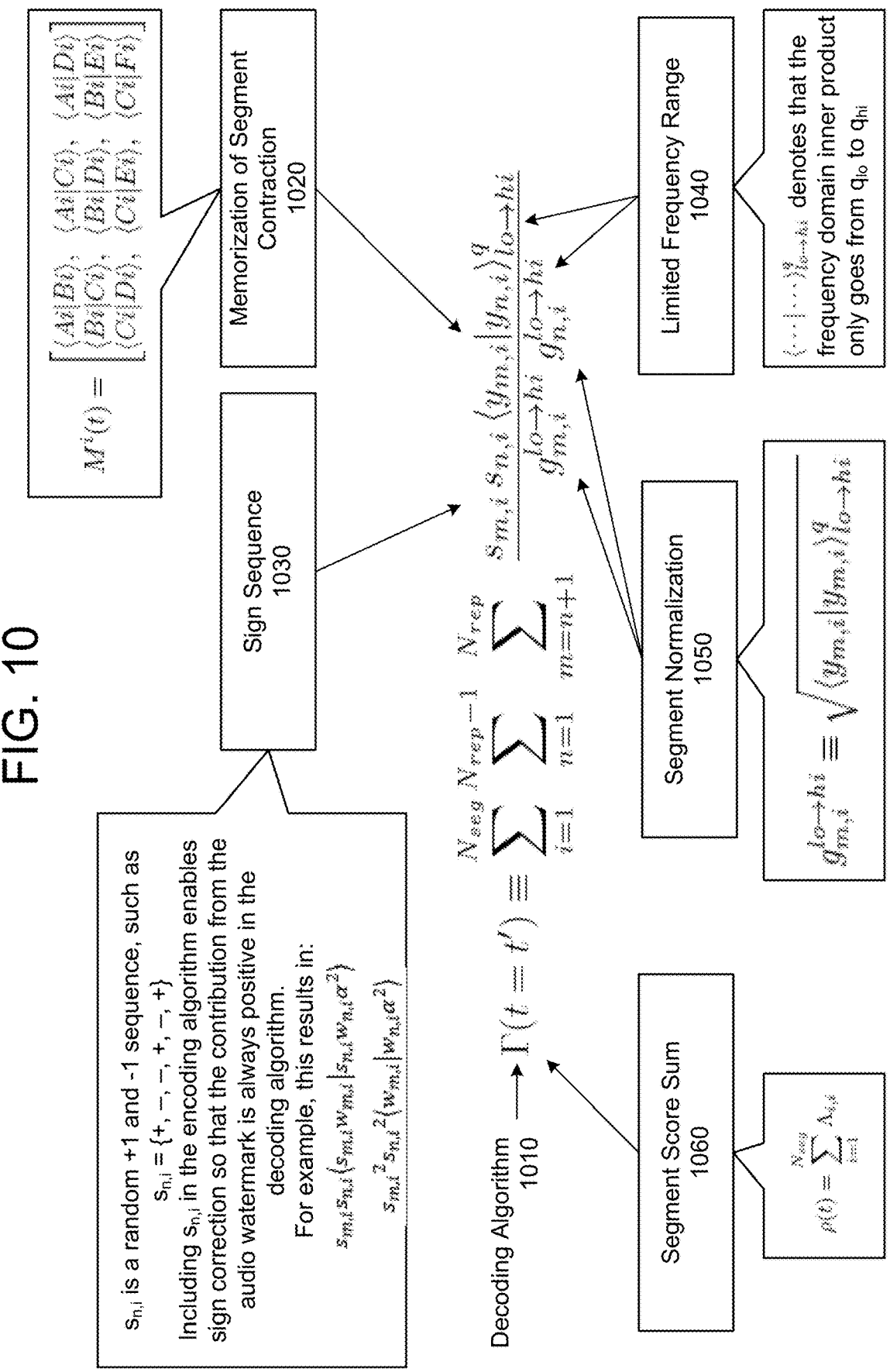
FIG. 10 illustrates an example of concepts associated with a decoding algorithm according to embodiments of the present disclosure.

FIG. 10 illustrates an example of concepts associated with a decoding algorithm according to embodiments of the present disclosure. As illustrated in FIG. 10, the decoding algorithm 1010 corresponds to Equation [8.1] described above, which includes a number of concepts. For example, the decoding algorithm 1010 may apply memorization of segment contraction 1020 to reduce a processing consumption, perform sign correction 1030, the audio watermark may be embedded within a limited frequency range 1040, may optionally include segment normalization 1050, and may correspond to a segment score sum 1060.

To explain the sign correction 1030 in more detail, a sign sequence $s_{n,i}$ is a random sequence of $\pm 1$, such as $s_{n,i}=\{+, -, -, +, -, +\}$, and including the sign sequence $s_{n,i}$ in the encoding algorithm enables the system 100 to decode the audio watermark such that a contribution of the audio watermark is always positive, as discussed above with regard to Equation [6]. For example, a portion of the decoding algorithm corresponds to:

$$s_{m,i}s_{n,i}\langle s_{m,i}w_{m,i}|s_{n,i}w_{n,i}\alpha^2\rangle = s_{m,i}^2 s_{n,i}^2 \langle w_{m,i}|w_{n,i}\alpha^2\rangle \quad [10]$$

where the sign sequence $s_{n,i}$ associated with the first portion and the sign sequence $s_{m,i}$ associated with the second portion are squared, resulting in a value of positive one regardless of whether the original sign value is positive or negative.

Figure 11A:
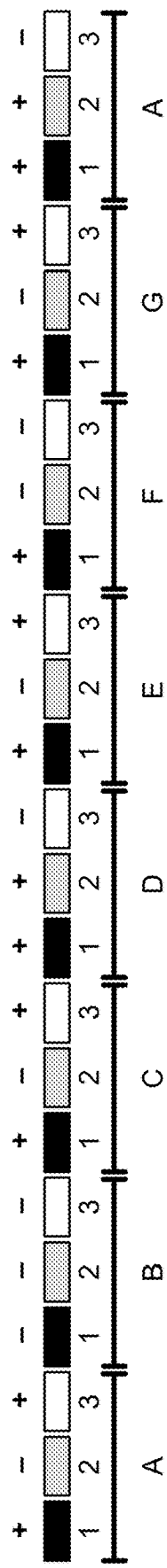
FIGS. 11A-11B illustrate examples of decoding an audio watermark according to embodiments of the present disclosure.
Figure 11B:
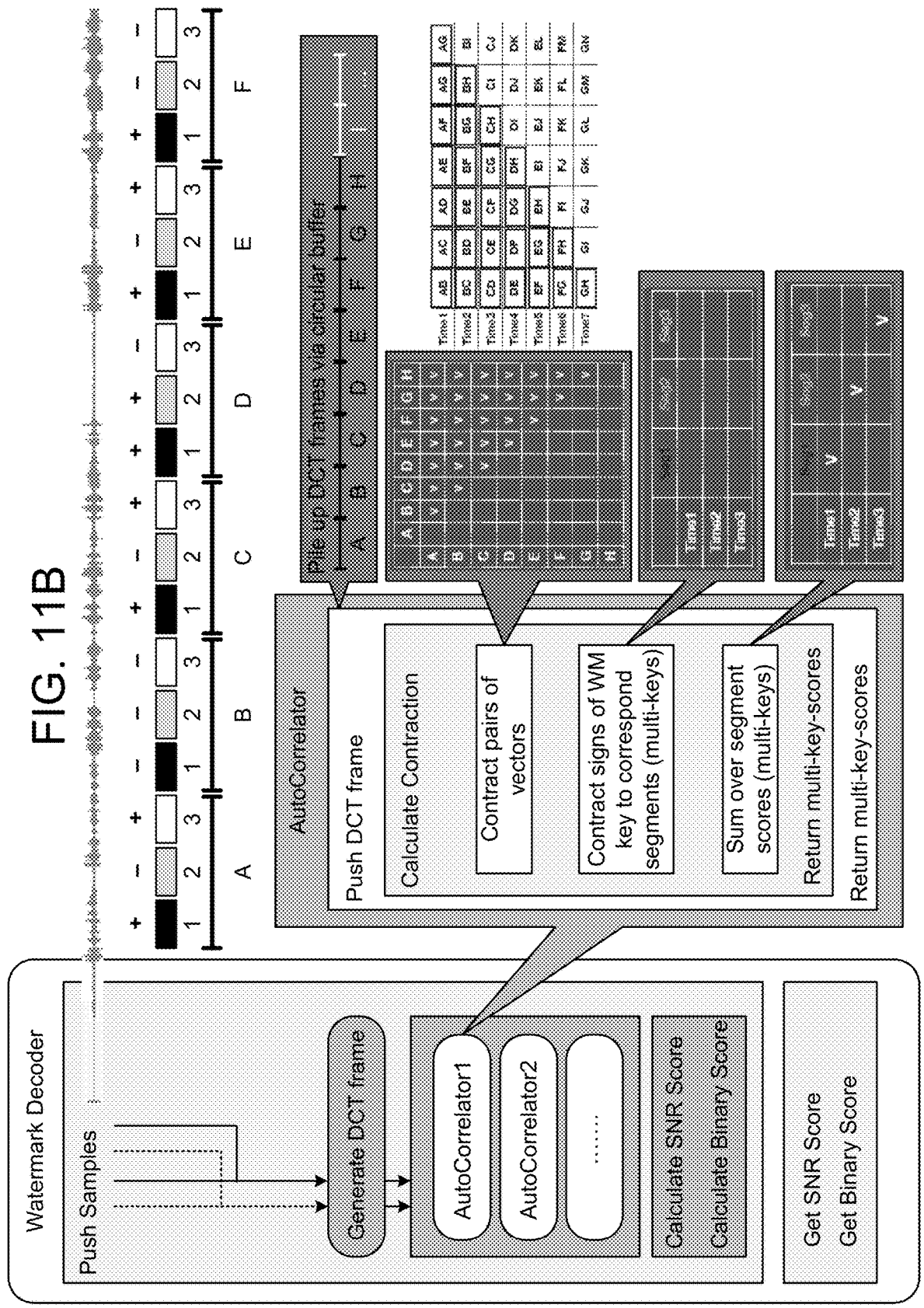

FIGS. 11A-11B illustrate examples of decoding an audio watermark according to embodiments of the present disclosure. As illustrated in FIG. 11A, a watermark encoding structure 1110 may include a number of segments (1-3) and a number of repetitions (A-H). To decode the audio watermark using the decoding algorithm 830, the system 100 may perform memorization of segment contraction to reduce a processing consumption associated with the decoding. For example, vector pair chart 1120 illustrates each of the vector pairs that need to be calculated. However, the system 100 may calculate these vector pairs a single time and then store them to be reused when calculating a subsequent segment/repetition.

FIG. 11B illustrates the decoding process. As illustrated in FIG. 11B, the watermark decoder may generate a discrete cosine transform (DCT) frame and apply an autocorrelator associated with a specific sign sequence or shared key (e.g., to detect a first audio watermark). For example, the watermark decoder may include a plurality of autocorrelator steps, enabling the watermark decoder to detect a plurality of audio watermarks. For each autocorrelator, the watermark decoder may store DCT frames in a circular buffer, may contract pairs of vectors, may contract signs of the shared watermark key to corresponding segments, and may determine a sum over the segment scores (e.g., multi-key scores).

Based on the multi-key scores, the watermark decoder may calculate a signal-noise-ratio (SNR) score associated with the audio watermark and may calculate a binary score based on the SNR score. For example, SNR scores above a threshold value may have a first binary value (e.g., 1), indicating that the audio watermark is detected, whereas SNR scores below the threshold value may have a second binary value (e.g., 0), indicating that the audio watermark is not detected.

FIG. 12 illustrates an example of algorithms used to decode an audio watermark according to embodiments of the present disclosure. As illustrated in FIG. 12, the decoding algorithm may be applied by performing memorization of segment contraction 1210, applying sign-correction of segments 1212, and calculating a segment score sum 1214. For example, memorization of segment contraction 1210 may be performed by storing the top left values:

$$\ldots |A1\rangle \oplus |A2\rangle \oplus |B1\rangle \oplus |B2\rangle \oplus |C1\rangle \oplus |C2\rangle \oplus |D1\rangle \oplus |D2\rangle \oplus |E1\rangle \oplus |E2\rangle \oplus |F1\rangle \oplus |F2\rangle \ldots$$

$$M^i(t) = \begin{bmatrix} \langle Ai|Bi\rangle & \langle Ai|Ci\rangle & \langle Ai|Di\rangle \\ \langle Bi|Ci\rangle & \langle Bi|Di\rangle & \langle Bi|Ei\rangle \\ \langle Ci|Di\rangle & \langle Ci|Ei\rangle & \langle Ci|Fi\rangle \end{bmatrix} \quad [11]$$

Similarly, sign-correction of segments 1212 may be applied using:

$$\lambda(t, i) = \sum_{m=1}^{N_{rep}} \sum_{n=1}^{N_{rep}-m+1} M_{m,n}^i \times s_{m,i} \times s_{n,i} \quad [12.1]$$

where $$\Lambda(t) = \begin{bmatrix} \lambda(t+0\times L_{base}, 1), & \lambda(t+1\times L_{base}, 1), & \ldots, & \lambda(t+(N_{seg}-1)\times L_{base}, 1) \\ \lambda(t+0\times L_{base}, 2), & \lambda(t+1\times L_{base}, 2), & \ldots, & \lambda(t+(N_{seg}-1)\times L_{base}, 2) \\ \ldots, & \ldots, & \ldots, & \ldots, \\ \lambda(t+0\times L_{base}, N_{seg}), & \lambda(t+1\times L_{base}, N_{seg}), & \ldots, & \lambda(t+(N_{seg}-1)\times L_{base}, N_{seg}) \end{bmatrix} \quad [12.2]$$

Finally, the segment score sum may be calculated using:

$$\rho(t) = \Sigma_{i=1}^{N_{seg}} \Lambda_{i,i} \quad [13]$$

FIG. 13 illustrates an example of generating a signal-noise-ratio (SNR) and a binary score according to embodiments of the present disclosure. As mentioned above with regard to FIG. 11B, the system 100 may generate an SNR score associated with an audio watermark and then determine a binary score indicating whether the audio watermark is detected. FIG. 13 includes a watermark chart 1310 illustrating the concepts used to determine the SNR score.

As illustrated in FIG. 13, the system 100 may calculate the noise-mean throughout the noise region:

$$\bar{\rho}_n \equiv \frac{1}{\Delta_n} \sum_{t=t_n}^{t_n+\Delta_n} \rho(t) \quad [14]$$

The system 100 may then calculate the noise-deviations from the noise-mean:

$$\sigma_n \equiv \frac{1}{\Delta_n} \sum_{t=t_n}^{t_n+\Delta_n} |\rho(t) - \bar{\rho}_n| \quad [15]$$

Finally, the system 100 may calculate the noise-mean corrected signal-mean throughout the signal region:

$$\bar{\rho}_n \equiv \frac{1}{\Delta_n} \sum_{t=t_n}^{t_n+\Delta_n} (\rho(t) - \bar{\rho}_n) \quad [16]$$

The SNR score corresponds to the signal-mean divided by the noise-deviations. Using the SNR score, the system 100 may determine a binary score:

$$\varepsilon(t) = \begin{cases} 0, \text{ for } \overline{p}_n/\sigma_n < R, \\ 1, \text{ for } \overline{p}_n/\sigma_n \geq R, \end{cases} \quad [17]$$

An example of SNR scores are illustrated in watermark scores 1320. Similarly, an example of a corresponding binary scores is illustrated in binary output 1330.

In some examples, the system 100 may detect multiple audio watermarks. For example, the system 100 may efficiently decode multiple watermark encoders using the same encoding signature: $L_{base}$, $L_{freq}$, $N_{seg}$, and $N_{rep}$. Therefore, multiple audio watermarks can be decoded in parallel using the sub-RBL keys illustrated in FIG. 14, using:

$$\varepsilon(t) = \begin{cases} 0, \text{ if } \max\{\sigma_s^x\}/\max\{\rho_n^x\} < R, \\ x = \text{Index of } \max\{\sigma_s^x\}, \text{ if } \max\{\sigma_s^x\}/\max\{\rho_n^x\} \geq R. \end{cases} \quad [18]$$

where x indicates different watermark encoding sequences.

Figure 14:
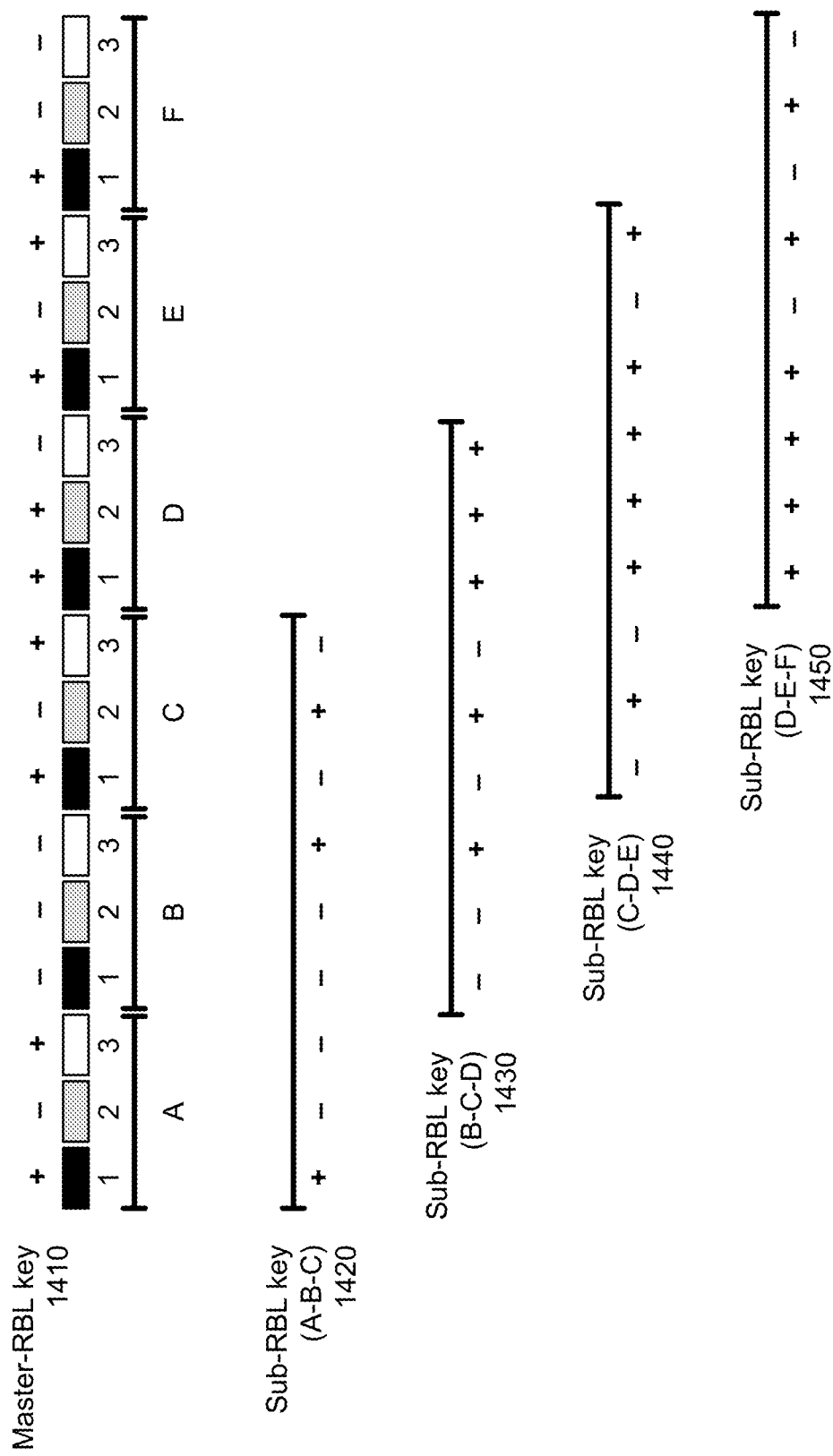
FIG. 14 illustrates an example of encoding an audio watermark using multiple sub-keys according to embodiments of the present disclosure.

FIG. 14 illustrates an example of encoding an audio watermark using multiple sub-keys according to embodiments of the present disclosure. As illustrated in FIG. 14, a master random bit layer (RBL) key 1410 may correspond to a number of sub-RBL keys, such as sub-RBL key (A-B-C) 1420, sub-RBL key (B-C-D) 1430, sub-RBL key (C-D-E) 1440, and sub-RBL key (D-E-F) 1450. Thus, the system 100 may decode portions of the master RBL key 1410 at a time, which improves performance when there is physical movement of a mobile device, timing issues in the decoding of the audio watermark, and/or when using input from multiple microphones within the microphone array 112.

Figure 15A:
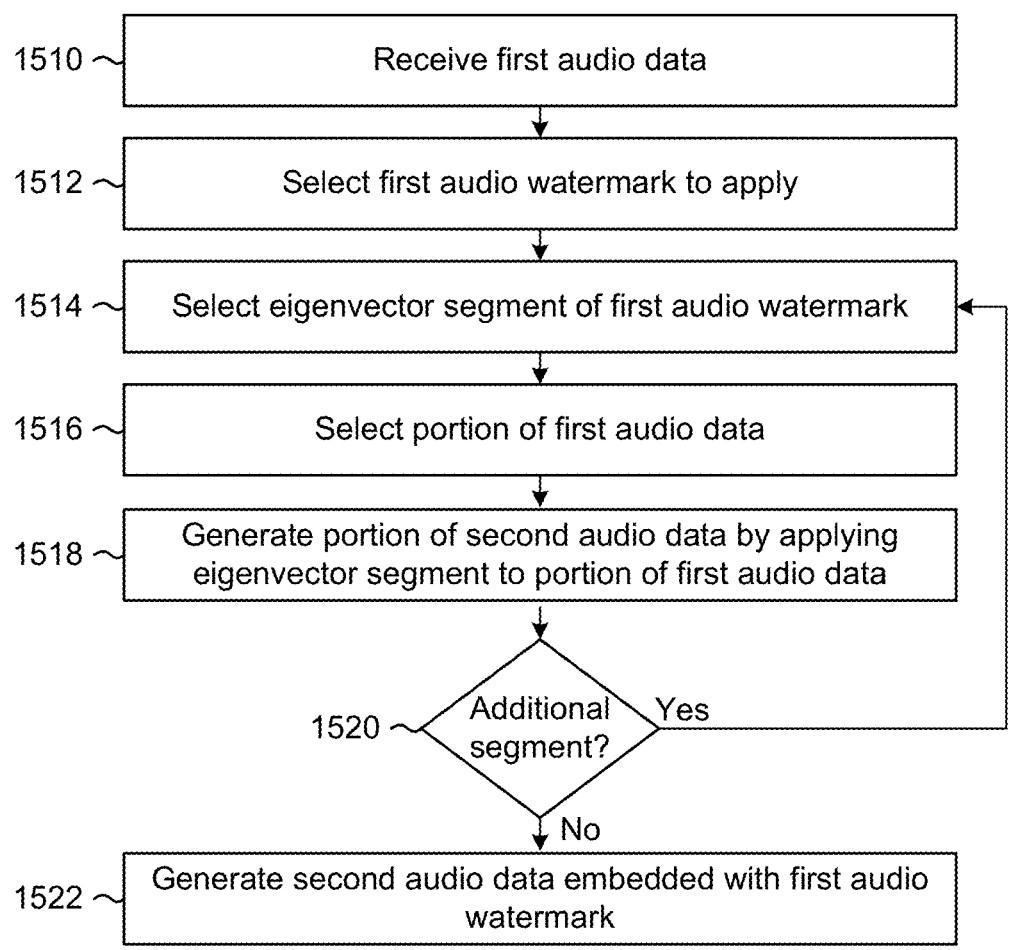
FIGS. 15A-15B are flowcharts conceptually illustrating example methods for embedding an audio watermark according to embodiments of the present disclosure.
Figure 15B:
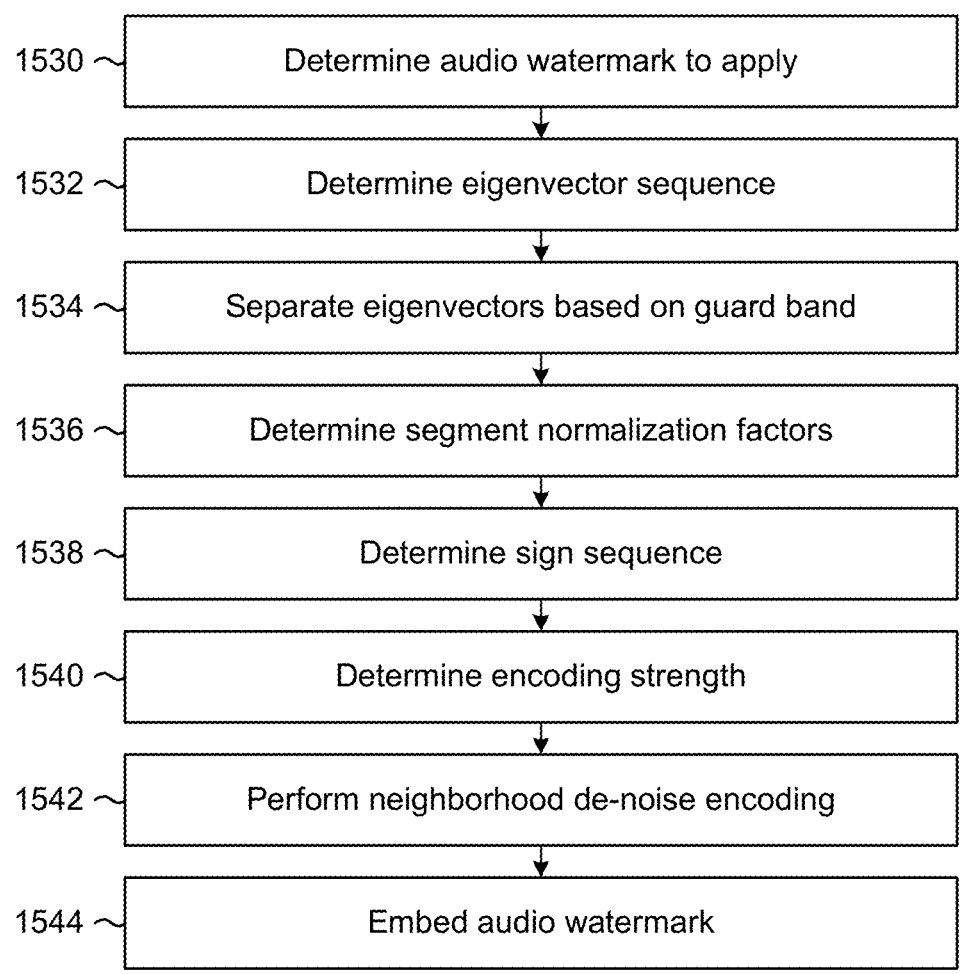

FIGS. 15A-15B are flowcharts conceptually illustrating example methods for embedding an audio watermark according to embodiments of the present disclosure. As illustrated in FIG. 15A, the system 100 may receive (1510) first audio data, may select (1512) a first audio watermark to apply, may select (1514) an eigenvector segment corresponding to the first audio watermark, may select (1516) a portion of the first audio data corresponding to the eigenvector segment, and may generate (1518) a portion of second audio data by applying the eigenvector segment to the portion of the first audio data. The system 100 may then determine (1520) if there are additional eigenvector segments, and if so, may loop to step 1514 and repeat steps 1514-1520. If there are no additional eigenvector segments, the system 100 may generate (1522) second audio data embedded with the first audio watermark.

As illustrated in FIG. 15B, the system 100 may determine (1530) an audio watermark to apply, may determine (1532) an eigenvector sequence, may separate (1534) the eigenvectors based on a guard band, may determine (1536) segment normalization factors, may determine (1538) a sign sequence (e.g., shared key corresponding to the random bit layer (RBL)), may determine (1540) an encoding strength, may perform (1542) neighborhood de-noise encoding, and may embed (1544) the audio watermark.

Figure 16A:
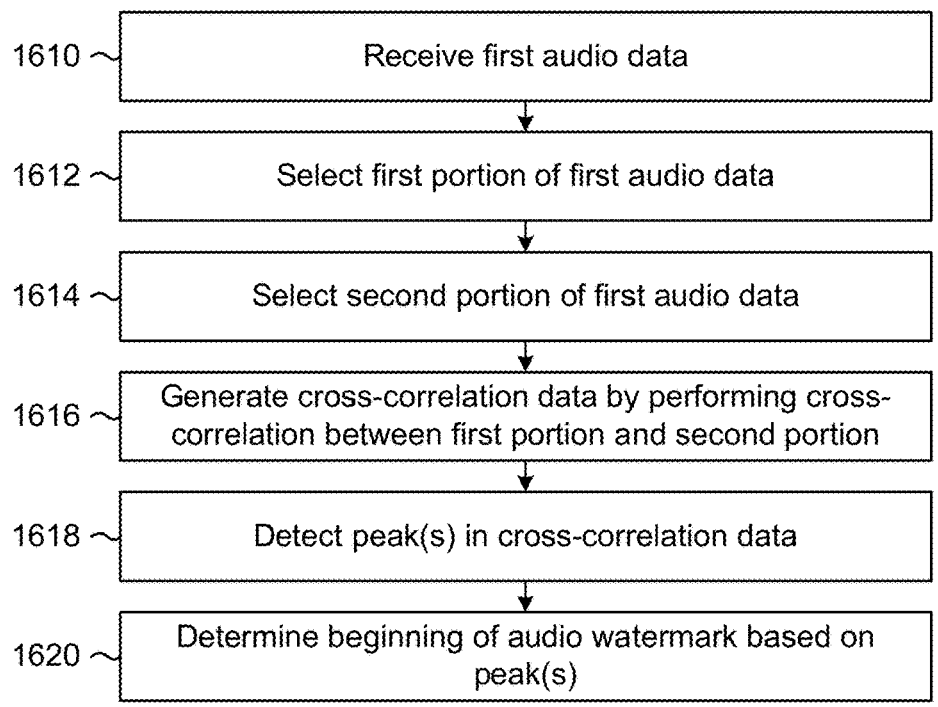
FIGS. 16A-16B are flowcharts conceptually illustrating example methods for detecting an audio watermark according to embodiments of the present disclosure.
Figure 16B:
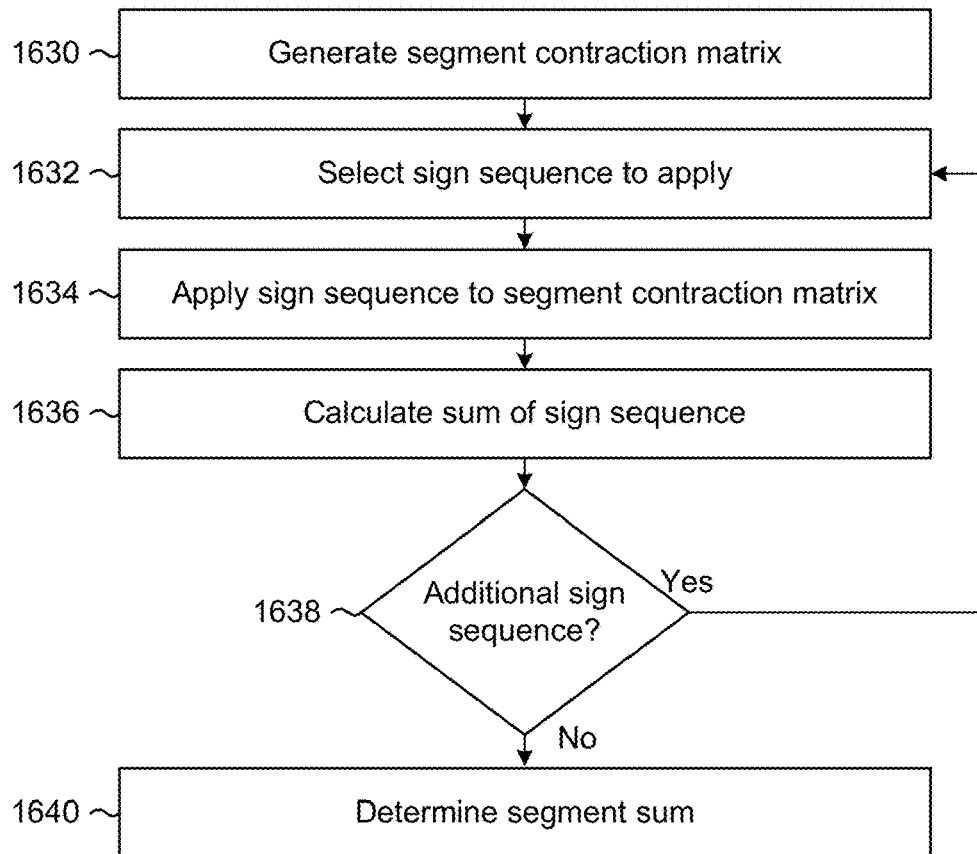

FIGS. 16A-16B are flowcharts conceptually illustrating example methods for detecting an audio watermark according to embodiments of the present disclosure. As illustrated in FIG. 16A, the system 100 may receive (1610) first audio data, may select (1612) a first portion of the first audio data, may select (1614) a second portion of the first audio data, may generate (1616) cross-correlation data by performing a cross-correlation between the first portion and the second portion, may detect (1618) peak(s) in the cross-correlation data, and may determine (1620) a beginning of the audio watermark based on the peak(s). As part of step 1616, the system 100 may perform sign correction using a first sign sequence associated with the first portion of the first audio data and a second sign sequence associated with the second portion of the first audio data.

As illustrated in FIG. 16B, the system 100 may generate (1630) a segment contraction matrix, may select (1632) a sign sequence to apply, may apply (1634) the sign sequence to the segment contraction matrix to perform sign correction, and may calculate (1636) a sum of the sign sequence. The system 100 may determine (1638) whether there is an additional sign sequence, and if so, may loop to step 1632 and repeat steps 1632-1638. If there is not an additional sign sequence, the system 100 may determine (1640) a segment sum. As part of generating the segment contraction matrix in step 1630, the system 100 may apply steps 1610-1620 illustrated in FIG. 16A, although the disclosure is not limited thereto.

Figure 17A:
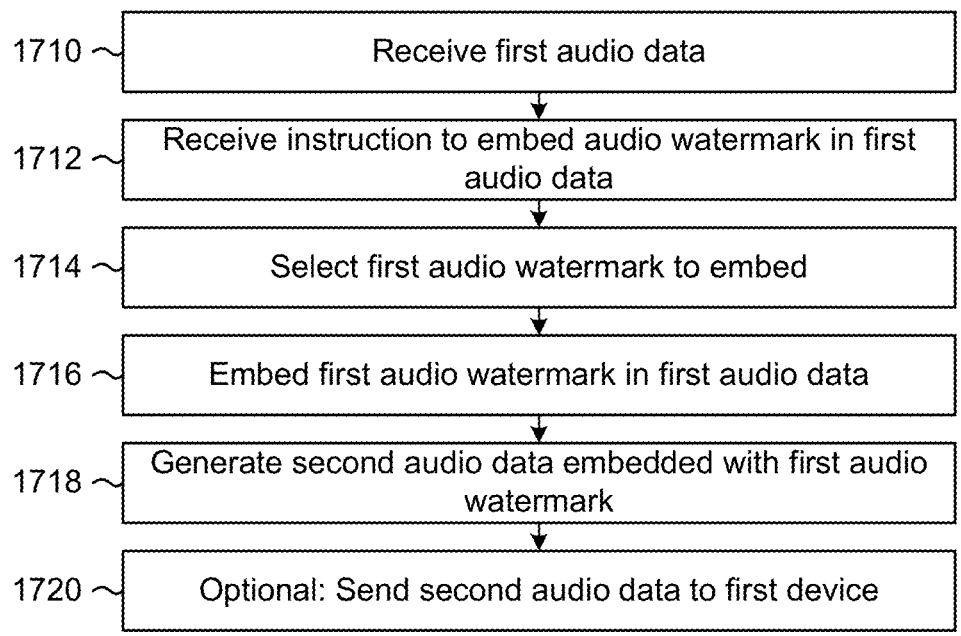
FIGS. 17A-17C are flowcharts conceptually illustrating example methods for encoding audio watermarks to enable unique functionality according to embodiments of the present disclosure.
Figure 17B:
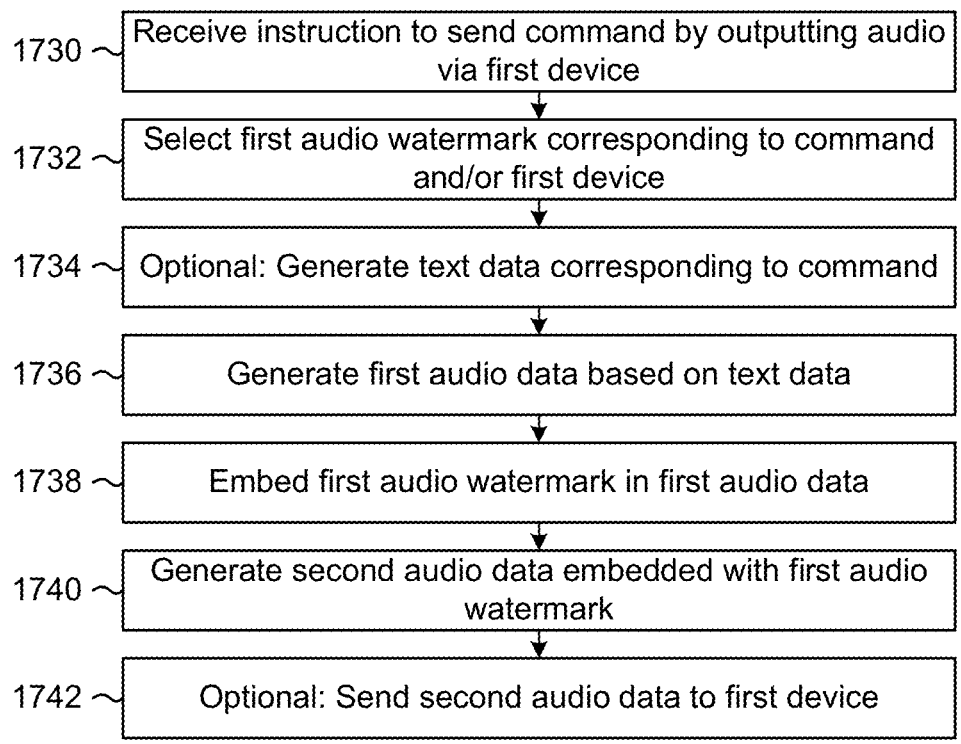
Figure 17C:
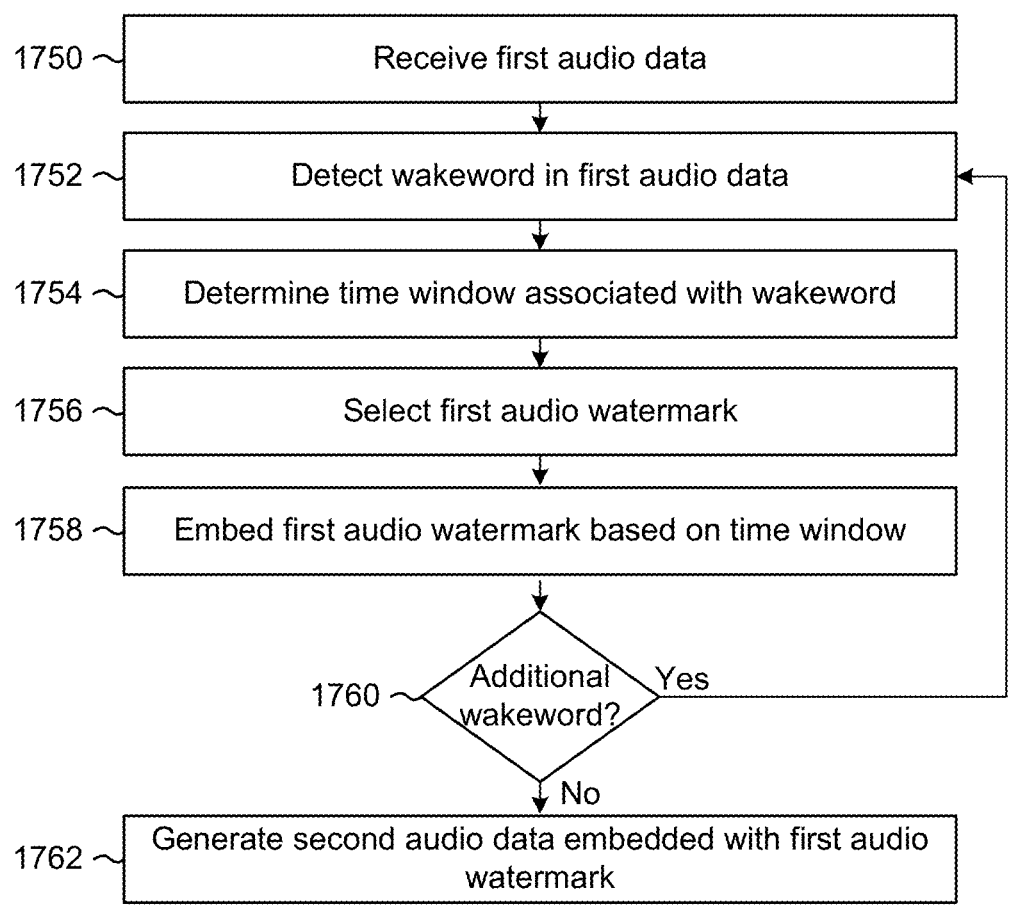

FIGS. 17A-17C are flowcharts conceptually illustrating example methods for encoding audio watermarks to enable unique functionality according to embodiments of the present disclosure. As illustrated in FIG. 17A, the system 100 may receive (1710) first audio data and may receive (1712) an instruction to embed an audio watermark in the first audio data. The system 100 may select (1714) a first audio watermark to embed in the first audio data, may embed (1716) the first audio watermark in the first audio data, may generate (1718) second audio data embedded with the first audio watermark, and may optionally send (1720) the second audio data to the first device. If the first device is performing steps 1710-1720, the first device may alternatively send the second audio data to the loudspeaker(s) 114 to generate output audio.

As illustrated in FIG. 17B, the system 100 may receive (1730) an instruction to send a command by outputting audio via a first device, may select (1732) a first audio watermark corresponding to the command and/or the first device, may optionally generate (1734) text data corresponding to the command, may generate (1736) first audio data based on the text data, may embed (1738) the first audio watermark in the first audio data, may generate (1740) second audio data embedded with the first audio watermark, and may optionally send (1742) the second audio data to the first device. If the first device is performing steps 1730-1740, the first device may alternatively send the second audio data to the loudspeaker(s) 114 to generate output audio.

As illustrated in FIG. 17C, the system 100 may receive (1750) first audio data and may detect (1752) a wakeword in the first audio data. The system 100 may determine (1754) a time window associated with the wakeword, may select (1756) a first audio watermark, and may embed (1758) the first audio watermark based on the time window. The system 100 may determine (1760) whether there is an additional wakeword represented in the first audio data, and if so, may loop to step 1752 and repeat steps 1752-1760. If not, the system 100 may generate (1762) second audio data embedded with the first audio watermark.

Figure 18A:
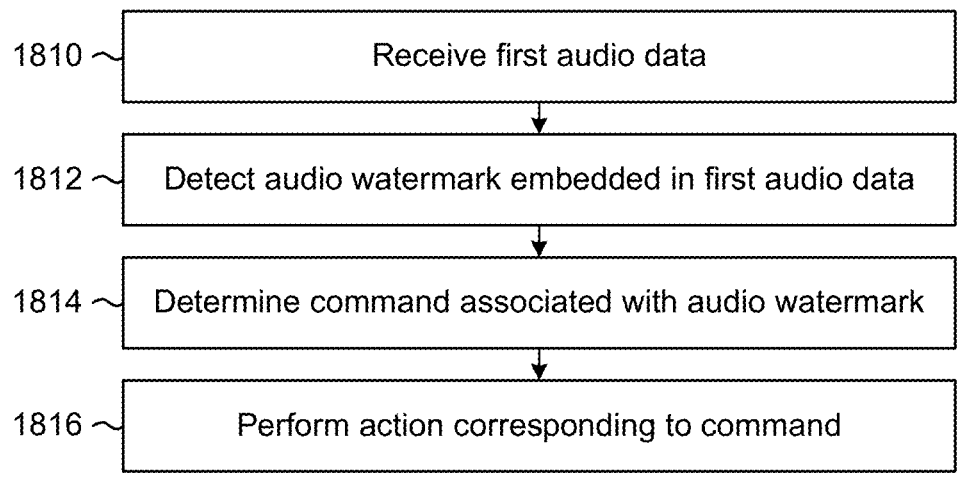
FIGS. 18A-18C are flowcharts conceptually illustrating example methods for decoding audio watermarks to enable unique functionality according to embodiments of the present disclosure.
Figure 18B:
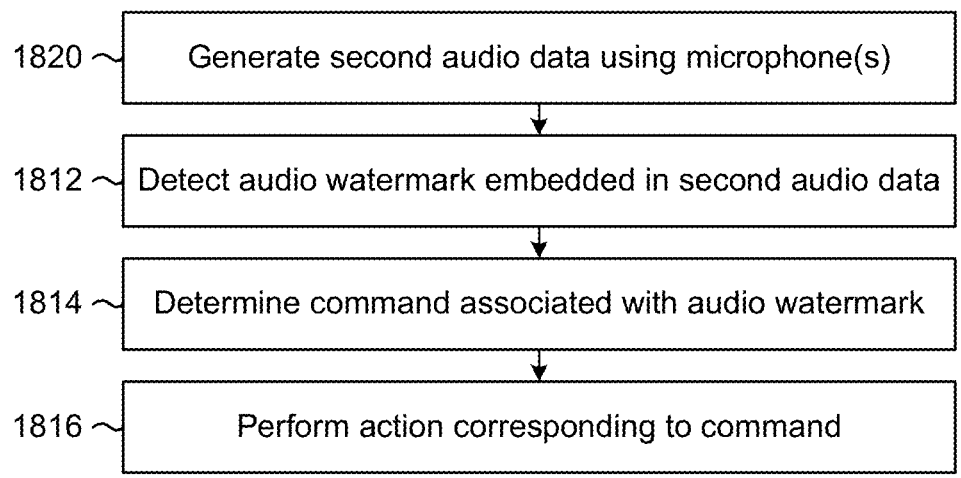
Figure 18C:
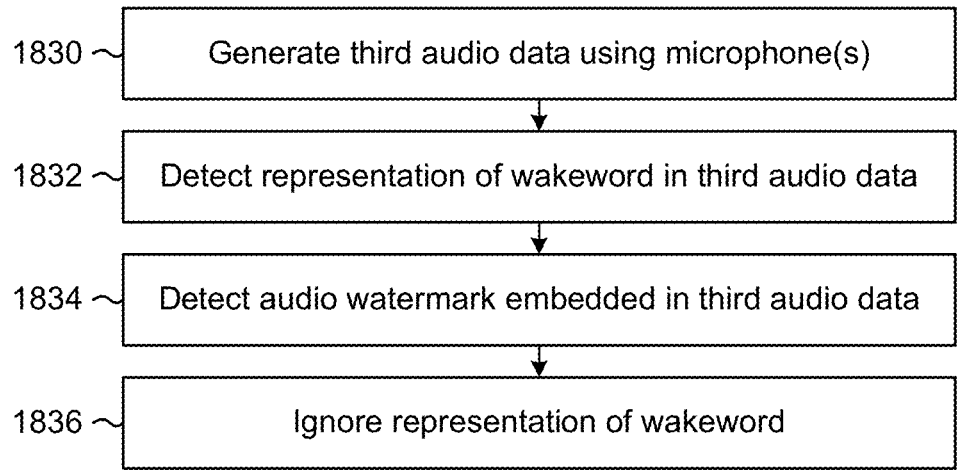

FIGS. 18A-18C are flowcharts conceptually illustrating example methods for decoding audio watermarks to enable unique functionality according to embodiments of the present disclosure. In some examples, the system 100 may detect the audio watermark in a digital copy of first audio data that is directly received from a remote device. As illustrated in FIG. 18A, the system 100 may receive (1810) first audio data, may detect (1812) an audio watermark embedded in the first audio data, may determine (1814) a command associated with the audio watermark, and may perform (1816) an action corresponding to the command.

In other examples, the system 100 may detect the audio watermark in audio using microphone(s). As illustrated in FIG. 18B, the system 100 may generate (1820) second audio data using microphone(s), may detect (1812) an audio watermark embedded in the second audio data, may determine (1814) a command associated with the audio watermark, and may perform (1816) an action corresponding to the command.

As illustrated in FIG. 18C, the system 100 may generate (1830) third audio data using microphone(s), may detect (1832) a representation of a wakeword in the third audio data, may detect (1834) an audio watermark embedded in the third audio data, and may ignore (1836) the representation of the wakeword as a result of detecting the audio watermark.

Figure 19:
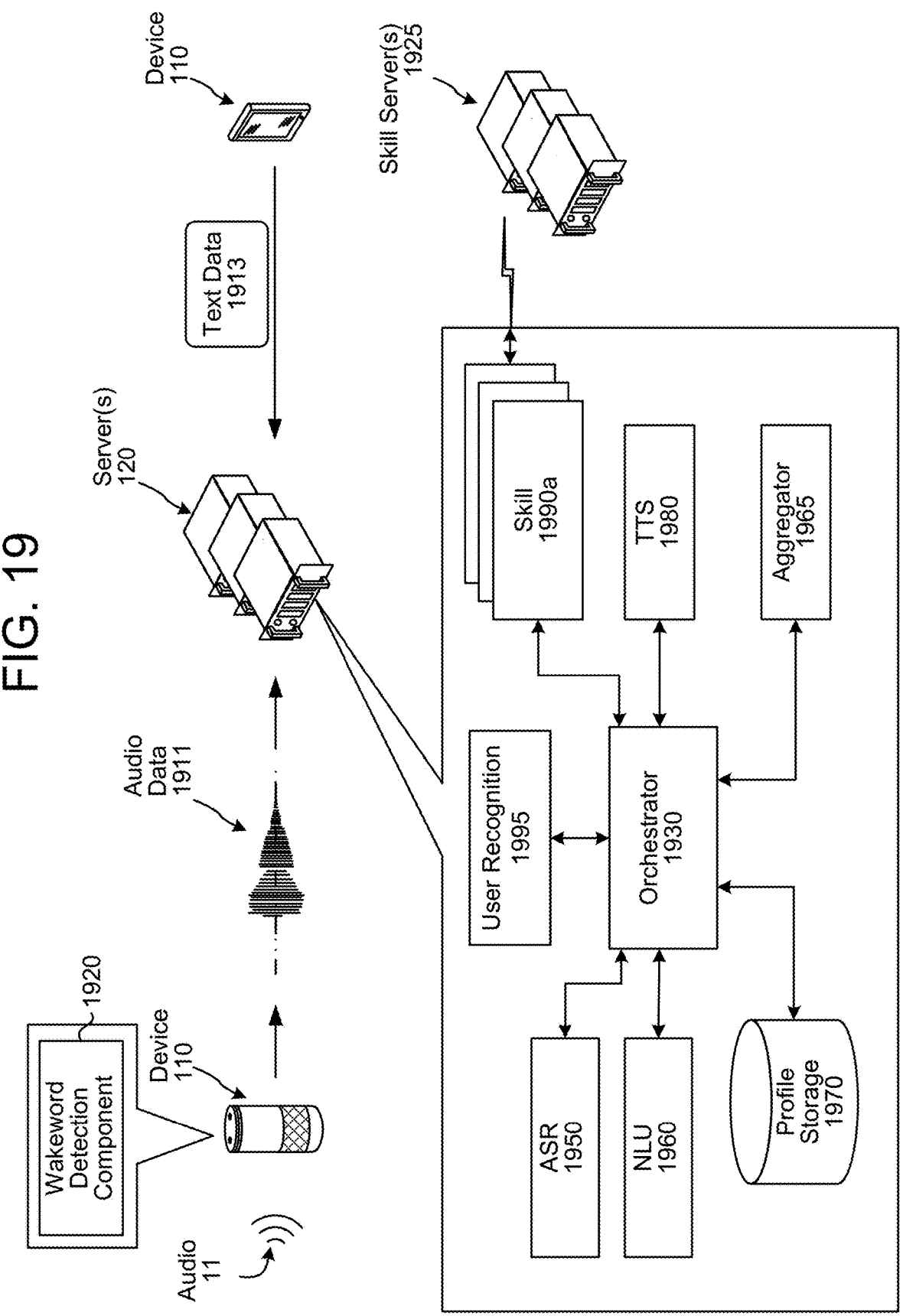
FIG. 19 is a conceptual diagram of components of a system according to embodiments of the present disclosure.

The system may operate using various components as illustrated in FIG. 19. The various components may be located on same or different physical devices. Communication between various components may occur directly or across a network(s) 10

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 1920 to perform wakeword detection to determine when a user intends to speak an input to the device 110. An example wakeword is "Alexa."

Wakeword detection is typically performed without performing linguistic analysis, textual analysis, or semantic analysis. Instead, the audio data representing the audio 11 is analyzed to determine if specific characteristics of the audio data match preconfigured acoustic waveforms, audio signatures, or other data to determine if the audio data "matches" stored audio data corresponding to a wakeword.

Thus, the wakeword detection component 1920 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 1920 may be built on deep neural network (DNN)/recursive neural network (RNN) structures directly, without MINI being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 1911, representing the audio 11, to the server(s) 120. The audio data 1911 may include data corresponding to the wakeword, or the portion of the audio data 1911 corresponding to the wakeword may be removed by the device 110 prior to sending the audio data 1911 to the server(s) 120.

Upon receipt by the server(s) 120, the audio data 1911 may be sent to an orchestrator component 1930. The orchestrator component 1930 may include memory and logic that enables the orchestrator component 1930 to transmit various pieces and forms of data to various components of the system, as well as perform other operations as described herein.

The orchestrator component 1930 sends the audio data 1911 to an ASR component 1950. The ASR component 1950 transcribes the audio data 1911 into text data. The text data output by the ASR component 1950 represents one or more than one (e.g., in the form of an N-best list) ASR hypotheses representing speech represented in the audio data 1911. The ASR component 1950 interprets the speech in the audio data 1911 based on a similarity between the audio data 1911 and pre-established language models. For example, the ASR component 1950 may compare the audio data 1911 with models for sounds (e.g., subword units, such as phonemes, etc.) and sequences of sounds to identify words that match the sequence of sounds of the speech represented in the audio data 1911. The ASR component 1950 sends the text data generated thereby to an NLU component 1960, for example via the orchestrator component 1930. The text data output by the ASR component 1950 may include a top scoring ASR hypothesis or may include an N-best list including multiple ASR hypotheses. An N-best list may additionally include a respective score associated with each ASR hypothesis represented therein. Each score may indicate a confidence of ASR processing performed to generate the ASR hypothesis with which the score is associated.

The device 110 may send text data 1913 to the server(s) 120. Upon receipt by the server(s) 120, the text data 1913 may be sent to the orchestrator component 1930, which may send the text data 1913 to the NLU component 1960.

The NLU component 1960 attempts to make a semantic interpretation of the phrase(s) or statement(s) represented in the text data input therein. That is, the NLU component 1960 determines one or more meanings associated with the phrase(s) or statement(s) represented in the text data based on words represented in the text data. The NLU component 1960 determines an intent representing an action that a user desires be performed as well as pieces of the text data that allow a device (e.g., the device 110, the server(s) 120, a skill component 1990, a skill server(s) 1925, etc.) to execute the intent. For example, if the text data corresponds to "play Adele music," the NLU component 1960 may determine an intent that the system output music and may identify "Adele" as an artist. For further example, if the text data corresponds to "what is the weather," the NLU component 1960 may determine an intent that the system output weather information associated with a geographic location of the device 110. In another example, if the text data corresponds to "turn off the lights," the NLU component 1960 may determine an intent that the system turn off lights associated with the device 110 or the user 5.

The NLU component 1960 may send NLU results data (which may include tagged text data, indicators of intent, etc.) to the orchestrator component 1930. The orchestrator component 1930 may send the NLU results data to a skill component(s) 1990 configured to perform an action at least partially responsive the user input. The NLU results data may include a single NLU hypothesis, or may include an N-best list of NLU hypotheses.

A "skill component" may be software running on the server(s) 120 that is akin to a software application running on a traditional computing device. That is, a skill component 1990 may enable the server(s) 120 to execute specific functionality in order to provide data or produce some other requested output. The server(s) 120 may be configured with more than one skill component 1990. For example, a weather service skill component may enable the server(s) 120 to provide weather information, a car service skill component may enable the server(s) 120 to book a trip with respect to a taxi or ride sharing service, a restaurant skill component may enable the server(s) 120 to order a pizza with respect to the restaurant's online ordering system, etc. A skill component 1990 may operate in conjunction between the server(s) 120 and other devices, such as the device 110, in order to complete certain functions. Inputs to a skill component 1990 may come from speech processing interactions or through other interactions or input sources. A skill component 1990 may include hardware, software, firmware, or the like that may be dedicated to a particular skill component 1990 or shared among different skill components 1990.

In addition or alternatively to being implemented by the server(s) 120, a skill component 1990 may be implemented at least partially by a skill server(s) 1925. Such may enable a skill server(s) 1925 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The server(s) 120 may be configured with a single skill component 1990 dedicated to interacting with more than one skill server 1925.

Unless expressly stated otherwise, reference to a skill, skill device, or skill component may include a skill component 1990 operated by the server(s) 120 and/or the skill server(s) 1925. Moreover, the functionality described herein as a skill may be referred to using many different terms, such as an action, bot, app, or the like.

The server(s) 120 may include a TTS component 1980 that generates audio data (e.g., synthesized speech) from text data using one or more different methods. Text data input to the TTS component 1980 may come from a skill component 1990, the orchestrator component 1930, or another component of the system.

In one method of synthesis called unit selection, the TTS component 1980 matches text data against a database of recorded speech. The TTS component 1980 selects matching units of recorded speech and concatenates the units together to form audio data. In another method of synthesis called parametric synthesis, the TTS component 1980 varies parameters such as frequency, volume, and noise to create audio data including an artificial speech waveform. Parametric synthesis uses a computerized voice generator, sometimes called a vocoder.

The server(s) 120 may include profile storage 1970. The profile storage 1970 may include a variety of information related to individual users, groups of users, devices, etc. that interact with the system. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 1970 may include one or more user profiles, with each user profile being associated with a different user identifier. Each user profile may include various user identifying information. Each user profile may also include preferences of the user and/or one or more device identifiers, representing one or more devices of the user.

The profile storage 1970 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device identifiers representing one or more devices associated with the group profile.

The profile storage 1970 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

The server(s) 120 may include a user recognition component 1995 that recognizes one or more users associated with data input to the system. The user recognition component 1995 may take as input the audio data 1911. The user recognition component 1995 may perform user recognition by comparing audio characteristics in the audio data 1911 to stored audio characteristics of users. The user recognition component 1995 may also or alternatively perform user recognition by comparing biometric data (e.g., fingerprint data, iris data, etc.), received by the system in correlation with the present user input, to stored biometric data of users. The user recognition component 1995 may also or alternatively perform user recognition by comparing image data (e.g., including a representation of at least a feature of a user), received by the system in correlation with the present user input, with stored image data including representations of features of different users. The user recognition component 1995 may perform additional user recognition processes, including those known in the art. For a particular user input, the user recognition component 1995 may perform processing with respect to stored data of users associated with the device that captured the user input.

The user recognition component 1995 determines whether user input originated from a particular user. For example, the user recognition component 1995 may generate a first value representing a likelihood that the user input originated from a first user, a second value representing a likelihood that the user input originated from a second user, etc. The user recognition component 1995 may also determine an overall confidence regarding the accuracy of user recognition operations.

The user recognition component 1995 may output a single user identifier corresponding to the most likely user that originated the user input. Alternatively, the user recognition component 1995 may output an N-best list of user identifiers with respective values representing likelihoods of respective users originating the user input. The output of the user recognition component 1995 may be used to inform NLU processing, processing performed by a skill component 1990, as well as processing performed by other components of the system.

The machine learning model(s) may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

A user input may be received as part of a dialog between a user and the system. A dialog may correspond to various user inputs and system outputs. When the server(s) 120 receives a user input, the server(s) 120 may associate the data (e.g., audio data or text data) representing the user input with a session identifier. The session identifier may be associated with various speech processing data (e.g., an intent indicator(s), a category of skill to be invoked in response to the user input, etc.). When the system invokes the skill, the system may send the session identifier to the skill in addition to NLU results data. If the skills outputs data from presentment to the user, the skill may associate the data with the session identifier. The foregoing is illustrative and, thus, one skilled in the art will appreciate that a session identifier may be used to track data transmitted between various components of the system. A session identifier may be closed (e.g., a dialog between a user and the system may end) after a skill performs a requested action (e.g., after the skill causes content to be output to the user).

As described in greater detail above with regard to FIGS. 4A-5D, the device 110 and/or the server(s) 120 may include an encoder configured to embed an audio watermark and/or a decoder configured to detect the audio watermark. For example, the encoder may be included in the TTS component 1980 in the server(s) 120, in a separate component associated with the server(s) 120, in a separate component associated with the skill server(s) 1925, in a separate component associated with the device 110, and/or the like without departing from the disclosure. Thus, the device 110, the server(s) 120, and/or the skill server(s) 1925 may be configured to generate watermarked audio data by embedding the audio watermark using the encoder.

Similarly, the decoder may be included within the wakeword detection component 1920 in the device 110, in a separate component associated with the device 110, in a separate component associated with the server(s) 120, in a separate component associated with the skill server(s) 1925, and/or the like without departing from the disclosure. Thus, the device 110, the server(s) 120, and/or the skill server(s) 1925 may be configured to detect an audio watermark embedded in watermarked audio data using the decoder.

Figure 20:
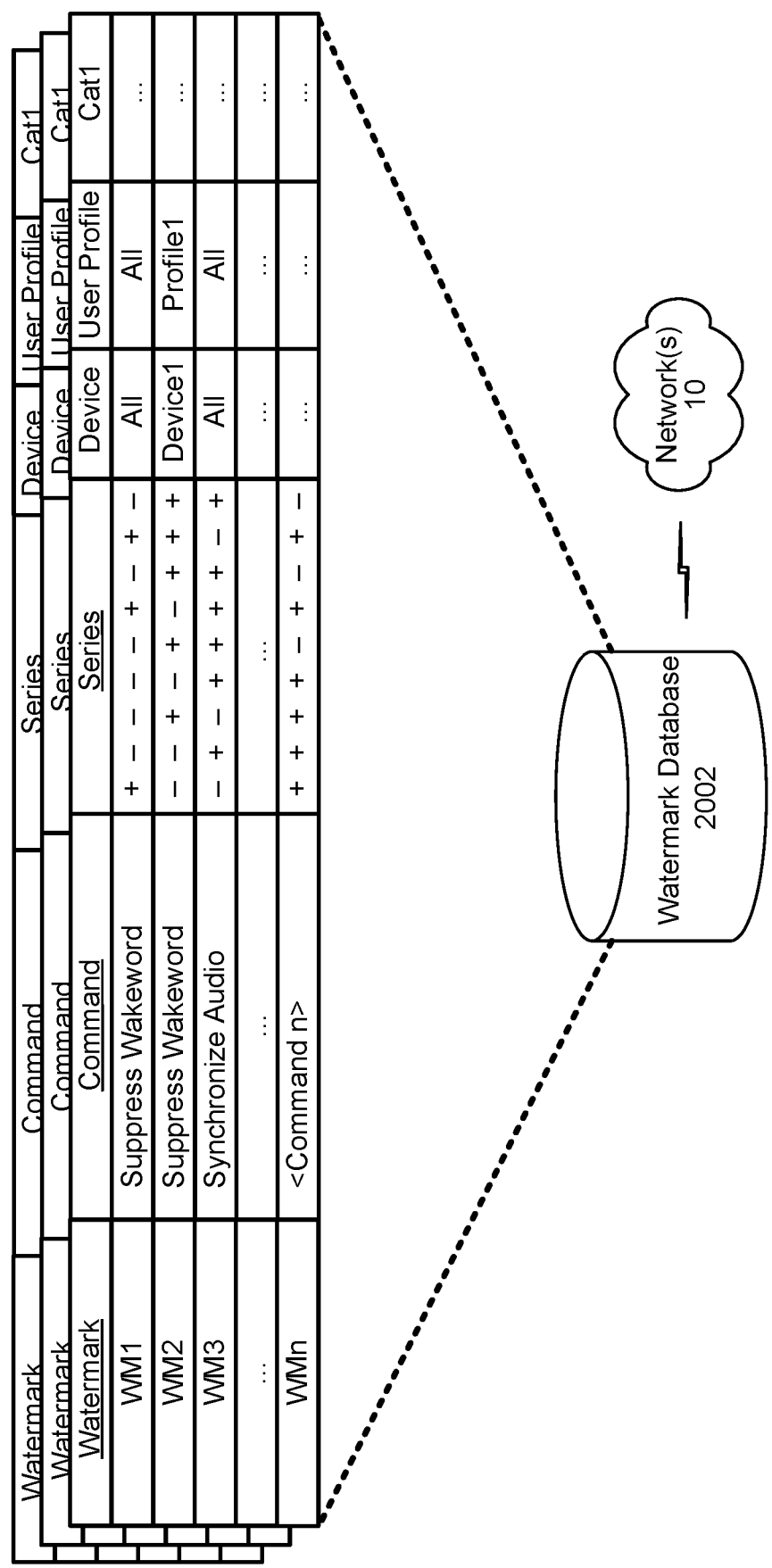
FIG. 20 illustrates data stored and associated with a watermark database according to embodiments of the present disclosure.

FIG. 20 illustrates data stored and associated with a watermark database according to embodiments of the present disclosure. The device 110 and/or the server(s) 120 may include or refer to data regarding watermarks, shown by the watermark database 2002 illustrated in FIG. 20. The watermark database 2002 may be located on the device 110 and/or proximate to the server(s) 120, although the disclosure is not limited thereto, and/or may otherwise be in communication with various components, for example over the network(s) 10.

The watermark database 2002 may include a variety of information related to audio watermarks that are used by the system 100. For illustration, as shown in FIG. 20, the watermark database 2002 may include data regarding audio watermarks, such as a name associated with an audio watermark (e.g., WM1-WMn, although the name can vary without departing from the disclosure), a command associated with the audio watermark (e.g., "Suppress wakeword," "Synchronize audio," etc.), a sign series used as a shared key to encode/decode the audio watermark (e.g., a sequence of positive or negative values, such as "+----+-+-"), a device associated with the audio watermark (e.g., some audio watermarks may be generic to all devices, whereas other audio watermarks may be associated with individual device(s), enabling specific control over a single device), a user profile associated with the audio watermark (e.g., some audio watermarks may be generic to all user profiles, whereas other audio watermarks may be associated with individual user profile(s), enabling specific functionality for a single user profile), and/or the like.

While FIG. 20 illustrates examples of different types of information included within the watermark database 2002, the disclosure is not limited thereto. Instead, the watermark database 2002 may include additional information not illustrated and/or may not include information illustrated in FIG. 20 without departing from the disclosure. For example, the watermark database 2002 may include device identifier (ID) and internet protocol (IP) address information for different devices as well as names by which the devices may be referred to by a user. Further qualifiers describing the devices, a location of the device, commands associated with the device, input capabilities of the device, output capabilities of the device, and/or the like may also be listed in the watermark database 2002.

As illustrated in FIG. 21 devices 110 may contain components of the system 100 and may be connected over network(s) 10. The network(s) 10 may be a local or private network or may be part of a wider network. For example, the network(s) 10 may include a wired local area network (LAN), a wireless local area network (WLAN) (such as WiFi), Bluetooth, and/or wireless network, such as a Long Term Evolution (LTE) network, WiMAX network, 3G network, etc.

Devices 110 may be connected to the network(s) 10 through either wired or wireless connections. For example, a first speech controlled device 110a, a second speech controlled device 110b, a third speech controlled device 110c, a smart television 110d, a headless device 110e connected to a television (not shown), a refrigerator 110f, a tablet computer 110g, a smart phone 110h, and/or a smart watch 110i may be connected to the network(s) 10 through a wired and/or wireless connection. Thus, while the examples illustrated above are sometimes directed to the speech-controlled devices 110a-110c, the disclosure is not limited thereto and the device 110 may be any device configured to send data to the server(s) 120 via the network(s) 10.

Figure 22A:
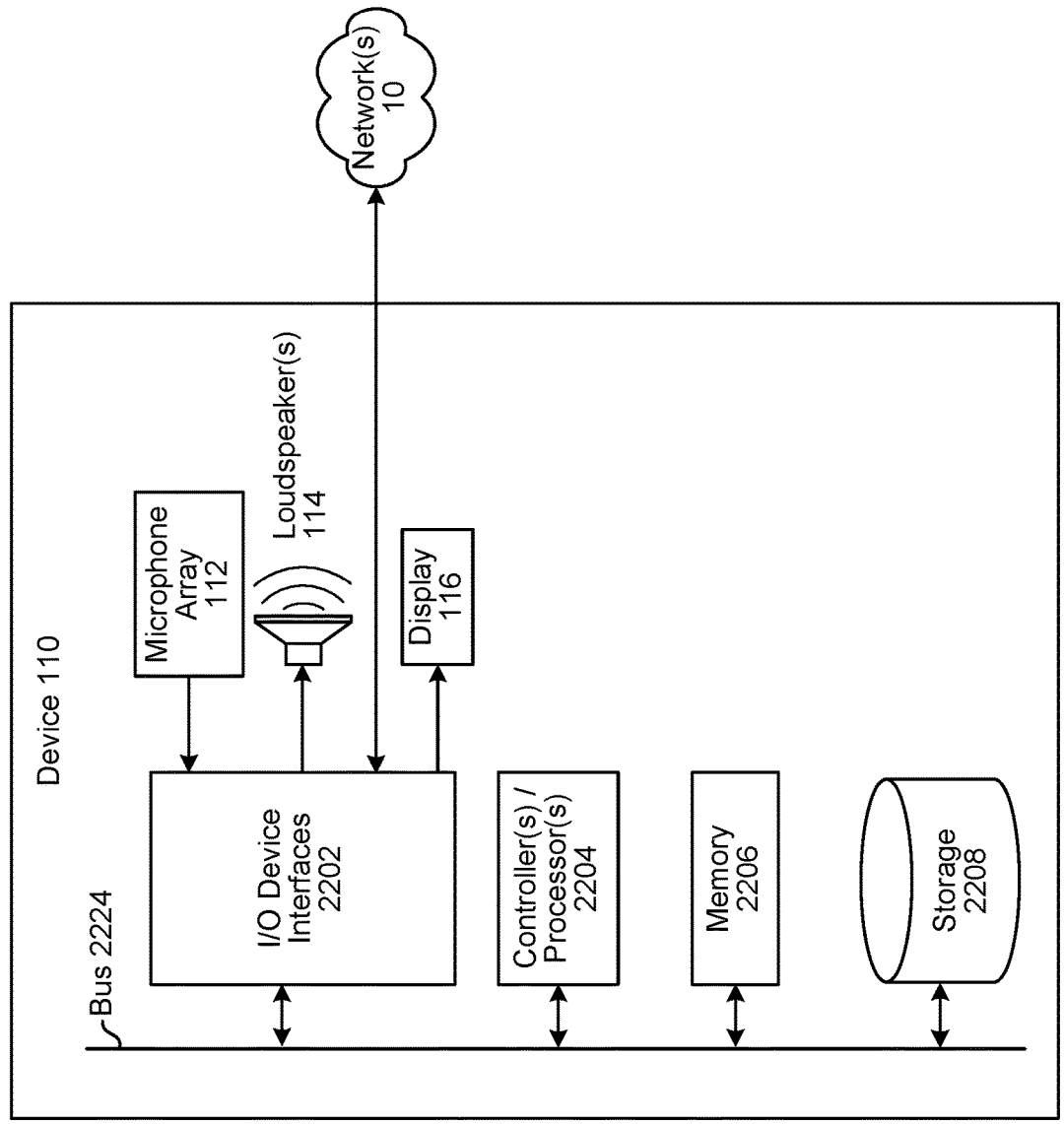

FIGS. 22A-22B are block diagrams conceptually illustrating example components of the system 100. In operation, the system 100 may include computer-readable and computer-executable instructions that reside on the device 110 and/or the server(s) 120, as will be discussed further below. FIG. 22A is a block diagram conceptually illustrating a device 110 that may be used with the system 100. FIG. 22B is a block diagram conceptually illustrating example components of a remote device, such as the server(s) 120, which may assist with ASR processing, NLU processing, etc., and the skill server(s) 1925. The term "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple servers (120/1925) may be included in the system, such as one or more servers 120 for performing ASR processing, one or more servers 120 for performing NLU processing, one or more skill server(s) 1925 for performing actions responsive to user inputs, etc. In operation, each of these devices (or groups of devices) may include computer-readable and computer-executable instructions that reside on the respective device (120/1925), as will be discussed further below.

The device 110 may include one or more audio capture device(s), such as a microphone 112 or an array of microphones 112. The audio capture device(s) may be integrated into the device 110 or may be separate. The device 110 may also include an audio output device for producing sound, such as loudspeaker(s) 114. The audio output device may be integrated into the device 110 or may be separate. In some examples the device 110 may include a display 116, but the disclosure is not limited thereto and the device 110 may not include a display or may be connected to an external device/display without departing from the disclosure.

The device 110 and/or the server(s) 120 may include an address/data bus 2224 for conveying data among components of the device 110 and/or the server(s) 120. Each component within the device 110 and/or the server(s) 120 may also be directly connected to other components in addition to (or instead of) being connected to other components across the bus 2224.

The device 110 and/or the server(s) 120 may include one or more controllers/processors 2204, which may each include a central processing unit (CPU) for processing data and computer-readable instructions, and a memory 2206 for storing data and instructions. The memory 2206 may include volatile random access memory (RAM), non-volatile read only memory (ROM), non-volatile magnetoresistive (MRAM) and/or other types of memory. The device 110 and/or the server(s) 120 may also include a data storage component 2208, for storing data and controller/processor-executable instructions. The data storage component 2208 may include one or more non-volatile storage types such as magnetic storage, optical storage, solid-state storage, etc. The device 110 and/or the server(s) 120 may also be connected to removable or external non-volatile memory and/or storage (such as a removable memory card, memory key drive, networked storage, etc.) through the input/output device interfaces 2202.

Computer instructions for operating the device 110 and/or the server(s) 120 and its various components may be executed by the controller(s)/processor(s) 2204, using the memory 2206 as temporary "working" storage at runtime. The computer instructions may be stored in a non-transitory manner in non-volatile memory 2206, storage 2208, or an external device. Alternatively, some or all of the executable instructions may be embedded in hardware or firmware in addition to or instead of software.

The device 110 and/or the server(s) 120 includes input/output device interfaces 2202. A variety of components may be connected through the input/output device interfaces 2202, such as the microphone array 112, the loudspeaker(s) 114, and/or the display. The input/output interfaces 2202 may include A/D converters for converting the output of the microphone array 112 into microphone audio data, if the microphone array 112 is integrated with or hardwired directly to the device 110. If the microphone array 112 is independent, the A/D converters will be included with the microphone array 112, and may be clocked independent of the clocking of the device 110. Likewise, the input/output interfaces 2202 may include D/A converters for converting playback audio data into an analog current to drive the loudspeakers 114, if the loudspeakers 114 are integrated with or hardwired to the device 110. However, if the loudspeakers 114 are independent, the D/A converters will be included with the loudspeakers 114 and may be clocked independent of the clocking of the device 110 (e.g., conventional Bluetooth loudspeakers).

The input/output device interfaces 2202 may also include an interface for an external peripheral device connection such as universal serial bus (USB), FireWire, Thunderbolt or other connection protocol. The input/output device interfaces 2202 may also include a connection to one or more networks 10 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, the method comprising, by at least one server:
   receiving an instruction to embed an audio watermark in first audio data;
   determining a shared key associated with the audio watermark, the shared key corresponding to a sequence of positive values and negative values and including a first series of values and a second series of values that is different from the first series of values, the shared key including:
      a first sign of the first series of values that is associated with a first segment of a first portion of the first audio data,
      a second sign of the first series of values that is associated with a second segment of the first portion of the first audio data,
      a third sign of the second series of values that is associated with a first segment of a second portion of the first audio data, and
      a fourth sign of the second series of values that is associated with a second segment of the second portion of the first audio data;
   generating first data by multiplying the first sign and a first Eigenvector;
   generating second data by multiplying the second sign and a second Eigenvector;
   generating third data by multiplying the third sign and the first Eigenvector;
   generating fourth data by multiplying the fourth sign and the second Eigenvector;
   generating a first portion of second audio data by inserting the first data within the first segment of the first portion of the first audio data;
   generating a second portion of the second audio data by inserting the second data within the second segment of the first portion of the first audio data;
   generating a third portion of the second audio data by inserting the third data within the first segment of the second portion of the first audio data;
   generating a fourth portion of the second audio data by inserting the fourth data within the second segment of the second portion of the first audio data;
   generating the second audio data by combining the first portion of the second audio data, the second portion of the second audio data, the third portion of the second audio data, and the fourth portion of the second audio data;
   sending, to a first device, the second audio data; and
   sending, to the first device, a command instructing the first device to generate, via at least one loudspeaker of the first device, output audio based on the second audio data, wherein the audio watermark is represented in the output audio.

2. The computer-implemented method of claim 1, wherein receiving the instruction to embed the audio watermark in the first audio data further comprises:
- detecting a representation of a wakeword in the first audio data;
- determining a time window within the first audio data corresponding to the representation of the wakeword;
- selecting, based on detecting the representation of the wakeword, the audio watermark, the audio watermark including the first Eigenvector and the second Eigenvector; and
- determining to embed the audio watermark in the first audio data within at least a portion of the time window.

3. The computer-implemented method of claim 1, wherein receiving the instruction to embed the audio watermark in the first audio data further comprises:
- receiving a second instruction to send a first command, via one or more loudspeakers of a first device, to one or more second devices in proximity to the first device;
- selecting, based on the first command, the audio watermark, wherein the audio watermark corresponds to a third instruction that instructs the one or more second devices to perform an action corresponding to the first command;
- generating text data corresponding to the first command; and
- generating the first audio data based on the text data.

4. The computer-implemented method of claim 1, further comprising, by a second device:
- receiving, from at least one microphone of the second device, third audio data including a representation of the output audio;
- generating cross-correlation data by performing a cross-correlation between a first portion of the third audio data and a second portion of the third audio data;
- detecting, based on the cross-correlation data, the shared key;
- determining, based on the shared key, the audio watermark;
- determining a command corresponding to the audio watermark; and
- performing an action corresponding to the command.

5. A computer-implemented method, the method comprising:
- receiving an instruction to embed an audio watermark in first audio data;
- determining a sign sequence associated with the audio watermark, the sign sequence corresponding to a sequence of positive values and negative values that includes a first series of values and a second series of values, the second series of values being (i) different from the first series of values and (ii) different from an inverse of the first series of values, the first series of values corresponding to a first repetition of the audio watermark and the second series of values corresponding to a second repetition of the audio watermark;
- generating a first portion of second audio data by inserting, within a first portion of the first audio data, first data corresponding to a first value of the sign sequence;
- generating a second portion of the second audio data by inserting, within a second portion of the first audio data, second data corresponding to a second value of the sign sequence;
- generating a third portion of the second audio data by inserting, within a third portion of the first audio data, third data corresponding to a third value of the sign sequence;
- generating a fourth portion of the second audio data by inserting, within a fourth portion of the first audio data, fourth data corresponding to a fourth value of the sign sequence; and
- generating the second audio data by combining the first portion of the second audio data, the second portion of the second audio data, the third portion of the second audio data, and the fourth portion of the second audio data.

6. The computer-implemented method of claim 5, further comprising:
- determining the first data by multiplying a first Eigenvector and the first value;
- determining the second data by multiplying a second Eigenvector and the second value;
- determining the third data by multiplying the first Eigenvector and the third value; and
- determining the fourth data by multiplying the second Eigenvector and the fourth value.

7. The computer-implemented method of claim 5, further comprising:
- determining the first data by multiplying the first value of the sign sequence by a first normalization value, wherein the first value of the sign sequence is positive and the first normalization value corresponds to the first portion of the first audio data;
- determining the second data by multiplying the second value of the sign sequence by a second normalization value, wherein the second value of the sign sequence is negative and the second normalization value corresponds to the second portion of the first audio data;
- determining the third data by multiplying the third value of the sign sequence by a third normalization value, wherein the third value of the sign sequence is negative and the third normalization value corresponds to the third portion of the first audio data; and
- determining the fourth data by multiplying the fourth value of the sign sequence by a fourth normalization value, wherein the fourth value of the sign sequence is negative and the fourth normalization value corresponds to the fourth portion of the first audio data.

8. The computer-implemented method of claim 5, wherein receiving the instruction to embed the audio watermark in the first audio data further comprises:
- detecting a representation of a wakeword in the first audio data;
- determining a time window within the first audio data corresponding to the representation of the wakeword;
- selecting, based on detecting the representation of the wakeword, the audio watermark; and
- determining to embed the audio watermark in the first audio data within at least a portion of the time window.

9. The computer-implemented method of claim 5, wherein receiving the instruction to embed the audio watermark in the first audio data further comprises:
- receiving a second instruction to send a first command, via one or more loudspeakers of a first device, to one or more second devices in proximity to the first device;
- selecting, based on the first command, the audio watermark, wherein the audio watermark corresponds to a third instruction that instructs the one or more second devices to perform an action corresponding to the first command;
- generating text data corresponding to the first command; and
- generating the first audio data based on the text data.

10. The computer-implemented method of claim 5, wherein receiving the instruction to embed the audio watermark in the first audio data further comprises:
- receiving a second instruction to send a first command, via one or more loudspeakers of a first device, to a second device in proximity to the first device;
- selecting, based on the first command and the second device, the audio watermark, wherein the audio watermark corresponds to a third instruction that instructs the second device to perform an action corresponding to the first command;
- generating text data corresponding to the first command; and
- generating the first audio data based on the text data.

11. The computer-implemented method of claim 5, wherein:
- receiving the instruction to embed the audio watermark in the first audio data further comprises:
  - receiving a second instruction to send a first command, via one or more loudspeakers of a first device, to a second device in proximity to the first device; and
  - selecting, based on the first command and the second device, the audio watermark, wherein the audio watermark corresponds to a third instruction that instructs the second device to perform a first action corresponding to the first command, and
- the method further comprises:
  - receiving a fourth instruction to send a second command, via the one or more loudspeakers of the first device, to a third device in proximity to the first device;
  - selecting, based on the second command and the third device, a second audio watermark, wherein the second audio watermark corresponds to a fifth instruction that instructs the third device to perform a second action corresponding to the second command;
  - generating a fifth portion of the second audio data by inserting, within a fifth portion of the first audio data, fifth data corresponding to a first value of a second sign sequence associated with the second audio watermark; and
  - generating a sixth portion of the second audio data by inserting, within a sixth portion of the first audio data, sixth data corresponding to a second value of the second sign sequence.

12. The computer-implemented method of claim 5, further comprising:
- generating, via at least one loudspeaker, output audio based on the second audio data, wherein the audio watermark is represented in the output audio.

13. The computer-implemented method of claim 5, further comprising:
- determining the first data by multiplying the first value of the sign sequence by a first portion of the audio watermark, wherein the first value of the sign sequence is positive;
- determining the second data by multiplying the second value of the sign sequence by a second portion of the audio watermark, wherein the second value of the sign sequence is negative; and
- determining the third data by multiplying the third value of the sign sequence by a third portion of the audio watermark, wherein the third value of the sign sequence is negative.

14. A system comprising:
- at least one processor; and
- memory including instructions operable to be executed by the at least one processor to cause the system to:
  - receive an instruction to embed an audio watermark in first audio data;
  - determine a sign sequence associated with the audio watermark, the sign sequence corresponding to a sequence of positive values and negative values that includes a first series of values and a second series of values, the second series of values being (i) different from the first series of values and (ii) different from an inverse of the first series of values, the first series of values corresponding to a first repetition of the audio watermark and the second series of values corresponding to a second repetition of the audio watermark;
  - generate a first portion of second audio data by inserting, within a first portion of the first audio data, first data corresponding to a first value of the sign sequence;
  - generate a second portion of the second audio data by inserting, within a second portion of the first audio data, second data corresponding to a second value of the sign sequence;
  - generate a third portion of the second audio data by inserting, within a third portion of the first audio data, third data corresponding to a third value of the sign sequence;
  - generate a fourth portion of the second audio data by inserting, within a fourth portion of the first audio data, fourth data corresponding to a fourth value of the sign sequence; and
  - generate the second audio data by combining the first portion of the second audio data, the second portion of the second audio data, the third portion of the second audio data, and the fourth portion of the second audio data.

15. The system of claim 14, wherein the memory further comprises instructions that, when executed by the at least one processor, further cause the system to:
- determine the first data by multiplying a first Eigenvector and the first value;
- determine the second data by multiplying a second Eigenvector and the second value;
- determine the third data by multiplying the first Eigenvector and the third value; and
- determine the fourth data by multiplying the second Eigenvector and the fourth value.

16. The system of claim 14, wherein the memory further comprises instructions that, when executed by the at least one processor, further cause the system to:
- determine the first data by multiplying the first value of the sign sequence by a first normalization value, wherein the first value of the sign sequence is positive and the first normalization value corresponds to the first portion of the first audio data;
- determine the second data by multiplying the second value of the sign sequence by a second normalization value, wherein the second value of the sign sequence is negative and the second normalization value corresponds to the second portion of the first audio data;
- determine the third data by multiplying the third value of the sign sequence by a third normalization value, wherein the third value of the sign sequence is negative and the third normalization value corresponds to the third portion of the first audio data; and determine the fourth data by multiplying the fourth value of the sign sequence by a fourth normalization value, wherein the fourth value of the sign sequence is negative and the fourth normalization value corresponds to the fourth portion of the first audio data.

17. The system of claim 14, wherein the memory further comprises instructions that, when executed by the at least one processor, further cause the system to:
    detect a representation of a wakeword in the first audio data;
    determine a time window within the first audio data corresponding to the representation of the wakeword;
    select, based on detecting the representation of the wakeword, the audio watermark; and
    determine to embed the audio watermark in the first audio data within at least a portion of the time window.

18. The system of claim 14, wherein the memory further comprises instructions that, when executed by the at least one processor, further cause the system to:
    receive a second instruction to send a first command, via one or more loudspeakers of a first device, to one or more second devices in proximity to the first device;
    select, based on the first command, the audio watermark, wherein the audio watermark corresponds to a third instruction that instructs the one or more second devices to perform an action corresponding to the first command;
    generate text data corresponding to the first command; and
    generate the first audio data based on the text data.

19. The system of claim 14, wherein the memory further comprises instructions that, when executed by the at least one processor, further cause the system to:
    receive a second instruction to send a first command, via one or more loudspeakers of a first device, to a second device in proximity to the first device;
    select, based on the first command and the second device, the audio watermark, wherein the audio watermark corresponds to a third instruction that instructs the second device to perform an action corresponding to the first command;
    generate text data corresponding to the first command; and
    generate the first audio data based on the text data.

20. The system of claim 14, wherein the memory further comprises instructions that, when executed by the at least one processor, further cause the system to:
    receive a second instruction to send a first command, via one or more loudspeakers of a first device, to a second device in proximity to the first device;
    select, based on the first command and the second device, the audio watermark, wherein the audio watermark corresponds to a third instruction that instructs the second device to perform a first action corresponding to the first command;
    receive a fourth instruction to send a second command, via the one or more loudspeakers of the first device, to a third device in proximity to the first device;
    select, based on the second command and the third device, a second audio watermark, wherein the second audio watermark corresponds to a fifth instruction that instructs the third device to perform a second action corresponding to the second command;
    generate a fifth portion of the second audio data by inserting, within a fifth portion of the first audio data, fifth data corresponding to a first value of a second sign sequence associated with the second audio watermark; and
    generate a sixth portion of the second audio data by inserting, within a sixth portion of the first audio data, sixth data corresponding to a second value of the second sign sequence.

21. The system of claim 14, wherein the memory further comprises instructions that, when executed by the at least one processor, further cause the system to:
    generate, via at least one loudspeaker, output audio based on the second audio data, wherein the audio watermark is represented in the output audio.

* * * * *